(12) United States Patent
Ishikawa

(10) Patent No.: US 8,058,831 B2
(45) Date of Patent: Nov. 15, 2011

(54) CONTROL DEVICE AND CONTROL METHOD

(75) Inventor: Kazutoshi Ishikawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 12/303,524

(22) PCT Filed: May 31, 2007

(86) PCT No.: PCT/JP2007/061136
§ 371 (c)(1),
(2), (4) Date: Dec. 4, 2008

(87) PCT Pub. No.: WO2007/142127
PCT Pub. Date: Dec. 13, 2007

(65) Prior Publication Data
US 2009/0206782 A1    Aug. 20, 2009

(30) Foreign Application Priority Data
Jun. 7, 2006 (JP) .................... 2006-159151

(51) Int. Cl.
*H02P 7/06* (2006.01)
*G01D 5/244* (2006.01)
(52) U.S. Cl. ........................ 318/484; 318/626
(58) Field of Classification Search .................. 318/560, 318/602–605, 625, 626, 652, 653, 661, 400.04, 318/400.1, 245, 268, 445, 452, 461, 466, 318/484
See application file for complete search history.

(56) References Cited

U.S. PATENT DOCUMENTS

| | | | | |
|---|---|---|---|---|
| 4,621,224 A | * | 11/1986 | Watabe et al. | 318/594 |
| 4,992,730 A | * | 2/1991 | Hagiya | 324/160 |
| 5,233,292 A | * | 8/1993 | Nagata et al. | 324/166 |
| 6,302,514 B1 | * | 10/2001 | Eade et al. | 347/33 |
| 6,310,458 B1 | * | 10/2001 | Fenstermacher | 318/603 |
| 6,390,588 B1 | * | 5/2002 | Ikeda | 347/19 |
| 2002/0021232 A1 | | 2/2002 | Shoji et al. | |
| 2004/0140784 A1 | | 7/2004 | Kobayashi et al. | |

FOREIGN PATENT DOCUMENTS

| | | |
|---|---|---|
| JP | 2002-34274 A | 1/2002 |
| JP | 2004-129488 A | 4/2004 |
| JP | 2004-307163 A | 11/2004 |
| JP | 2004-343859 A | 12/2004 |

* cited by examiner

*Primary Examiner* — Bentsu Ro
(74) *Attorney, Agent, or Firm* — Birch, Stewart, Kolasch & Birch, LLP

(57) ABSTRACT

The invention relates to a control device and a control method which enhance accuracy in detecting a speed of a driven body to stably control drive means. An encoder signal control section (25) compares lengths of time between a rising measurement time kept by a rising edge interval counting section (38) and a rising period of the latest rising edge stored in a rising edge interval history section (39), and then outputs a value of either the rising measurement time or the rising period, whichever is longer based on a comparison result, so that a period of a pulse signal (36) can be accurately predicted and be a real-time approximate, which allows for accurate calculation of the speed of the driven body based on the accurately outputted period of the pulse signal (36), and the accuracy in detecting the speed of the driven body can be enhanced with the result that the drive means can be stably controlled.

20 Claims, 36 Drawing Sheets

CONTROL DEVICE AND CONTROL METHOD

TECHNICAL FIELD

The invention relates to a control device and control method of controlling drive means such as a motor.

BACKGROUND ART

An inkjet recording apparatus of conventional art is mounted in a printer, a facsimile machine, and a copier, and used as recording means which records an image onto a recording medium in the form of a paper sheet or a thin plastic sheet on the basis of image information. Such an inkjet recording apparatus conducts recording with a print head ejecting ink droplets and therefore has features that the recording means can be easily downsized, that dense images can be recorded at high speed, that the running cost is low, and that the level of noise generated thereby is low owing to the non-impact system. Moreover, the inkjet apparatus has also an advantage that color images are easily recorded with use of multicolor ink.

Drive sources of the inkjet recording apparatus include, for example, a carriage motor which reciprocates and drives a carriage having a print head, an automatic sheet feeder (ASF) motor which feeds a recording medium to a print position, a recovery motor which performs head-cleaning, and a conveyance motor which feeds a recording medium for each print scanning. In the conventional art, a stepping motor is frequently used as the above drive source for such reasons as that it is easy to reduce the cost and that the control is simple.

As mentioned above, the inkjet recording apparatus has a low noise level since it adopts the non-impact system. However, a direct-current (DC) motor is now more frequently used as the above drive source for the purpose of further noise reduction or the like. In order to control this DC motor, a servo control is applied.

FIG. 34 is a block diagram showing electrical configuration of a servo control system 1 for use in the inkjet apparatus of the conventional art. Command voltage acting as a control command is inputted by a servo controller 3 to a DC motor 2 which is to be controlled, and on the basis of the command voltage, a motor shaft rotates. The motor shaft has its rotation angle and rotation speed respectively measured by a speed meter 4 and a position meter 5. The measured position information and speed information are fed back to the servo controller 3, and on the basis of provided target position and target speed, the servo controller 3 outputs command voltage for controlling the DC motor 2. The speed meter 4 and the position meter 5 are realized by a later-described encoder 6.

FIG. 35 is a view schematically showing a configuration of the encoder 6 of the conventional art.

In the encoder 6, a detector 8 detects light emitted by a light emitting diode (abbreviated as LED) 7 through a code wheel 9 so that signals are generated. The code wheel 9 is composed of light-transmitting parts 9a and non-light-transmitting parts 9b each of which has a predetermined distance L. In the detector 8, photodiodes 8a are arranged at predetermined distances, and light detected by each photodiode 8a is converted into an electric signal which is then outputted, with the result that the outputted electric signal is outputted by a comparator 10 as differential output signals 11.

FIG. 36 is a view showing a waveform of the differential output signal 11 outputted by the comparator 10 and waveforms of two electric signals 12a and 12b inputted to the comparator 10. The differential output signal 11 has the waveform which is turned over at intersections 13 of the two electric signals 12a and 12b outputted by the respective photodiodes 8a. Now, in the case where the speed is constant, a duty cycle of the differential output signal 11 will be theoretically 0.5. However, the duty cycle changes with various factors. One of the major factors is a difference in sensitivity of the photodiodes 8a.

FIG. 37 is a view showing a waveform of the differential output signal 11 outputted by the comparator 10 and waveforms of the two electric signals 12a and 12b inputted to the comparator, which shown waveforms are produced in the case where there is a difference in sensitivity of the photodiodes 8a. The sensitivity of the photodiodes 8a represents an amplitude difference of the electric signals 12a and 12b. FIG. 37 shows the differential output signal 11 in the case where amplitude of one electric signal 12a is smaller than that of the other electric signal 12b. Accordingly, it can be seen that the difference in sensitivity of the photodiodes 8a changes the duty cycle of the differential output signal 11 as shown in FIG. 37. However, the period T of the differential output signal 11 is not influenced and therefore equal to the period T of the differential output signal 11 shown in FIG. 36. Consequently, the differential output signal 11 of the encoder 6 has the most accurate period T (refer to Japanese Unexamined Patent Publication JP-A 2002-34274, for example).

Even though there is a difference in sensitivity of the photodiodes as described above, the output signal of the encoder has the most accurate period. Accordingly, in order to obtain more precise speed information, a simple-edge sampling method is adopted in which a period is counted from one rise to next rise of output signal, for example.

Further, in order to obtain more precise speed information and position information even when the photodiodes are different in sensitivity, a method is adopted of sampling both edges of each of two differential output signals which are out of phase with each other.

Taking a paper-feed control in the inkjet recording apparatus as an example, a sheet is fed at high speed at first, and a low-speed servo control is started at a short distance before a stop position. After that, the mode is shifted to a stop mode just before the target stop position so that the sheet is stopped at the target position. In this case, the sheet stopping accuracy is highly influenced by stabilization of a constant-speed servo control at the short distance before the stop position.

In driving the ASF motor at low speed as mentioned above, the output signal of the encoder will have smaller changes, thus resulting in longer update intervals of the position information and the speed information. As a result, the position information is not updated when the updating interval of the position information is longer than the servo period. In this case, it is determined that the sheet has stopped, and the speed information is controlled to be zero.

If a recording sheet has not reached a target position at this time, higher command voltage is outputted to the ASF motor to move the recording sheet to the target position. However, an actual speed may not be zero and in such a case, there is a problem of unstable servo control such that the speed may be so high for the recording sheet to be fed over the target position.

The unstable servo control impedes the recording sheet from being printed at desired position, and problems are caused, for example, that in the case where the recording sheet fails to stop at the target position and stops over the target position, a gap will appear between print data, while in the case where the recording sheet stops before the target position, the print data will overlap each other. Moreover, in the case where the recording sheet has reached far over the target position, the recording sheet will need to be moved in the opposite direction and back to the target position, resulting in lower print speed.

Further, in the case where the speed information is controlled so as not to be zero when the position information is not updated, the speed information will not be zero even when the actual speed is zero, therefore causing a problem of unstable servo control as described above.

DISCLOSURE OF INVENTION

An object of the invention is to provide a control device and control method which enhance accuracy in detection of speed of a driven body and stably control drive means.

The invention provides a control device that controls drive means, the control device comprising:

periodic signal acquisition means for acquiring a pulse signal having a period that corresponds to a speed of a driven body being displaced depending on drive by the drive means;

edge detecting means for detecting either a rising or falling edge of the pulse signal;

timer means for starting timekeeping from a time point when the edge is detected by the edge detecting means;

computing means for computing, after an edge is detected by the edge detecting means, a period between the presently detected edge and an immediately previously detected edge;

storing means for storing in chronological order the period of edge computed by the computing means;

comparing means for comparing lengths of time between a measurement time kept by the timer means and a latest period of edge stored in the storing means; and output means for outputting a value of either the measurement time or the period, whichever is longer based on a comparison result of the comparing means.

Further, in the invention, it is preferable that the output means outputs the latest period in a case where the measurement time is shorter than the period, and a sum of the measurement time and a predetermined additional time in a case where the measurement time is not shorter than the period, based on the comparison result of the comparing means.

Furthermore, the invention provides a control device that controls drive means, the control device comprising:

periodic signal acquisition means for acquiring a pulse signal having a period that corresponds to a speed of a driven body being driven and displaced by the drive means;

rising edge detecting means for detecting a rising edge of the pulse signal;

falling edge detecting means for detecting a falling edge of the pulse signal;

rising timer means for starting timekeeping from a time point when the rising edge is detected by the rising edge detecting means;

falling timer means for starting timekeeping from a time point when the falling edge is detected by the falling edge detecting means;

rising computing means for computing, after the rising edge is detected by the rising edge detecting means, a rising period between the presently detected rising edge and an immediately previously detected rising edge;

falling computing means for computing, after the falling edge is detected by the falling edge detecting means, a falling period between the presently detected falling edge and an immediately previously detected falling edge;

rising storing means for storing in chronological order the rising period computed by the rising computing means;

falling storing means for storing in chronological order the falling period computed by the falling computing means;

first comparing means for comparing lengths of time between a rising measurement time kept by the rising timer means and the latest falling period stored in the falling storing means;

second comparing means for comparing lengths of time between a falling measurement time kept by the falling timer means and the latest rising period stored in the rising storing means; and output means for outputting a value based on the comparison result, the output means outputting, from when the falling edge of the pulse signal is detected till when the rising edge of the pulse signal is detected, a value of either the rising measurement time or the falling period, whichever is longer based on the comparison result of the first comparing means, and outputting, from when the rising edge of the pulse signal is detected till when the falling edge of the pulse signal is detected, a value of either the falling measurement time or the rising period, whichever is longer based on the comparison result of the second comparing means.

Furthermore, in the invention, it is preferable that the output means outputs, from when the falling edge of the pulse signal is detected till when the rising edge of the pulse signal is detected, the latest falling period in a case where the rising measurement time is shorter than the falling period, and a sum of the rising measurement time and a predetermined additional time in a case where the rising measurement time is not shorter than the falling period, based on the comparison result of the first comparing means, and the output means outputs, from when the rising edge of the pulse signal is detected till when the falling edge of the pulse signal is detected, the latest rising period in a case where the falling measurement time is shorter than the rising period, and a sum of the rising measurement time and a predetermined additional time in a case where the falling measurement time is not shorter than the rising period, based on the comparison result of the second comparing means.

The invention provides a control device that controls drive means, the control device comprising:

periodic signal acquisition means for acquiring a pulse signal having a period that corresponds to a speed of a driven body being driven and displaced by the drive means;

edge detecting means for detecting an edge of the pulse signal;

timer means for starting timekeeping from a time point when the edge is detected by the edge detecting means;

computing means for computing, after the edge is detected by the edge detecting means, a period between the presently detected edge and an immediately previously detected edge;

storing means for storing in chronological order the period of edge computed by the computing means;

comparing means for comparing lengths of time between a measurement time kept by the timer means and a second last period stored in the storing means before a time point of detection of the edge; and output means for outputting a sum of a latest period and a value of either the measurement time or the second last period, whichever is longer based on a comparison result of the comparing means.

Furthermore, in the invention, it is preferable that the output means outputs a sum of the second last period and the latest period in a case where the measurement time is shorter than the second last period, and a sum of the measurement time, the latest period, and a predetermined additional time in a case where the measurement time is not shorter than the second last period, based on the comparison result of the comparing means.

The invention provides a control device that controls drive means, the control device comprising:

first periodic signal acquisition means for acquiring a first pulse signal having a period that corresponds to a speed of a driven body being driven and displaced by the drive means;

second periodic signal acquisition means for acquiring a second pulse signal out of phase with the first pulse signal by about 90 degrees in electric angle;

edge detecting means for detecting rising edges and falling edges of the first pulse signal and the second pulse signal, respectively;

first rising timer means for starting timekeeping from a time point when the rising edge of the first pulse signal is detected by the edge detecting means;

first falling timer means for starting timekeeping from a time point when the falling edge of the first pulse signal is detected by the edge detecting means;

second rising timer means for starting timekeeping from a time point when the rising edge of the second pulse signal is detected by the edge detecting means;

second falling timer means for starting timekeeping from a time point when the falling edge of the second pulse signal is detected by the edge detecting means;

first rising computing means for computing, after the rising edge of the first pulse signal is detected by the edge detecting means, a first rising period between the presently detected rising edge and an immediately previously detected rising edge of the first pulse signal;

first falling computing means for computing, after the falling edge of the first pulse signal is detected by the edge detecting means, a first falling period between the presently detected falling edge and an immediately previously detected falling edge of the first pulse signal;

second rising computing means for computing, after the rising edge of the second pulse signal is detected by the edge detecting means, a second rising period between the presently detected rising edge and an immediately previously detected rising edge of the second pulse signal;

second falling computing means for computing, after the falling edge of the second pulse signal is detected by the edge detecting means, a second falling period between the presently detected falling edge and an immediately previously detected falling edge of the second pulse signal;

first rising storing means for storing in chronological order the first rising period computed by the first rising computing means;

first falling storing means for storing in chronological order the first falling period computed by the first falling computing means;

second rising storing means for storing in chronological order the second rising period computed by the second rising computing means;

second falling storing means for storing in chronological order the second falling period computed by the second falling computing means;

first comparing means for comparing a first rising measurement time kept by the first rising timer means and a latest second falling period stored in the second falling storing means;

second comparing means for comparing a first falling measurement time kept by the first falling timer means and a latest second rising period stored in the second rising storing means;

third comparing means for comparing a second rising measurement time kept by the second rising timer means and a latest first rising period stored in the first rising storing means;

fourth comparing means for comparing a second falling measurement time kept by the second falling timer means and a latest first falling period stored in the first falling storing means; and output means for outputting a value based on the comparison result, the output means outputting, from when the falling edge of the second pulse signal is detected till when the rising edge of the first pulse signal is detected, a value of either the first rising measurement time or the second falling period, whichever is longer based on the comparison result of the first comparing means, outputting, from when the rising edge of the second pulse signal is detected till when the falling edge of the first pulse signal is detected, a value of either the first falling measurement time or the second rising period, whichever is longer based on the comparison result of the second comparing means, outputting, from when the rising edge of the first pulse signal is detected till when the rising edge of the second pulse signal is detected, a value of either the second rising measurement time or the first rising period, whichever is longer based on the comparison result of the third comparing means, and outputting, from when the falling edge of the first pulse signal is detected till when the falling edge of the second pulse signal is detected, a value of either the second falling measurement time or the first falling period, whichever is longer based on the comparison result of the fourth comparing means.

Furthermore, in the invention, it is preferable that the output means outputs, from when the falling edge of the second pulse signal is detected till when the rising edge of the first pulse signal is detected, the latest second falling period in a case where the first rising measurement time is shorter than the latest second falling period, and a sum of the first rising measurement time and a predetermined additional time in a case where the first rising measurement time is not shorter than the second falling period, based on the comparison result of the first comparing means, the output means outputs, from when the rising edge of the second pulse signal is detected till when the falling edge of the first pulse signal is detected, the latest second rising period in a case where the first falling measurement time is shorter than the latest second rising period, and a sum of the first falling measurement time and a predetermined additional time in a case where the first falling measurement time is not shorter than the latest second rising period, based on the comparison result of the second comparing means, the output means outputs, from when the rising edge of the first pulse signal is detected till when the rising edge of the second pulse signal is detected, the latest first rising period in a case where the second rising measurement time is shorter than the latest first rising period, and a sum of the second rising measurement time and a predetermined additional time in a case where the second rising measurement time is not shorter than the latest first rising period, based on the comparison result of the third comparing means, and the output means outputs, from when the falling edge of the first pulse signal is detected till when the falling edge of the second pulse signal is detected, the latest first falling period in a case where the second falling measurement time is shorter than the latest first falling period, and a sum of the second falling measurement time and a predetermined additional time in a case where the second falling measurement time is not shorter than the latest first falling period, based on the comparison result of the fourth comparing means.

Furthermore, the invention provides a control device that controls drive means, the control device comprising:

first periodic signal acquisition means for acquiring a first pulse signal having a period that corresponds to a speed of a driven body being driven and displaced by the drive means;

second periodic signal acquisition means for acquiring a second pulse signal out of phase with the first pulse signal by about 90 degrees in electric angle;

edge detecting means for detecting rising edges and falling edges of the first pulse signal and the second pulse signal, respectively;

first rising timer means for starting timekeeping from a time point when the rising edge of the first pulse signal is detected by the edge detecting means;

first falling timer means for starting timekeeping from a time point when the falling edge of the first pulse signal is detected by the edge detecting means;

second rising timer means for starting timekeeping from a time point when the rising edge of the second pulse signal is detected by the edge detecting means;

second falling timer means for starting timekeeping from a time point when the falling edge of the second pulse signal is detected by the edge detecting means;

first computing means for computing, after the rising edge of the second pulse signal is detected by the edge detecting means, a first period between the presently detected rising edge and an immediately previously detected rising edge of the first pulse signal;

second computing means for computing, after the falling edge of the first pulse signal is detected by the edge detecting means, a second period between the presently detected falling edge and an immediately previously detected rising edge of the second pulse signal;

third computing means for computing, after the falling edge of the second pulse signal is detected by the edge detecting means, a third period between the presently detected falling edge and an immediately previously detected falling edge of the first pulse signal;

fourth computing means for computing, after the rising edge of the first pulse signal is detected by the edge detecting means, a fourth period between the presently detected rising edge and an immediately previously detected falling edge of the second pulse signal;

first storing means for storing in chronological order the first period computed by the first computing means;

second storing means for storing in chronological order the second period computed by the second computing means;

third storing means for storing in chronological order the third period computed by the third computing means;

fourth storing means for storing in chronological order the fourth period computed by the fourth computing means;

first comparing means for comparing a first rising measurement time kept by the first rising timer means and a latest first period stored in the first storing means;

second comparing means for comparing a second rising measurement time kept by the second rising timer means and a latest second period stored in the second storing means;

third comparing means for comparing a first falling measurement time kept by the first falling timer means and a latest third period stored in the third storing means;

fourth comparing means for comparing a second falling measurement time kept by the second falling timer means and a latest fourth period stored in the fourth storing means; and output means for outputting a value based on the comparison result, the output means outputting, from when the falling edge of the second pulse signal is detected till when the rising edge of the first pulse signal is detected, a total period length of the first period, second period, third period, and fourth period which are respectively latest, in a case where the first rising measurement time is shorter than the latest first period, and a first total time-length of the first rising measurement time and the second period, third period, and fourth period which are respectively latest, in a case where the first rising measurement time is not shorter than the latest first period, based on the comparison result of the first comparing means, outputting, from when the rising edge of the second pulse signal is detected till when the falling edge of the first pulse signal is detected, the total period length in a case where the second rising measurement time is shorter than the latest second period, and a second total time-length of the second rising measurement time and the first period, third period, and fourth period which are respectively latest, in a case where the second rising measurement time is not shorter than the latest second period, based on the comparison result of the second comparing means, outputting, from when the rising edge of the first pulse signal is detected till when the rising edge of the second pulse signal is detected, the total period length in a case where the first falling measurement time is shorter than the latest third period, and a third total time-length of the first falling measurement time and the first period, second period, and fourth period which are respectively latest, in a case where the first falling measurement time is not shorter than the latest third period, based on the comparison result of the third comparing means, and outputting, from when the falling edge of the first pulse signal is detected till when the falling edge of the second pulse signal is detected, the total period length in a case where the second falling measurement time is shorter than the latest fourth period, and a fourth total time-length of the second falling measurement time and the first period, second period, and third period which are respectively latest, in a case where the second falling measurement time is not shorter than the latest fourth period, based on the comparison result of the fourth comparing means.

Furthermore, in the invention, it is preferable that the first comparing means compares the first rising measurement time kept by the first rising timer means with the latest fourth period stored in the fourth storing means, the second comparing means compares the second rising measurement time kept by the second rising timer means with the latest first period stored in the first storing means, the third comparing means compares the first falling measurement time kept by the first falling timer means with the latest second period stored in the second storing means, and the fourth comparing means compares the second falling measurement time kept by the second falling timer means with the latest third period stored in the third storing means, and the output means outputs, from when the falling edge of the second pulse signal is detected till when the rising edge of the first pulse signal is detected, the total period length in a case where the first rising measurement time is shorter than the latest fourth period, and the first total time-length in a case where the first rising measurement time is not shorter than the latest fourth period, based on the comparison result of the first comparing means, the output means outputs, from when the rising edge of the second pulse signal is detected till when the falling edge of the first pulse signal is detected, the total period length in a case where the second rising measurement time is shorter than the latest first period, and the second total time-length in a case where the second rising measurement time is not shorter than the latest first period, based on the comparison result of the second comparing means, the output means outputs, from when the rising edge of the first pulse signal is detected till when the rising edge of the second pulse signal is detected, the total period length in a case where the first falling measurement time is shorter than the latest second period, and the third total time-length in a case where the first falling measurement time is not shorter than the latest second period, based on the comparison result of the third comparing means, and the output means outputs, from when the falling edge of the first pulse signal is detected till when the falling edge of the second pulse signal is detected, the total period length in a case where the second falling measurement time is shorter than the latest third period, and the fourth total time-length in a case where the second falling measurement time is not shorter than the latest third period, based on the comparison result of the fourth comparing means.

Furthermore, in the invention, it is preferable that the first comparing means compares the first total time-length and the total period length, the second comparing means compares the second total time-length and the total period length, the third comparing means compares the third total time-length and the total period length, and the fourth comparing means compares the fourth total time-length and the total period length, and the output means outputs, from when the falling edge of the second pulse signal is detected till when the rising edge of the first pulse signal is detected, the total period length in a case where the first total time-length is shorter than the total period length, and the first total time-length in a case where the first total time-length is not shorter than the total period length, based on the comparison result of the first comparing means, the output means outputs, from when the rising edge of the second pulse signal is detected till when the falling edge of the first pulse signal is detected, the total period length in a case where the second total time-length is shorter than the total period length, and the second total time-length in a case where the second total time-length is not shorter than the total period length, based on the comparison result of the second comparing means, the output means outputs, from when the rising edge of the first pulse signal is detected till when the rising edge of the second pulse signal is detected, the total period length in a case where the third total time-length is shorter than the total period length, and the third total time-length in a case where the third total time-length is not shorter than the total period length, based on the comparison result of the third comparing means, and the output means outputs, from when the falling edge of the first pulse signal is detected till when the falling edge of the second pulse signal is detected, the total period length in a case where the fourth total time-length is shorter than the total period length, and the fourth total time-length in a case where the fourth total time-length is not shorter than the total period length, based on the comparison result of the fourth comparing means.

Furthermore, in the invention, it is preferable that the output means outputs, from when the falling edge of the second pulse signal is detected till when the rising edge of the first pulse signal is detected, a first additional total time-length that is a sum of the first total time-length and a predetermined additional time, in a case of outputting the first total time-length, based on the comparison result of the first comparing means, the output means outputs, from when the rising edge of the second pulse signal is detected till when the falling edge of the first pulse signal is detected, a second additional total time-length that is a sum of the second total time-length and a predetermined additional time, in a case of outputting the second total time-length, based on the comparison result of the second comparing means, the output means outputs, from when the rising edge of the first pulse signal is detected till when the rising edge of the second pulse signal is detected, a third additional total time-length that is a sum of the third total time-length and a predetermined additional time, in a case of outputting the third total time-length, based on the comparison result of the third comparing means, and the output means outputs, from when the falling edge of the first pulse signal is detected till when the falling edge of the second pulse signal is detected, a fourth additional total time-length that is a sum of the fourth total time-length and a predetermined additional time, in a case of outputting the fourth total time-length, based on the comparison result of the fourth comparing means.

Furthermore, in the invention, it is preferable that a value outputted by the output means is determined to be valid when the value is equal to or lower than a boundary value that is set based on the speed of the driven body, while the value is determined to be invalid when the value is larger than the boundary value.

Further, the invention provides a control device that controls drive means, the control device comprising:

acquisition means for acquiring at regular or irregular intervals speed information that corresponds to a predetermined amount of displacement of a driven body being driven and displaced by the drive means;

acquired information storing means for storing In chronological order the speed information acquired by the acquisition means;

determining means for determining whether or not the acquired speed information is a constant value within a predetermined range over a predetermine time immediately before being stored in the acquired information storing means;

control value producing means for outputting, based on a determination result of the determining means, a control value that is a sum of the speed information and a predetermined value in a case where the acquired speed information is a constant value, and outputting the speed information as a control value in a case where the acquired speed information is not a constant value;

speed computing means for computing the speed of the driven body based on the control value outputted by the control value producing means and the predetermined amount of displacement of the driven body; and control means for controlling the drive means based on the speed computed by the speed computing means.

Further, the invention provides a control device that controls drive means, the control device comprising:

acquisition means for acquiring at regular or irregular intervals speed information that corresponds to a predetermined amount of displacement of a driven body being driven and displaced by the drive means;

acquired information storing means for storing in chronological order the speed information acquired by the acquisition means;

certain time-length calculating means for calculating an immediately preceding certain length of time for the speed information acquired by the acquisition means to fall within a predetermined range, based on the speed information stored in the acquired information storing means;

time-length comparing means for comparing lengths of time between the certain length of time calculated by the certain time-length calculating means and speed information previous to the certain length of time among the speed information stored in the acquired information storing means;

speed computing means for computing a speed of the driven body based on the speed information acquired by the acquisition means and a predetermined amount of displacement of the driven body in a case where the certain length of time is shorter than the speed information previous to the certain length of time while computing a provisional speed of the driven body based on the speed information acquired by the acquisition means and a predetermined amount of displacement of the driven body and then subtracting a predetermined value from the provisional speed to compute the speed of the driven body in a case where the certain length of time is not shorter than the speed information previous to the certain length of timer based on a comparison result of the time-length comparing means; and control means for controlling the drive means based on the speed computed by the speed computing means.

Furthermore, in the invention, it is preferable that the speed computing means computes:

the speed of the driven body based on the speed information acquired by the acquisition means and the predetermined amount of displacement of the driven body in the case where the certain length of time is shorter than the speed information previous to the certain length of time based on the comparison result of the time-length comparing means; and the speed of the driven body by computing a provisional speed of the driven body based on the speed information acquired by the acquisition means and the predetermined amount of displacement of the driven body, and then multiplying the provisional speed by a predetermined damping rate, in the case where the certain length of time is not shorter than the speed information previous to the certain length of time.

Furthermore, in the invention, it is preferable that the damping rate is set to become lower as the certain length of time becomes longer.

Furthermore, the invention provides a control method of controlling drive means, the control method comprising:

acquiring a pulse signal having a period that corresponds to a speed of a driven body being driven and displaced by the drive means;

detecting either a rising or falling edge of the pulse signal;

starting timekeeping from a time point when the edge is detected;

computing, after the edge is detected by the edge detecting means, a period between the presently edge and an immediately previously detected edge;

comparing means comparing lengths of time between a kept measurement time and the latest period of edge computed; and outputting a value of either the measurement time or the period, whichever is longer based on a comparison result.

Furthermore, the invention provides a control method of controlling drive means, the control method comprising:

acquiring at regular or irregular intervals speed information that corresponds to a predetermined amount of displacement of a driven body being driven and displaced by the drive means;

determining whether or not the acquired speed information is a constant value within a predetermined range over a predetermined time immediately before being acquired;

outputting a control value that is a sum of the speed information and a predetermined value in a case where the acquired speed information is a constant value, and outputting the speed information as a control value in a case where the acquired speed information is not a constant value;

computing the speed of the driven body based on the outputted control value and the predetermined amount of displacement of the driven body; and controlling the drive means based on the computed speed.

BRIEF DESCRIPTION OF DRAWINGS

Objects, features, and advantages of the invention will be more explicit from the following detailed description taken with reference to the drawing, wherein.

BEST MODE FOR CARRYING OUT THE INVENTION

Figure 1:
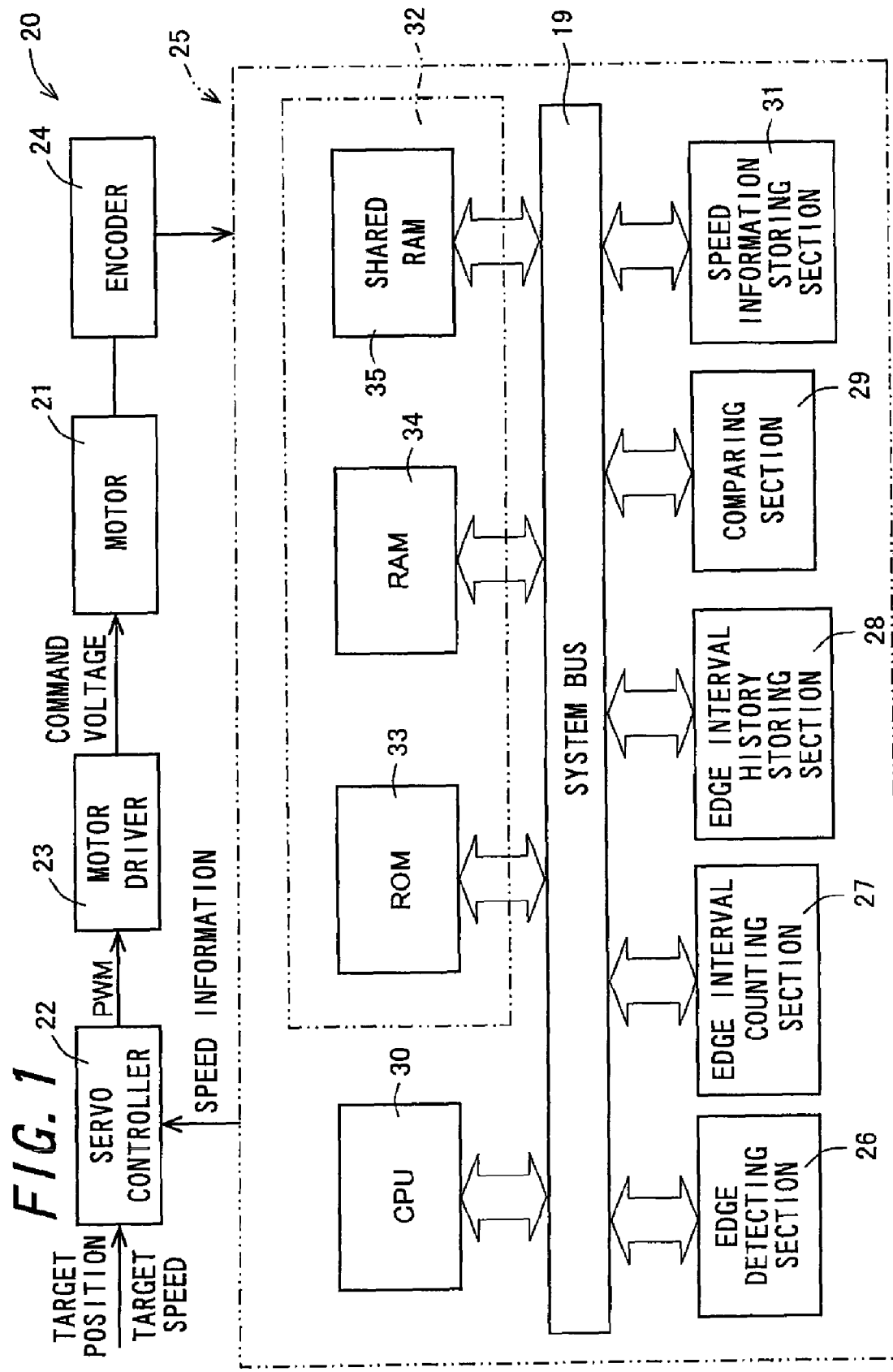
FIG. 1 is a block diagram schematically showing an electrical configuration of a servo control system according to a first embodiment of the invention.

Now referring to the drawings, preferred embodiments of the invention are described below.

A plurality of embodiments for implementing the invention will be explained hereinbelow with reference to the drawings. In each embodiment, a part corresponding to a component explained in a preceding embodiment will be denoted by the same reference numeral and may not be explained again. In the case where only a part of a configuration is explained, the other parts of the configuration are supposed to be the same as those explained in a preceding embodiment. It is possible to combine not only the parts specifically explained in the respective embodiments, but also partially combine the embodiments with each other unless such a combination causes any problems. The condition for starting each flowchart is not necessarily limited to the stated starting condition.

FIG. 1 is a block diagram schematically showing an electrical configuration of a servo control system 20 according to a first embodiment of the invention. The servo control system 20 performs a servo control on drive means such as a motor 21 by feeding back speed information of a driven body being displaced by the drive means.

The servo control system 20 is a device for controlling the drive means driving the driven body. The drive means is realized by a drive source such as the motor 21. The drive means is mounted in an inkjet apparatus, for example, and if it is an automatic sheet feeder (ASF) motor which feeds a recording medium to a print position, the driven body corresponds to the recording medium. Accordingly, the servo control system 20 controls the ASF motor so that the recording medium can be brought to a desired print position with high accuracy. The servo control system 20 includes a servo controller 22, a motor driver 23, a motor 21, an encoder 24, and an encoder signal control section 25.

The servo controller 22 has target position and target speed inputted thereto and controls the motor 21 so that the driven body reaches the target speed and the target position. In a servo period having a predetermined interval, the servo controller 22 reads out the speed information of driven body stored in the encoder signal control section 25. On the basis of the speed information of driven body read out from the encoder signal control section 25 as well as the inputted target position and target speed, the servo controller 22 carries out computing and outputs to the motor driver 23 the most suitable control information treated with pulse width modulation (abbreviated as PWM), for example.

The motor driver 23 outputs command voltage to the motor 21 according to the inputted control information. The motor 21 is realized by a DC motor and has a motor shaft which rotates based on the command voltage given by the motor driver 23.

Figure 35:
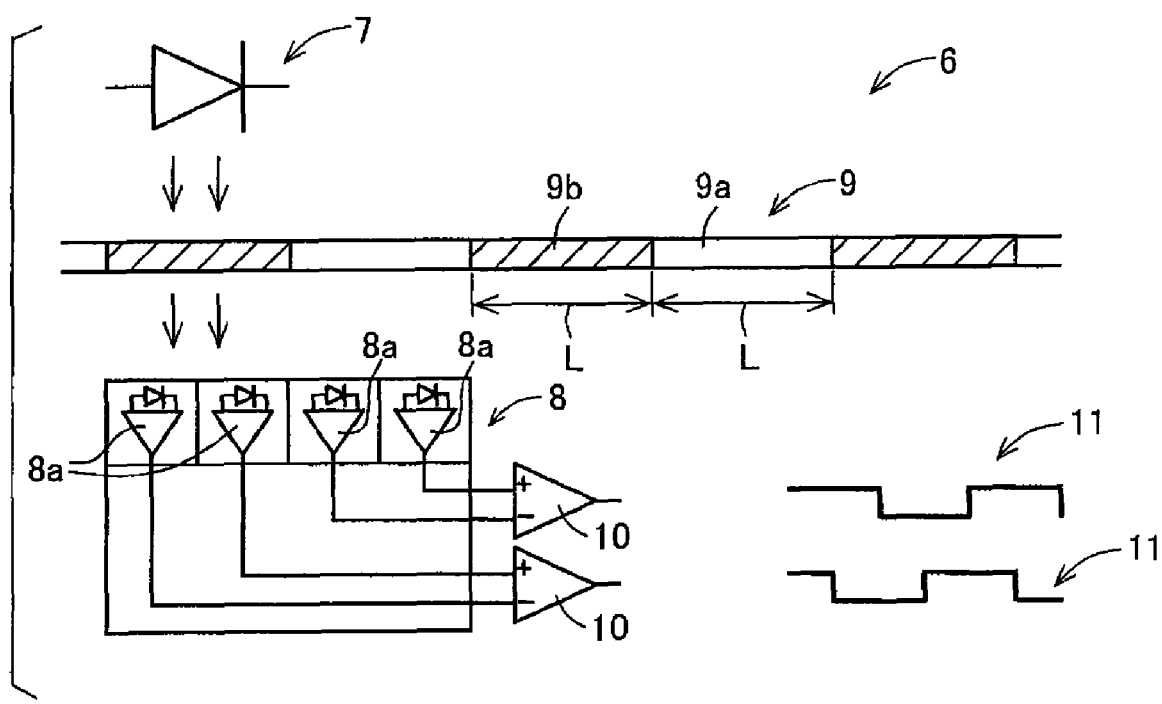
FIG. 35 is a view simplistically showing a configuration of an encoder of the conventional art.
Figure 36:
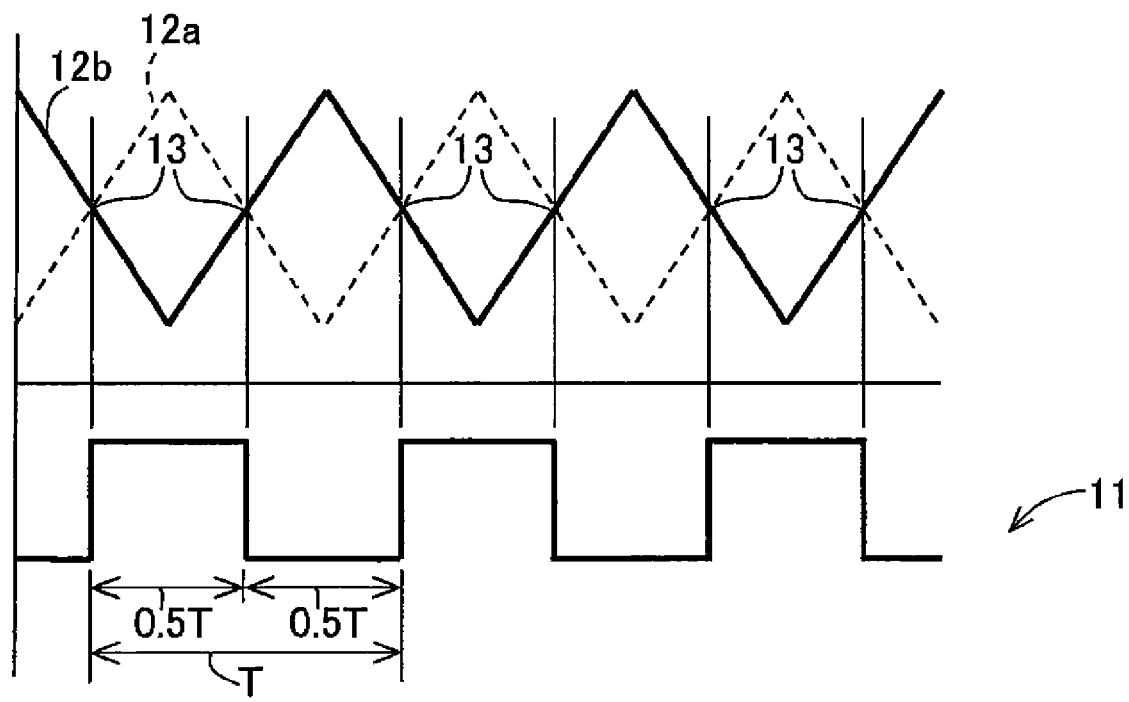
FIG. 36 is a view showing a waveform of a differential output signal outputted by a comparator and waveforms of two electric signals inputted to the comparator.
Figure 37:
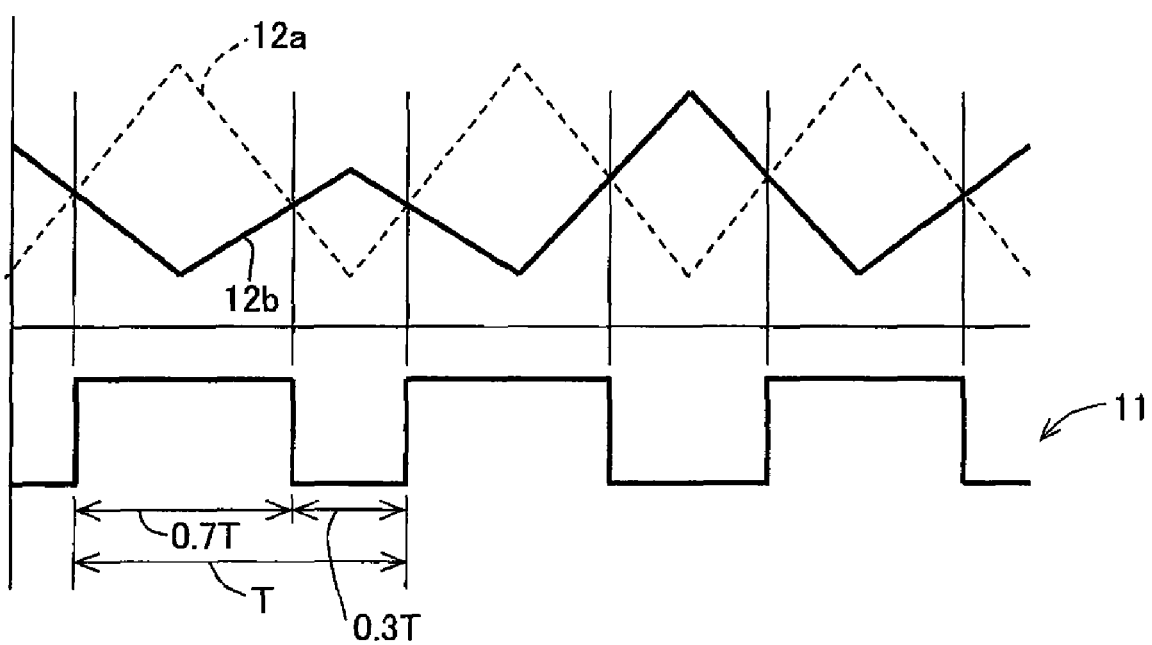
FIG. 37 is a view showing a waveform of the differential output signal outputted by the comparator and waveforms of the two electric signals inputted to the comparator, which shown waveforms are produced in a case where there is a difference in sensitivity of photodiodes.

The encoder 24 produces a pulse signal 36 having a period related to a speed of the driven body which is driven by the motor 21 to be displaced, and outputs the produced signal to the encoder signal control section 25. The encoder 24 is realized by the same configuration as that of the encoder 6 which has been explained in relation to FIG. 35, for example. Consequently, the period of the pulse signal 36 is identical to a length of the time for the driven body to be displaced by a predetermined amount of displacement as described above. The predetermined amount of displacement is determined depending on a distance 2L between a light-transmitting part 9a and a non-light-transmitting part 9b provided in the above-described code wheel 9.

The encoder signal control section 25 is a control device and computes the speed information based on the pulse signal 36 given by the encoder 24, then giving the computed speed information to the servo controller 22. The encoder signal control section 25 includes an edge detecting section 26, an edge interval counting section 27, an edge interval history storing section 28, a comparing section 29, a speed information storing section 31, a setting information storing section 32, and a central processing unit (abbreviated as CPU) 30, and the constituents listed above are electrically connected to one another by a system bus 19.

The edge detecting section 26 is edge detecting means and detects an edge of the pulse signal 36 given by the encoder 24. Now, the edge includes a rising edge or falling edge of the pulse signal 36.

The edge interval counting section 27 is timer means and starts timekeeping from a time point when an edge is detected by the edge detecting section 26. Accordingly, the edge interval counting section 27 starts to count from a default value every time an edge is detected. Further, the edge interval counting section 27 has a function of computing means, and after an edge is detected by the edge detecting section 26, it computes a period between the presently edge and an immediately previously detected edge. Consequently, the edge interval counting section 27 computes a period from a rising edge to a falling edge or a period from a falling edge to a rising edge, of the pulse signal 36, and gives the computed period to the edge interval history storing section 28.

The edge interval history storing section 28 stores in chronological order the period given by the edge interval counting section 27. The comparing section 29 is comparing means and compares lengths of time between a measurement time kept by the edge interval counting section 27 and the latest period stored in the edge interval history storing section 28, then giving the comparison result to the CPU 30. Consequently, from when an edge is detected till when next edge is detected, the comparing section 29 compares an elapsed time from when the edge with the period from a time point of detection of the edge to the last edge, that is, a last edge interval.

The CPU 30 is output means and outputs speed information to the speed information storing section 31, which information is a value of either the compared measurement time or period based on the comparison result of the comparing section 29. The CPU 30 is realized by a microcomputer, for example.

The speed information storing section 31 stores in chronological order the speed information given by the CPU 30. As described above, the servo controller 22 reads out the latest speed information stored in the speed information storing section 31 for every predetermined servo period, and then computes control information based on the read-out speed information.

The setting information storing section 32 stores various setting in a short or long term. The setting information storing section 32 includes, for example, a read only memory (abbreviated as ROM) 33 in which control programs and the like being used for various controls are stored, a random access memory (abbreviated as RAM) 34 in which temporary information being used for processing of the CPU 30 is stored, and a shared RAM 35 in which temporary information being used for processing of various constituents is stored. Accordingly, the CPU 30 executes the control programs stored in the ROM 33 and controls the constituents.

Figure 2:
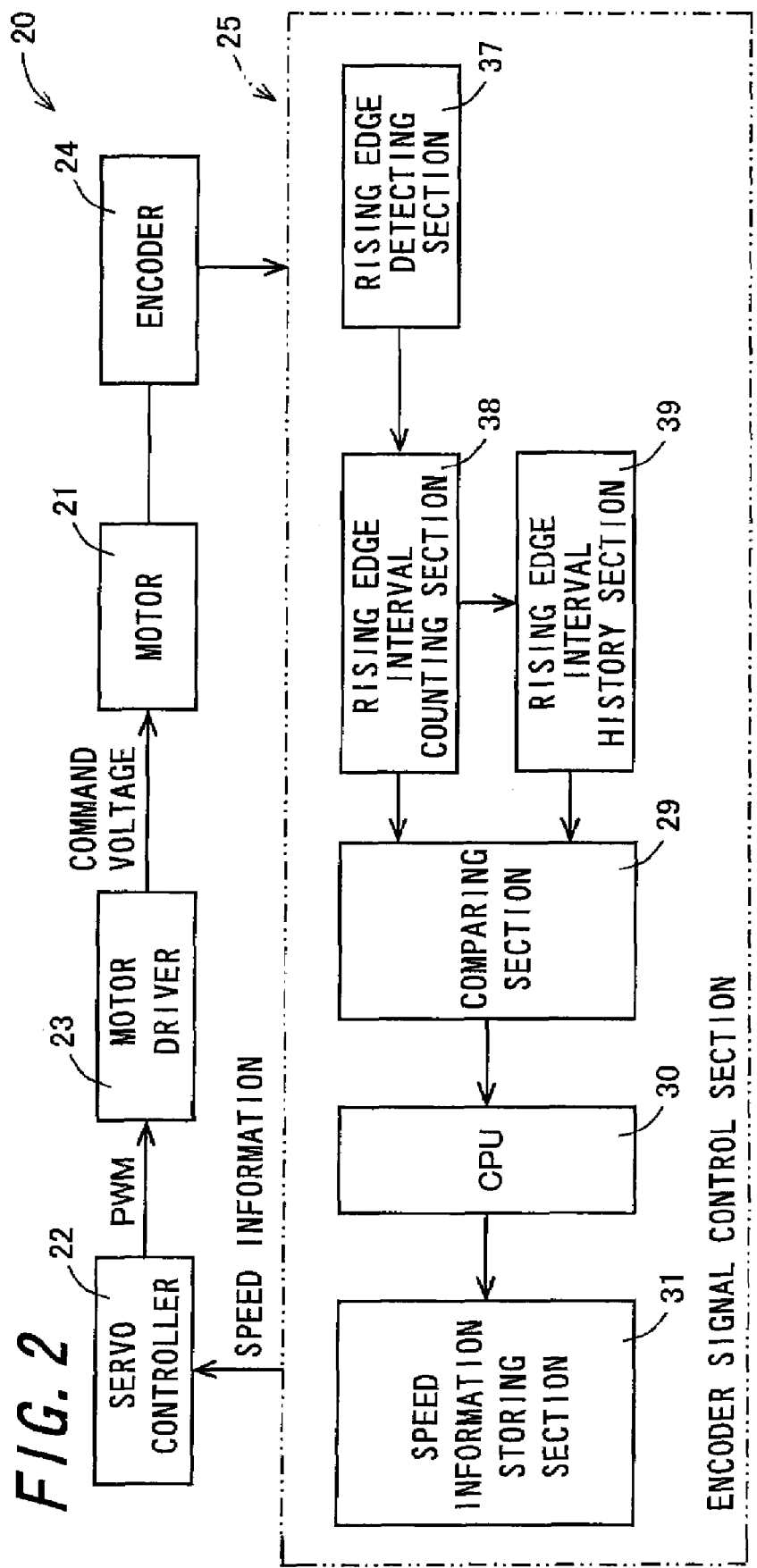
FIG. 2 is a block diagram schematically showing an electrical configuration of the servo control system according to the first embodiment of the invention.

FIG. 2 is a block diagram showing an electrical configuration of the servo control system 20 according to the first embodiment of the invention. In FIG. 2, a main configuration of the encoder signal control section 25 is shown while the other parts of the configuration including, for example, the setting information storing section 32, are the same as those shown in FIG. 1 and therefore not shown. The encoder signal control section 25 shown in FIG. 2 has a configuration of detecting a rising edge of the pulse signal 36 and computing the speed information. The encoder signal control section 25 of the present embodiment detects a rising edge of the pulse signal 36 and performs controls based on the rising edge.

A rising edge detecting section 37 serves as the edge detecting section 26 and detects the rising edge of the pulse signal 36 given by the encoder 24. A rising edge interval counting section 38 serves as the edge interval counting section 27 and starts timekeeping from a time point when a rising edge is detected by the rising edge detecting section 37.

The rising edge interval counting section 38 gives the kept rising measurement time to the comparing section 29. Further, after a rising edge is detected by the rising edge detecting section 37, the rising edge interval counting section 38 computes a period between the presently detected rising edge and the immediately previously detected rising edge, and gives the computed rising period to a rising edge interval history section 39.

The rising edge interval history section 39 stores in chronological order the rising period given by the rising edge interval counting section 38. The comparing section 29 compares lengths of time between the rising measurement time kept by the rising edge interval counting section 38 and the latest rising period stored in the rising edge interval history section 39, and then gives the comparison result to the CPU 30.

The CPU 30 outputs to the speed information storing section 31a value of either the rising measurement time or the rising period, whichever is longer based on the comparison result of the comparing section 29. The speed information storing section 31 stores in chronological order the speed information given by the CPU 30.

Figure 3:
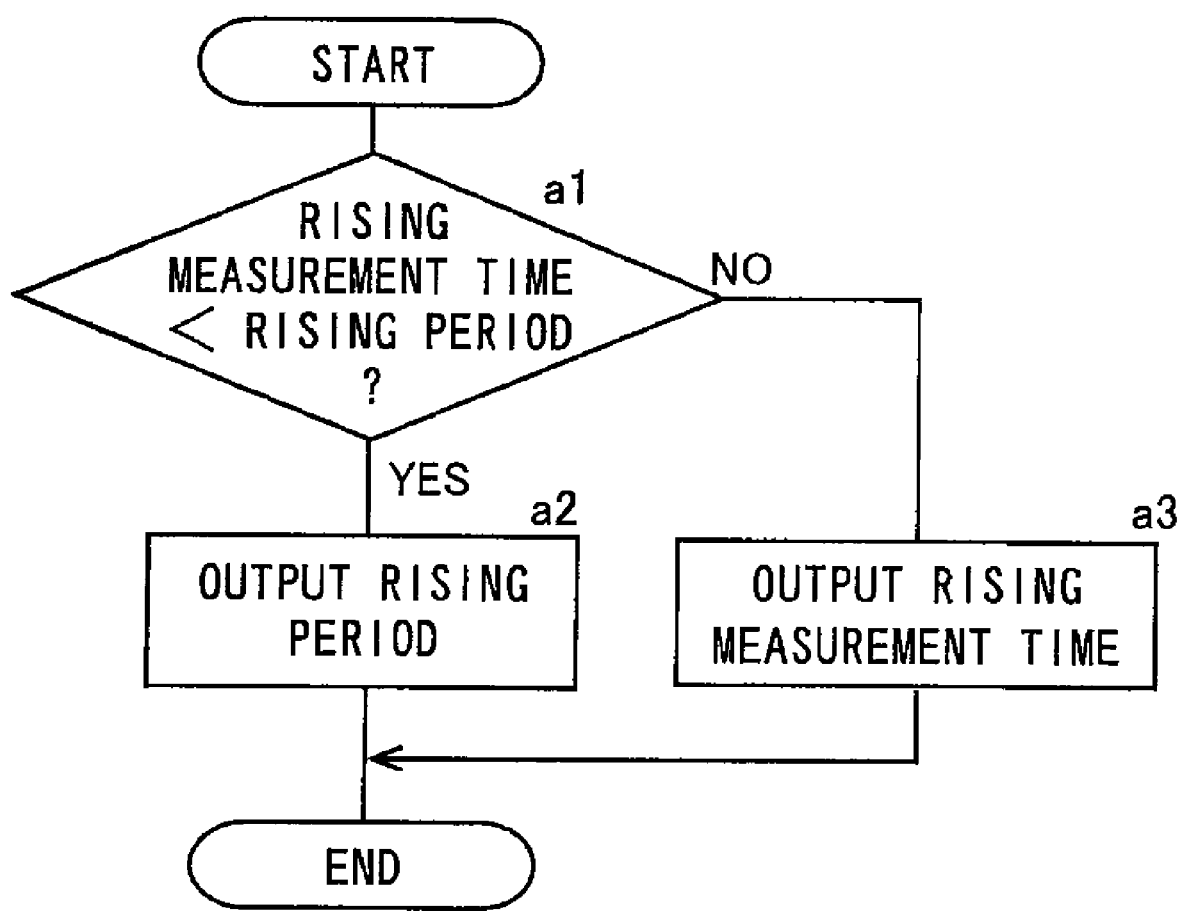
FIG. 3 is a flowchart showing processing in a CPU of an encoder signal control section.
Figure 4:
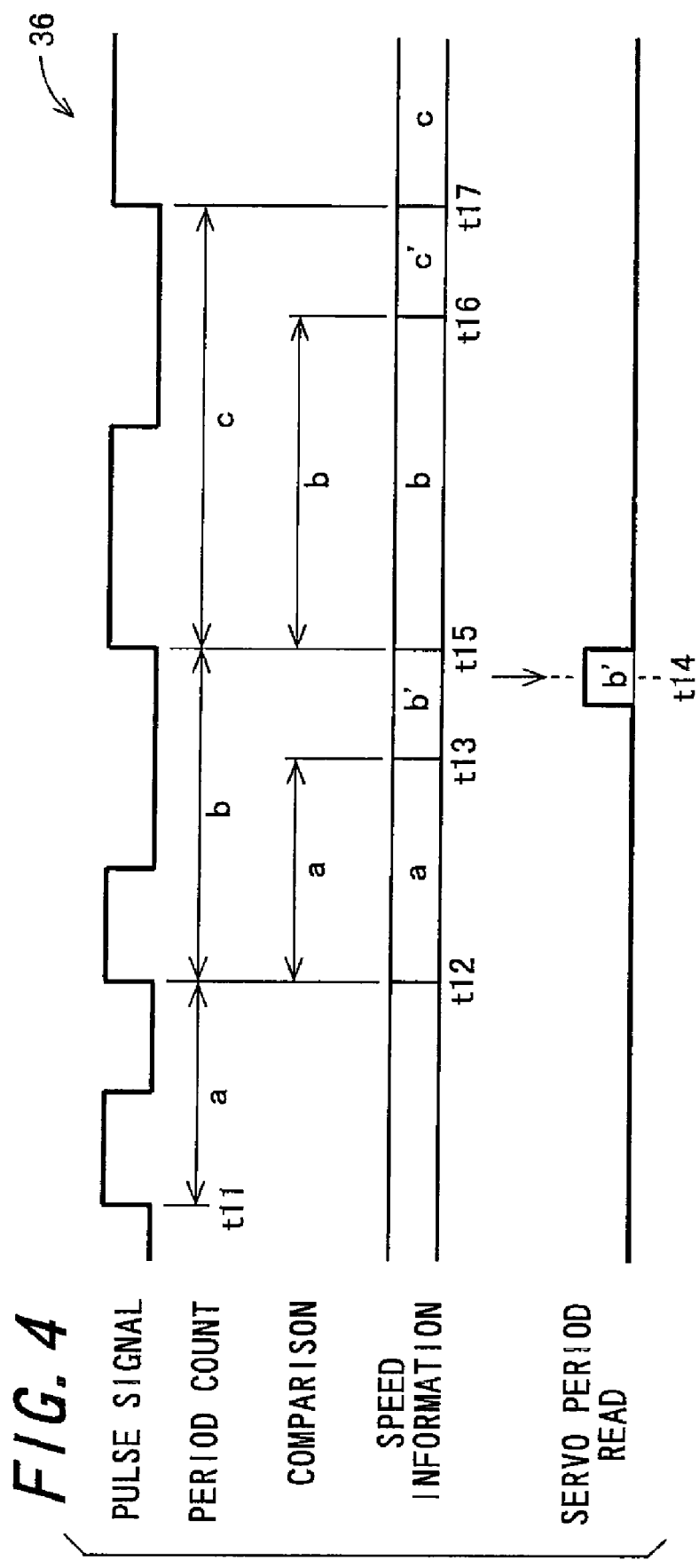
FIG. 4 is a timing chart for explaining operation of the CPU shown in FIG. 3.

Next, operation of the encoder signal control section 25 will be explained with use of a flowchart. Each operation of the flowchart is carried out by the CPU 30 of the encoder signal control section 25. FIG. 3 is a flowchart showing processing in the CPU 30 of the encoder signal control section 25. The processing is carried out repeatedly in a power-on state. FIG. 4 is a timing chart for explaining operation of the CPU 30. The timing chart shown in FIG. 4 is associated with the operation of the CPU 30 shown in FIG. 3.

In Step a1, the lengths of time are compared between the rising measurement time kept by the rising edge interval counting section 38 and the latest rising period stored in the rising edge interval history section 39. In the case where the rising measurement time is shorter than the rising period, the procedure proceeds to Step a2, and in the case where the rising measurement time is not shorter than the rising period, the procedure proceeds to Step a3.

In Step a2, the latest rising period stored in the rising edge interval history section 39 is outputted, and the present flow ends. In Step a3, the rising measurement time kept by the rising edge interval counting section 38 is outputted, and the present flow ends.

Referring to FIG. 4 for explaining such operation, of the pulse signal 36, a rising edge is detected at a time point t11 and after a rising period a has elapsed since the time point t11, a rising edge is detected again at a time point t12. Because the rising measurement time b' kept from the time point t12 is shorter than the rising period a from the time point t12 to a time point t13 at which the last rising period a has elapsed, the CPU 30 outputs the last rising period a as the speed information. Further, because the rising measurement time b' is longer after the time point 13 from the time point t13 to a time point t15 at which a next rising edge is detected, the CPU 30 outputs the rising measurement time b' as the speed information.

Likewise, because a rising measurement time c' kept from the time point t15 is shorter than the period b from the time point 15 to a time point t16 at which the last rising period b has elapsed, the CPU 30 outputs the last rising period b as the speed information. Further, because the rising measurement time c' is longer after the time point t16 from the time point t16 to a time point t17 at which a next rising edge is detected, the CPU 30 outputs the rising measurement time c' as the speed information. Consequently, in the case where the servo period is at a time point t14 located between the time point t13 and the time point t15, the speed information is the rising measurement time b' as shown in FIG. 4.

Figure 5:
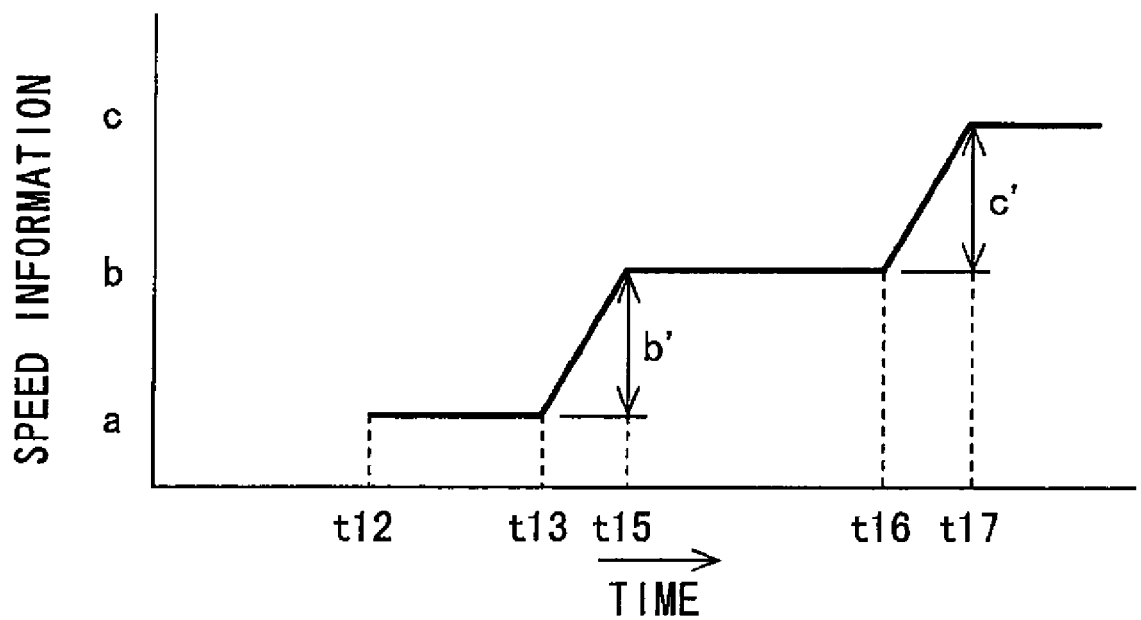
FIG. 5 is a graph showing a relationship between speed information and time.
Figure 6:
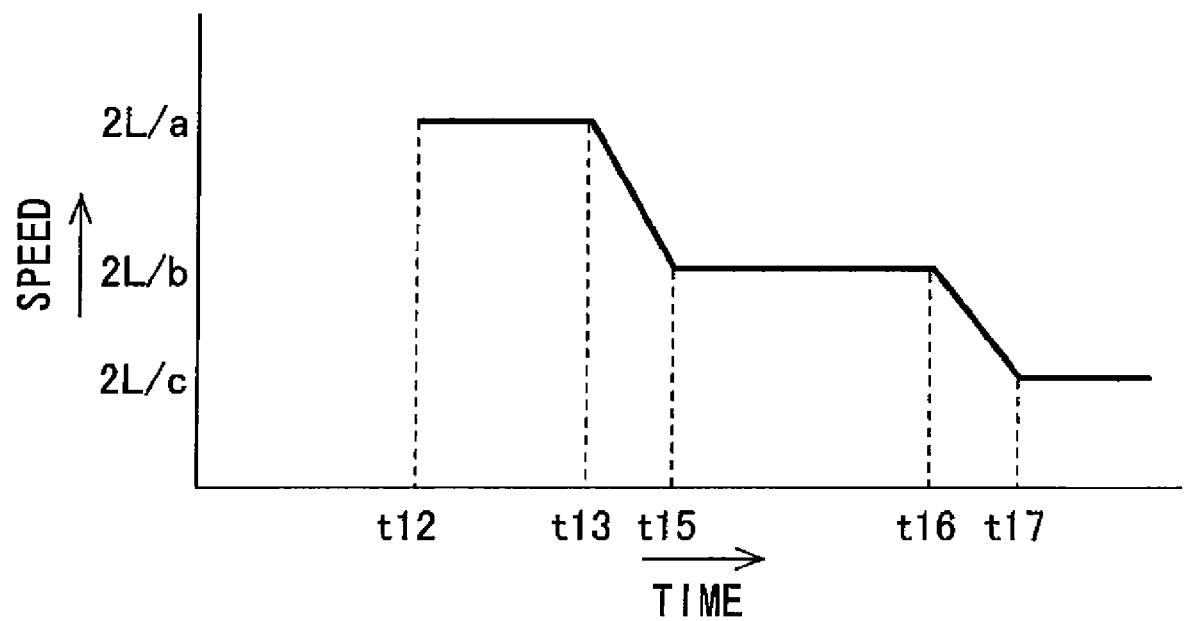
FIG. 6 is a graph showing a relationship between speed and time.

FIG. 5 is a graph showing a relationship between speed information and time. FIG. 6 is a graph showing a relationship between speed and time. FIGS. 5 and 6 are associated with the timing chart shown in FIG. 4. The speed shown in FIG. 6 is a value obtained by dividing by the speed information shown in FIG. 5 the distance 2L between a light-transmitting part and a non-light transmitting part provided in the above-described code wheel. As shown in FIG. 5, the speed information is the rising period a from the time point t12 to the time point t13. Further, from the time point t13 to the time point t15, the speed information is the rising measurement time b' kept by the rising edge interval counting section 38. A value obtained by dividing the speed information is regarded as a speed detected by the driven body and shown in FIG. 6.

As described above, the encoder signal control section 25 of the present embodiment compares the lengths of time between the rising measurement time kept by the rising edge interval counting section 38 and the rising period of the latest rising edge stored in the rising edge interval history section 39, and outputs a value of either the rising measurement time or the rising period, whichever is longer based on the comparison result. In the conventional art, the latest rising period is merely outputted until detection of next rising period, but in the encoder signal control section 25 of the present embodiment, the rising measurement time is outputted in the case where the rising measurement time is longer than the latest rising period, with the result that the period of the pulse signal 36 can be accurately predicted and be a real-time approximate. This allows for accurate calculation of the speed of the driven body based on the accurately outputted period of the pulse signal 36. Consequently, the accuracy in detecting the speed of the driven body can be enhanced so that the drive means can be stably controlled.

Further, in the present embodiment, the CPU 30 compares the lengths of time between the rising measurement time kept by the rising edge interval counting section 38 and the latest rising period stored in the rising edge interval history section 39, and outputs a value of either the rising measurement time or the rising period, whichever is longer based on the comparison result, but the configuration is not limited thereto and may be adapted to output a sum of the rising measurement time and a predetermined additional time in a case where the rising measurement time is not shorter than the latest falling period.

The additional time is set at, for example, the shortest sampling period for sampling the speed information, and set at 500 ns, for example. Such addition of the additional time makes the rising measurement time longer with the lapse of time as shown in FIG. 5 in a case where the rising measurement time is not shorter than the rising period, and it is therefore possible to obtain a value more approximate to actual speed information of the driven body by adding the additional time in advance. For example, the rising measurement time b' can be approximate to the rising period b by adding the additional time. This allows for more accurate calculation of the speed of the driven body.

Such an additional time is appropriately set based on its sampling period. A too short additional time will make the above approximating effect small while a too long additional time may lead to the resultant excessively longer than the period to be approximated, with the result that the additional time is preferably set based on the sampling period as described above.

Figure 7:
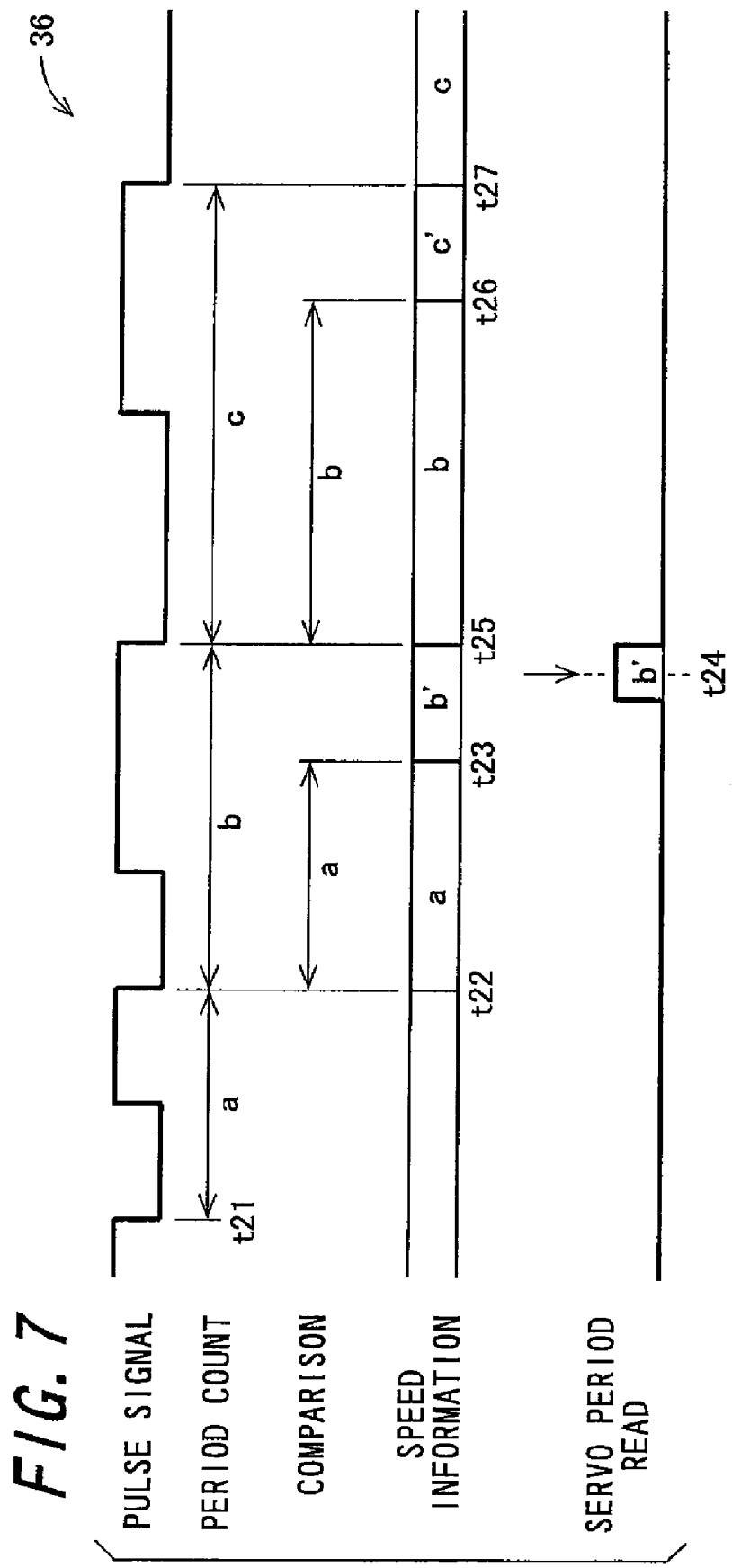
FIG. 7 is a timing chart for explaining operation of the CPU according to the present example.

Next, an encoder signal control section 25 according to another example of the present embodiment will be explained. FIG. 7 is a timing chart for explaining operation of the CPU 30 according to the present example. The encoder signal control section 25 according to the present example is different from the above-described encoder signal control section 25 in that a falling edge of the pulse signal 36 is detected and controls are carried out based on the falling edge.

Referring to FIG. 7 for explaining the operation of the CPU 30 of such an encoder signal control section 23, of the pulse signal 36, a falling edge is detected at a time point t21 and after a falling period a has elapsed since the time point t21, a falling edge is detected again at a time point t22. Because the falling measurement time b' kept from the time point t22 is shorter than the falling period a from the time point t22 to a time point t23 at which the last falling period a has elapsed, the CPU 30 outputs the last falling period a as the speed information. Further, because the falling measurement time b' is longer after the time point t23 from the time point t23 to a time point t25 at which a next falling edge is detected, the CPU 30 outputs the falling measurement time b' as the speed information.

Likewise, because a falling measurement time c' kept from the time point t25 is shorter than the period b from the time point 25 to a time point t26 at which the last falling period b has elapsed, the CPU 30 outputs the last falling period b as the speed information. Further, because the falling measurement time c' is longer after the time point t26 from the time point t26 to a time point t27 at which a next falling edge is detected, the CPU 30 outputs the falling measurement time c' as the speed information. Consequently, the encoder signal control section 25 of the present example can achieve the same operation and effect as those of the above-described encoder signal control section 25.

Figure 8:
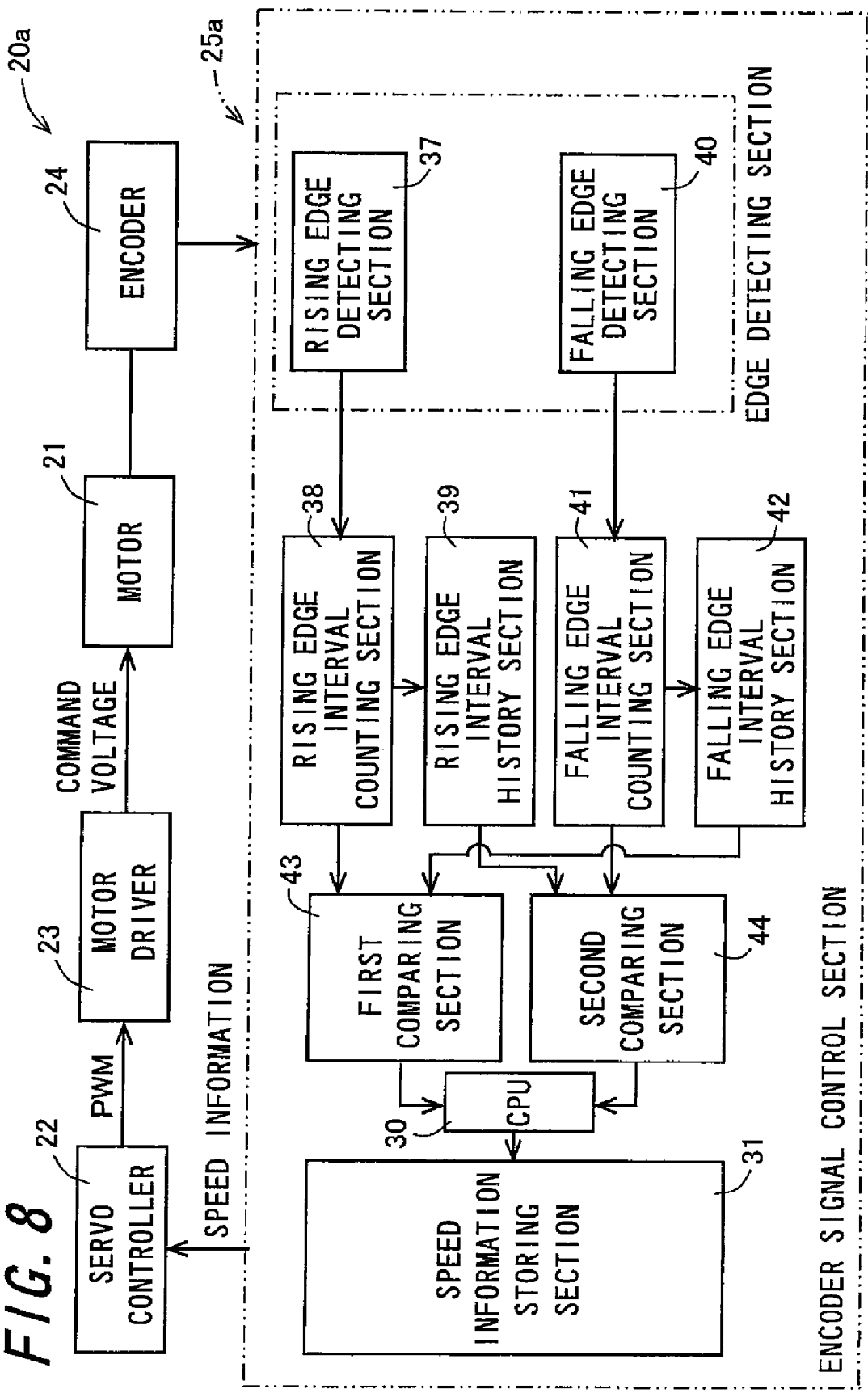
FIG. 8 is a block diagram showing an electrical configuration of a servo control system according to a second embodiment of the invention.

Next, a servo control system 20a according to a second embodiment of the invention will be explained. FIG. 8 is a block diagram showing an electrical configuration of the servo control system 20a according to the second embodiment of the invention. In FIG. 8, a main configuration of an encoder signal control section 25a is shown while the other parts of the configuration including, for example, the setting information storing section 32, are the same as those shown in FIG. 1 and therefore not shown. The encoder signal control section 25a shown in FIG. 8 has a configuration of detecting a rising edge and a falling edge, individually, of the pulse signal 36 and computing the speed information. The encoder signal control section 25a of the present embodiment is similar to the above-described encoder signal control section 25 according to the first embodiment and includes a falling edge detecting section 40, a falling edge interval counting section 41, and a falling edge interval history section 42 in addition to the encoder signal control section 25 according to the first embodiment. Further, the comparing section 29 according to the first embodiment now includes a first comparing section 43 and a second comparing section 44.

The falling edge detecting section 40 detects the falling edge of the pulse signal 36 given by the encoder 24. The falling edge interval counting section 41 serves as falling timer means and starts timekeeping from a time point when a falling edge is detected by the falling edge detecting section 40.

The falling edge interval counting section 41 gives the kept falling measurement time to the second comparing section 44. Further, after a falling edge is detected by the falling edge detecting section 40, the falling edge interval counting section 41 computes a falling period between the presently detected falling edge and the immediately previously detected falling edge, and then gives the computed falling period to the falling edge interval history section 42.

The falling edge interval history section 42 stores in chronological order the falling period given by the falling edge interval counting section 41.

The first comparing section 43 is first comparing means and compares lengths of time between the rising measurement time kept by the rising edge interval counting section 38 and the latest falling period stored in the falling edge interval history section 42, and then gives the comparison result to the CPU 30. The second comparing section 44 is second comparing means and compares lengths of time between the falling measurement time kept by the falling edge interval counting section 41 and the latest rising period stored in the rising edge interval history section 39, and then gives the comparison result to the CPU 30.

From when the falling edge of the pulse signal 36 is detected till when the rising edge of the pulse signal 36 is detected, the CPU 30 outputs a value of either the rising measurement time or the falling period, whichever is longer based on the comparison result of the first comparing section 43. Further, from when the rising edge of the pulse signal 36 is detected till when the falling edge of the pulse signal 36 is detected, the CPU 30 outputs a value of either the falling measurement time or the rising period, whichever is longer based on the comparison result of the second comparing section 44.

Figure 9:
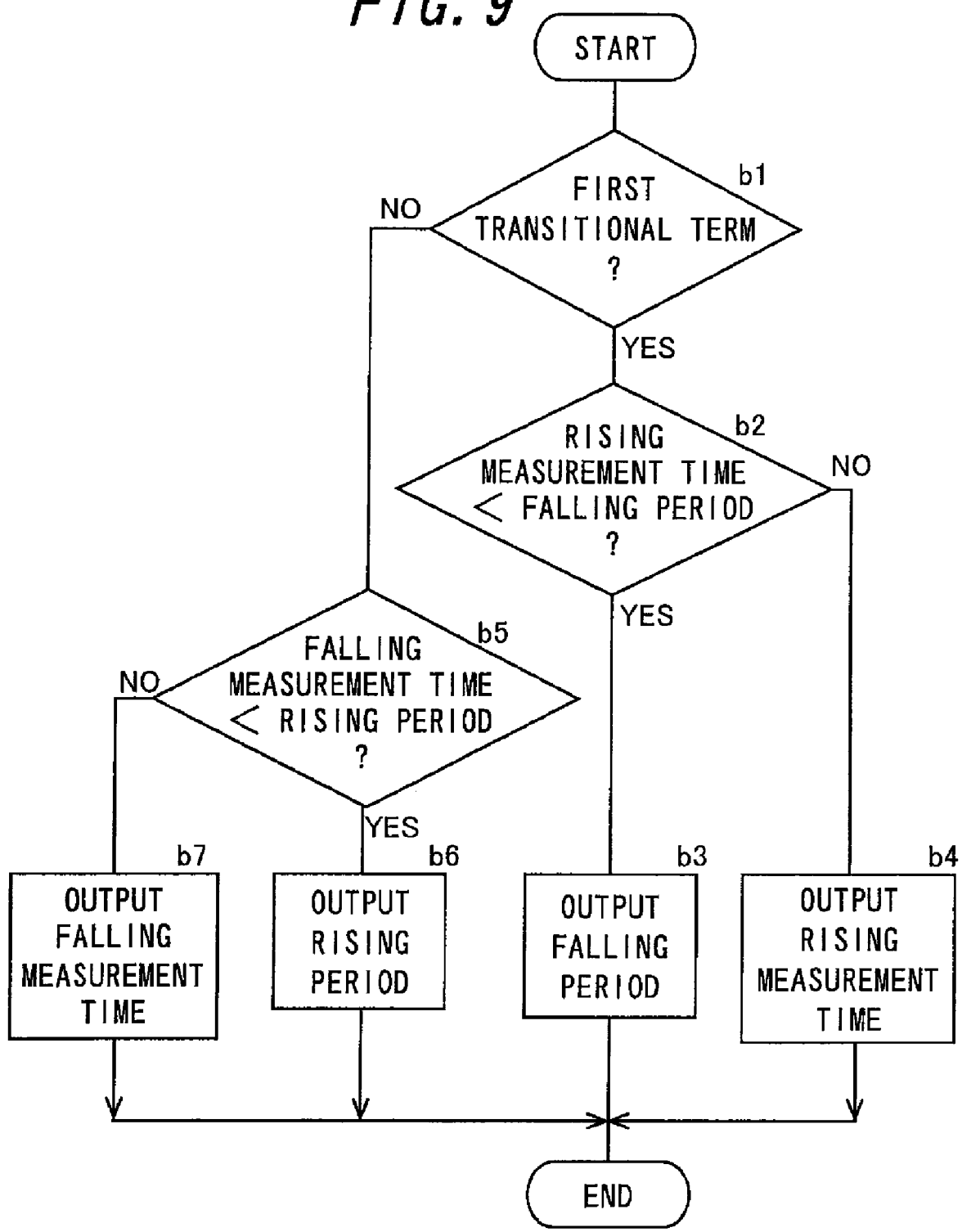
FIG. 9 is a flowchart showing processing in a CPU of an encoder signal control section.
Figure 10:
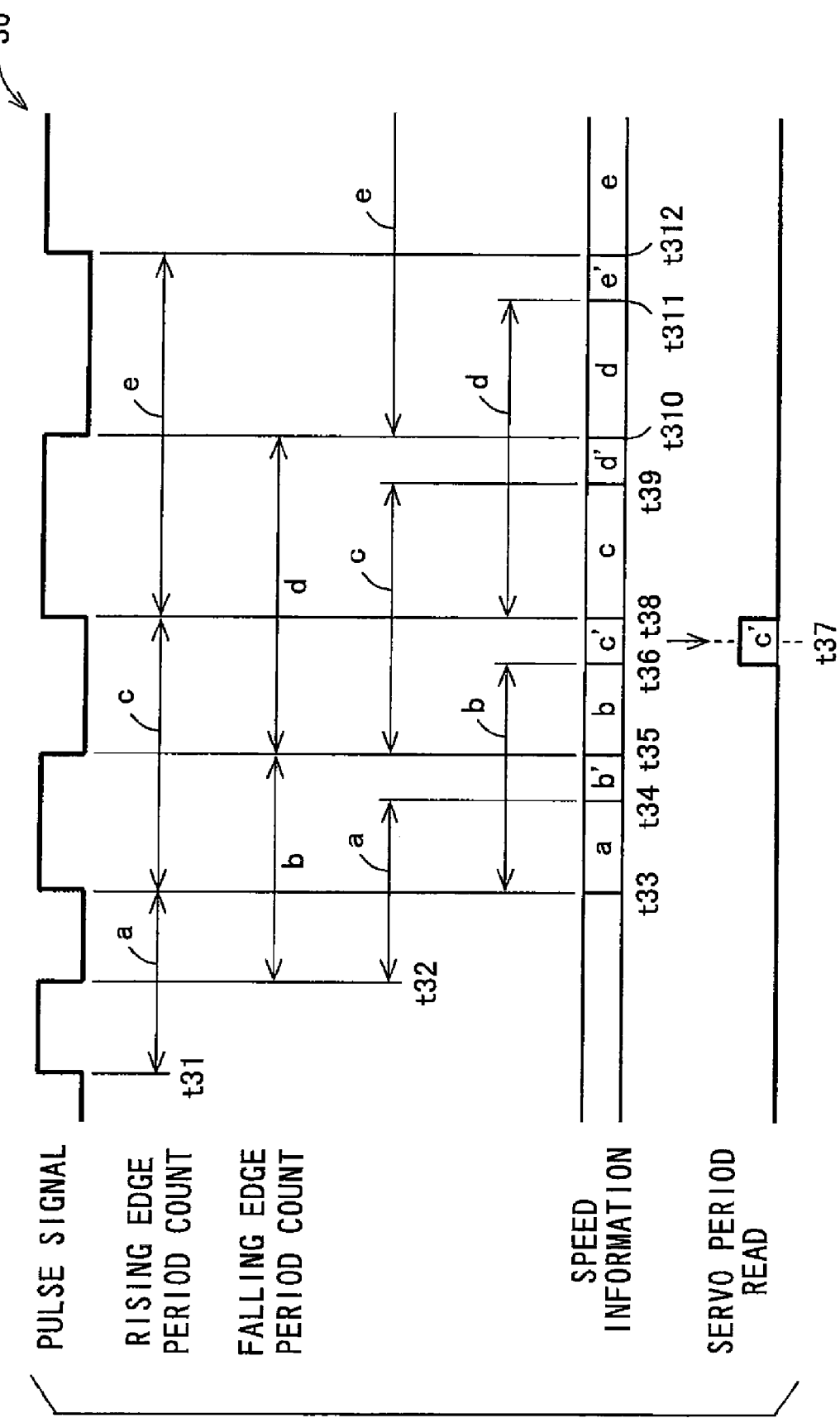
FIG. 10 is a timing chart for explaining operation of the CPU shown in FIG. 9.

Next, operation of the encoder signal control section 25a will be explained with use of a flowchart. FIG. 9 is a flowchart showing processing in the CPU 30 of the encoder signal control section 25a. The processing is carried out repeatedly in a power-on state. FIG. 10 is a timing chart for explaining operation of the CPU 30. The timing chart shown in FIG. 10 is associated with the operation of the CPU 30 shown in FIG. 9.

In Step b1, it is determined whether or not the current time falls within the first transitional term lasting from when the falling edge is detected till when the rising edge is detected. In the case where the current time falls within the first transitional term, the procedure proceeds to Step b2, and in the case where the current time does not fall within the first transitional term, the procedure proceeds to Step b5.

In Step b2, because the current time is within the first transitional term, lengths of time are compared between the rising measurement time kept by the rising edge interval counting section 38 and the latest falling period stored in the falling edge interval history section 42. In the case where the rising measurement time is shorter than the falling period, the procedure proceeds to Step b3, and in the case where the rising measurement time is not shorter than the falling period, the procedure proceeds to Step b4.

In Step b3, the latest falling period stored in the falling edge interval history section 42 is outputted, and the present flow ends. In Step b4, the rising measurement time kept by the rising edge interval counting section 38 is outputted, and the present flow ends.

In Step b5, the current time is not within the first transitional term but is within the second transitional term lasting from when a rising edge of the pulse signal 36 is detected till when a falling edge of the pulse signal 36 is detected, lengths of time are compared between the falling measurement time kept by the falling edge interval counting section 41 and the latest rising period stored in the rising edge interval history section 39. In the case where the falling measurement time is shorter than the rising period, the procedure proceeds to Step b6, and in the case where the falling measurement time is not shorter than the rising period, the procedure proceeds to Step b7.

In Step b6, the latest rising period stored in the rising edge interval history section 39 is outputted, and the present flow ends. In Step b7, the falling measurement time kept by the falling edge interval counting section 41 is outputted, and the present flow ends.

Referring to FIG. 10 for explaining such operation, of the pulse signal 36, a rising edge is detected at a time point t31 and after a rising period a has elapsed since the time point t31, a rising edge is detected again at a time point t33. Of the pulse signal 36, a falling edge is detected at a time point t32 and after a falling period b has elapsed since the time point t32, a falling edge is detected again at a time point t35.

The second transitional term lasts from the time point t33 to the time point t35 and because the falling measurement time b' kept from the time point t32 is shorter than the rising period a from the time point t33 to the time point t34, the CPU 30 outputs as the speed information the last rising period, that is, the latest rising period, i.e., the rising period a. Further, because the falling measurement time b' kept from the time point t32 is longer from the time point t34 to the time point t35 at which a next falling edge is detected, the CPU 30 outputs the falling measurement time b' as the speed information.

The first transitional term lasts from the time point t35 to the time point t38 and because the rising measurement time c' kept from the time point t33 is shorter than the last falling period b from the time point t35 to the time point t36, the CPU 30 outputs as the speed information the last period, i.e., the falling period b. Further, because the rising measurement time c' kept from the time point t33 is longer from the time point t36 to a time point t38 at which a next rising edge is detected, the CPU 30 outputs the rising measurement time c' as the speed information.

Likewise, the second transitional term lasts from the time point t38 to a time point t310 and because the falling measurement time d' kept from the time point t35 is shorter than the rising period c from the time point t38 to the time point t39, the CPU 30 outputs the last rising period c as the speed information. Further, because the falling measurement time d' kept from the time point t35 is longer from the time point t39 to the time point t310 at which a next falling edge is detected, the CPU 30 outputs the falling measurement time d' as the speed information.

Likewise, the first transitional term lasts from the time point t310 to a time point t312 and because the rising measurement time e' kept from the time point t38 is shorter than the last falling period d from the time point t310 to the time point t311, the CPU 30 outputs the last falling period d as the speed information. Further, because the rising measurement time e' kept from the time point t38 is longer from the time point t311 to the time point t312 at which a next rising edge is detected, the CPU 30 outputs the rising measurement time e' as the speed information. Accordingly, at a time point t37 between the time point t36 and the time point t38, the speed information is the rising measurement time c' as shown in FIG. 10.

As described above, in the encoder signal control section 25a of the present embodiment, both of the rising edge and the falling edge of the pulse signal 36 are detected individually, and during the first transitional term lasting from when the falling edge of the pulse signal 36 is detected till when the rising edge of the pulse signal 36 is detected, a value is outputted of either the rising measurement time or the falling period, whichever is longer based on the comparison result of the first comparing section 43, while during the second transitional term from when the rising edge of the pulse signal 36 is detected till when the falling edge of the pulse signal 36 is detected, a value is outputted of either the falling measurement time or the rising period, whichever is longer based on the comparison result of the second comparing section 44. Intervals to be compared are therefore shorter than those between the rising edges or between the falling edges, with the result that the period of the pulse signal 36 can be accurately predicted and be a real-time approximate. This allows for accurate calculation of the speed of the driven body based on the accurately outputted period of the pulse signal 36. Consequently, the accuracy in detecting the speed of the driven body can be enhanced so that the drive means can be stably controlled.

Further, in the present embodiment, the CPU 30 outputs the rising measurement time in the case where the rising measurement time is not shorter than the falling period based on the comparison result of the first comparing section 43, but the configuration is not limited thereto and may be adapted to output a sum of the rising measurement time and a predetermined additional time. Likewise, although the CPU 30 outputs the falling measurement time in the case where the falling measurement time is not shorter than the rising period based on the comparison result of the second comparing section 44, but the configuration is not limited thereto and may be adapted to output a sum of the failing measurement time and a predetermined additional time. This makes it possible to achieve the above-described effect concerning the additional time.

Figure 11:
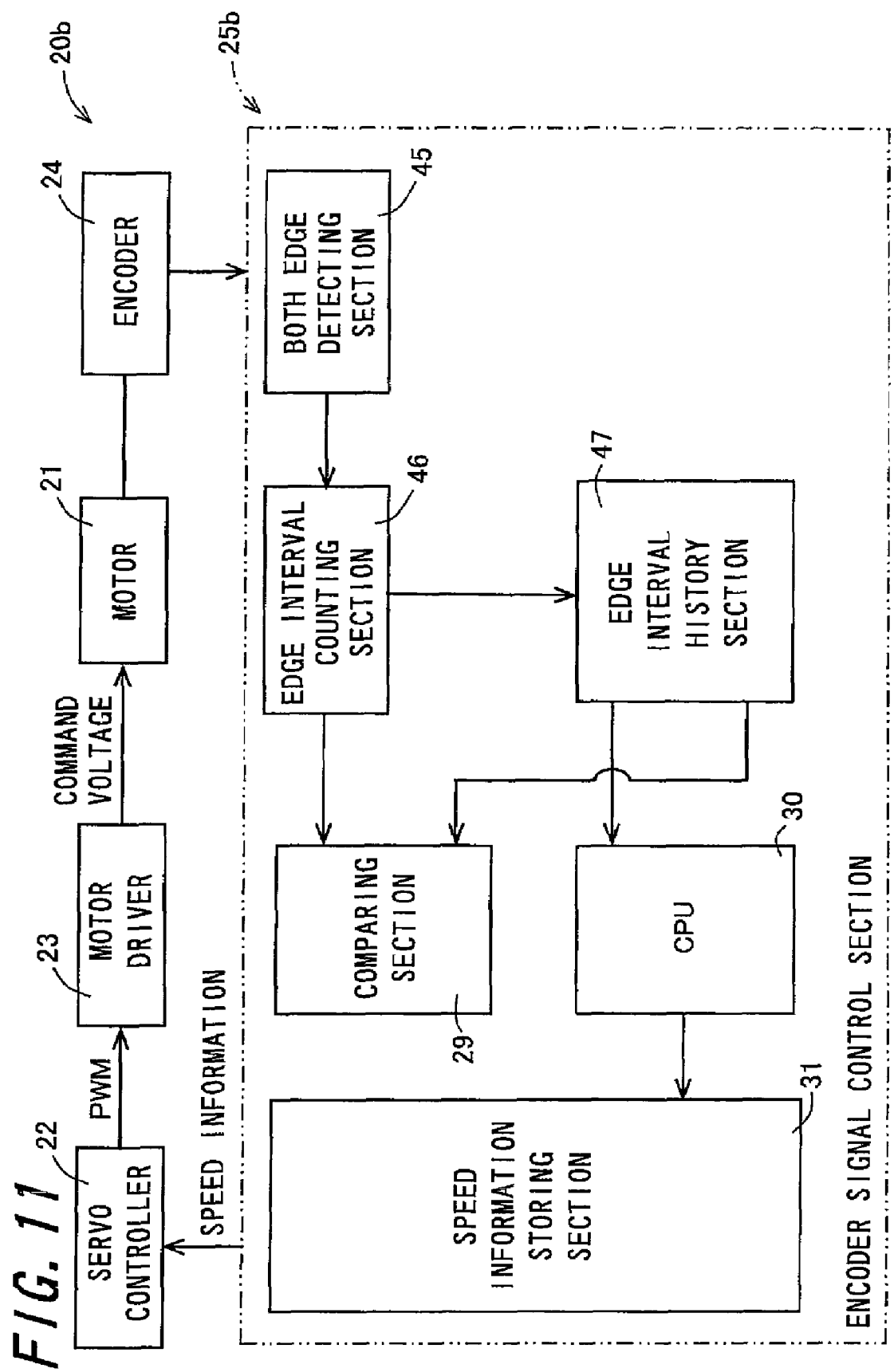
FIG. 11 is a block diagram showing an electrical configuration of a servo control system according to a third embodiment of the invention.

Next, a servo control system 20b according to a third embodiment of the invention will be explained. FIG. 11 is a block diagram showing an electrical configuration of the servo control system 20b according to the third embodiment of the invention. In FIG. 11, a main configuration of an encoder signal control section 25b is shown while the other parts of the configuration including, for example, the setting information storing section 32, are the same as those shown in FIG. 1 and therefore not shown. The encoder signal control section 25b shown in FIG. 11 has a configuration of detecting both of a rising edge and a falling edge of the pulse signal 36 and computing the speed information. The encoder signal control section 25b of the present embodiment is similar to the above-described encoder signal control section 25 according to the first embodiment and includes a both edge detecting section 45, an edge interval counting section 46, and an edge interval history section 47 in addition to the encoder signal control section 25 according to the first embodiment.

The both edge detecting section 45 detects an edge of the pulse signal 36 given by the encoder 24. The edge interval counting section 46 starts timekeeping from a time point when an edge is detected by the both edge detecting section 45.

The edge interval counting section 46 gives the kept edge measurement time to the comparing section 29. Further, after an edge is detected by the both edge detecting section 45, the edge interval counting section 46 computes an edge period between the presently edge and the immediately previously detected edge, and gives the computed edge period to the edge interval history section The edge interval history section 47 stores in chronological order the edge period given by the edge interval counting section 46.

The comparing section 29 compares lengths of time between the edge measurement time kept by the edge interval counting section 46 and the second last edge period stored in the edge interval history section 47 before a time point of detection of the edge, and then gives the comparison result to the CPU 30.

The CPU 30 outputs a sum of the latest edge period and a value of either the edge measurement time or the second last edge period, whichever is longer based on a comparison result of the comparing section 29.

Figure 12:
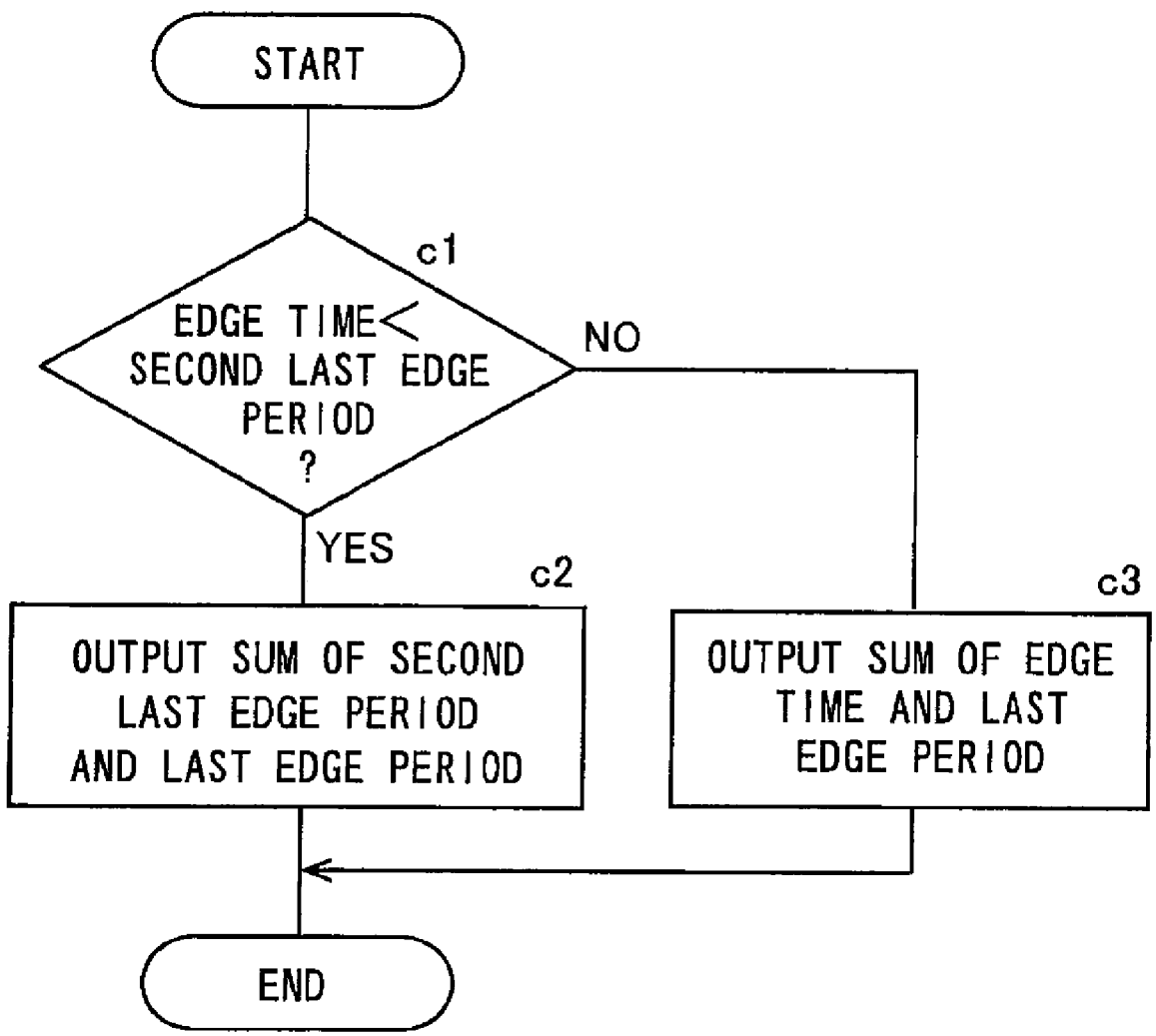
FIG. 12 is a flowchart showing processing in a CPU of an encoder signal control section.
Figure 13:
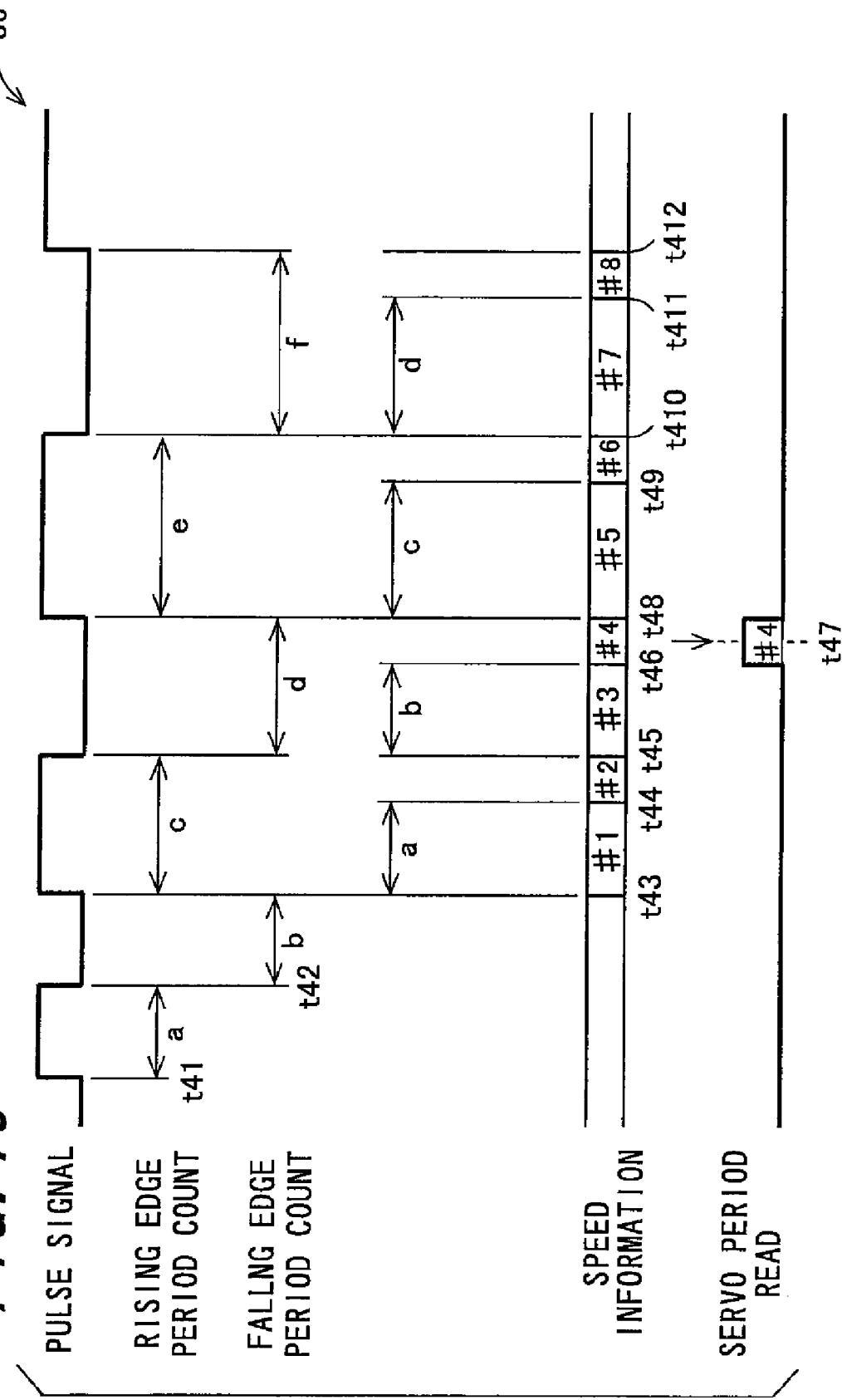
FIG. 13 is a timing chart for explaining operation of the CPU shown in FIG. 12.

Next, operation of the encoder signal control section 25b will be explained with use of a flowchart. FIG. 12 is a flowchart showing processing in the CPU 30 of the encoder signal control section 25b. The processing is carried out repeatedly in a power-on state. FIG. 13 is a timing chart for explaining operation of the CPU 30. The timing chart shown in FIG. 13 is associated with the operation of the CPU 30 shown in FIG. 12.

In Step c1, lengths of time are compared between the edge measurement time kept by the edge interval counting section 46 and the second last edge period stored in the edge interval history section 47 before the time point of detection of the edge. In the case where the edge measurement time is shorter than the edge period, the procedure proceeds to Step c2, and in the case where the edge measurement time is not shorter than the edge period, the procedure proceeds to Step c3.

In Step c2, a sum of the last edge period and the second last edge period stored in the edge interval history section 47 is outputted, and the present flow ends. In Step c3, a sum is outputted of the last edge period and the edge measurement time kept by the edge interval counting section 46, and the present flow ends.

Referring to FIG. 13 for explaining such operation, of the pulse signal 36, an edge is detected at a time point t41 and after an edge period a has elapsed since the time point t41, an edge is detected again at a time point t42. Further, an edge is detected again at a time point t43 after an edge period b has elapsed since the time point t42.

Because the edge measurement time c' kept from the time point t43 is shorter than the second last edge period a from the time point t43 to a time point t44 at which the second last edge period a has elapsed, the CPU 30 outputs as the speed information a sum #1 of the second last edge period a and the last edge period b. Further, because the edge measurement time c' is longer after the time point t44 from the time point t44 to a time point t45, the CPU 30 outputs as the speed information a sum #2 of the edge measurement time c' and the last edge period b.

Likewise, from the time point t45 to a time point t46 at which the second last edge period, i.e., the edge period b, has elapsed, the edge measurement time d' kept from the time point t45 is shorter than the second last edge period b, and therefore the CPU 30 outputs as the speed information a sum #3 of the second last edge period b and the last edge period c. Further, because the edge measurement time d' is longer after the time point t46 from the time point t46 to a time point t48 at which a next edge is detected, the CPU 30 outputs as the speed information a sum #4 of the edge measurement time d' and the last edge period c.

Such processing is repeated likewise, and the CPU 30 outputs a sum #5 of the second last edge period c and the last edge period d as the speed information from the time point t48 to a time point t49, and outputs a sum #6 of the edge measurement time e' and the last edge period d as the speed information from the time point t49 to a time point t410. Further, the CPU 30 outputs a sum #7 of the second last edge period d and the last edge period e as the speed information from the time point t410 to a time point t411, and outputs a sum #8 of the edge measurement time f' and the last edge period e as the speed information from the time point t411 to a time point t412. Accordingly, at a time point t47 between the time point t46 and the time point t48, the speed information is the value #4 as shown in FIG. 13.

As described above, in the encoder signal control section 25b of the present embodiment, both edges of the pulse signal 36 are detected, and intervals to be compared are therefore shorter than those between the rising edges or between the falling edges, with the result that the period of the pulse signal 36 can be accurately predicted and be a real-time approximate. This allows for accurate calculation of the speed of the driven body based on the accurately outputted period of the pulse signal 36. Consequently, the accuracy in detecting the speed of the driven body can be enhanced so that the drive means can be stably controlled.

Further, in the present embodiment, the CPU 30 outputs the sum of the edge measurement time and the last edge period in the case where the edge measurement time is not shorter than the second last edge period based on the comparison result of the comparing section 29, but the configuration is not limited thereto and may be adapted to output a value obtained by further adding a predetermined additional time to the above sum. This makes it possible to achieve the above-described effect concerning the additional time.

Figure 14:
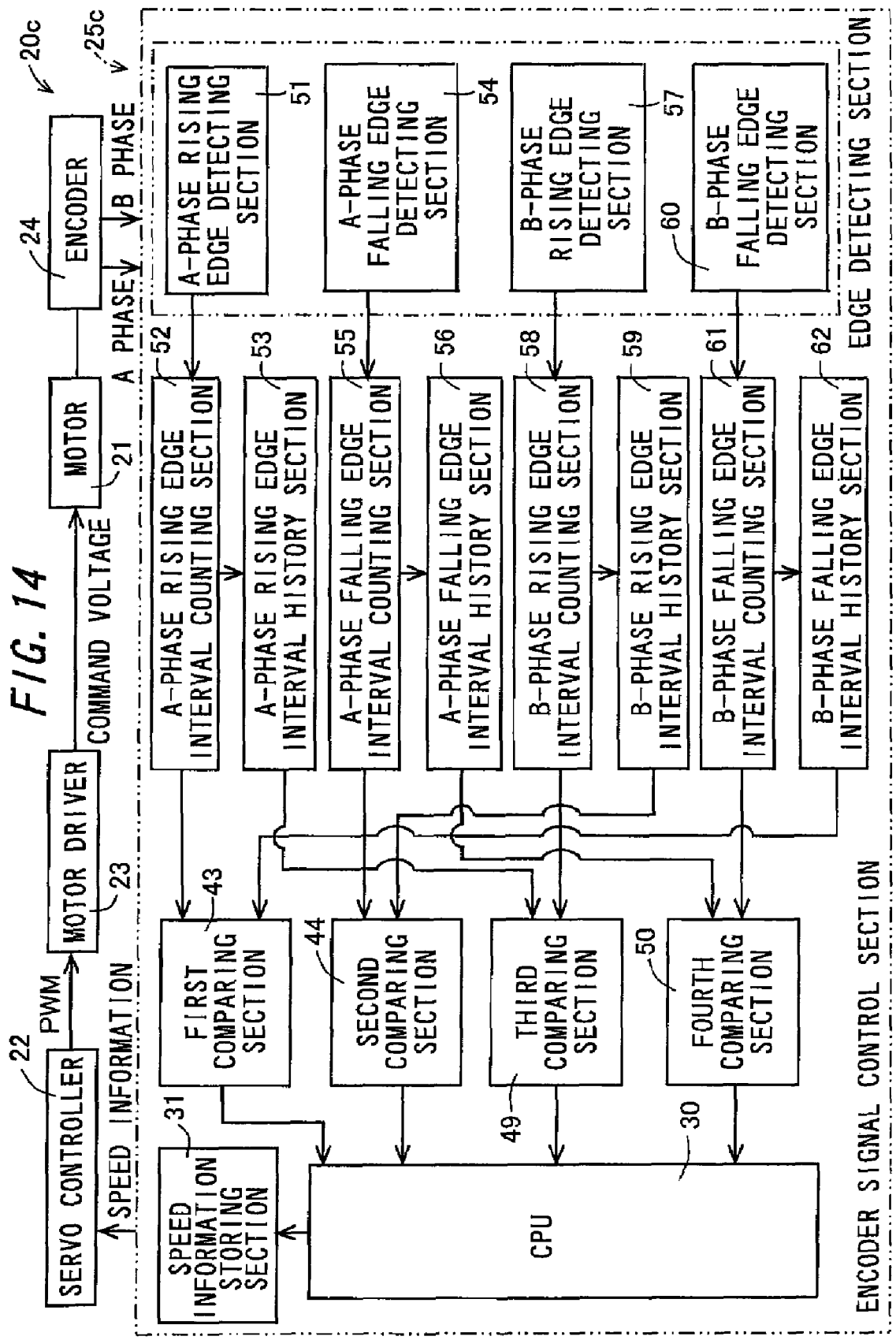
FIG. 14 is a block diagram showing an electrical configuration of a servo control system according to a fourth embodiment of the invention.

Next, a servo control system 20c according to a fourth embodiment of the invention will be explained. FIG. 14 is a block diagram showing an electrical configuration of the servo control system 20c according to the fourth embodiment of the invention. In FIG. 14, a main configuration of an encoder signal control section 25c is shown while the other parts of the configuration including, for example, the setting information storing section 32, are the same as those shown in FIG. 1 and therefore not shown. The encoder signal control section 25c shown in FIG. 14 has a configuration of detecting both edges respectively of rising edges and falling edges of the first pulse signal 36 and the second pulse signal 48 out of phase with the first pulse signal 36 by about 90 degrees in electric angle, and then computing the speed information. The encoder signal control section 25c of the present embodiment is similar to the above-described encoder signal control sections according to the first to third embodiments and now includes an A-phase processing section for executing processing related to the pulse signal 36, a B-phase processing section for executing processing related to the second pulse signal 48, the first to fourth comparing sections 43, 44, 49 and 50, the CPU 30, and the speed information storing section 31.

The second pulse signal 48 has a waveform out of phase with the first pulse signal 36 by 88 degrees or more and 92 degrees or less, preferably 90 degrees, in electric angle based on the first pulse signal 36. In other words, the second pulse signal 48 has a waveform out of phase by half a period with the first pulse signal 36.

The A-phase processing section includes an A-phase rising edge detecting section 51, an A-phase falling edge detecting section 54, an A-phase rising edge interval counting section 52, an A-phase falling edge interval counting section 55, an A-phase rising edge interval history section 53, and an A-phase falling edge interval history section 56.

The A-phase rising edge detecting section 51 is the edge detecting means and detects a rising edge of the first pulse signal 36. The A-phase falling edge detecting section 54 is the edge detecting means and detects a falling edge of the first pulse signal 36.

The A-phase rising edge interval counting section 52 is first rising timer means and starts timekeeping from a time point when a rising edge of the first pulse signal 36 is detected by the A-phase rising edge detecting section 51. The A-phase rising edge interval counting section 52 provides the first comparing section 43 with the kept first rising measurement time, i.e., the A-phase rising measurement time. Further, after a rising edge of the first pulse signal 36 is detected by the A-phase rising edge detecting section 51, the A-phase rising edge interval counting section 52 which is first rising computing means computes an A-phase rising period between the presently detected rising edge and the immediately previously detected rising edge of the first pulse signal 36, and then gives the computed A-phase rising period to the A-phase rising edge interval history section 53.

The A-phase falling edge interval counting section 55 is first falling timer means and starts timekeeping from a time point when a falling edge of the first pulse signal 36 is detected by the A-phase falling edge detecting section 54. The A-phase rising edge interval counting section 55 provides the second comparing section 44 with the kept first falling measurement time, i.e., the A-phase falling measurement time. Further, after a falling edge of the first pulse signal 36 is detected by the A-phase falling edge detecting section 54, the A-phase falling edge interval counting section 55 which is first falling computing means computes an A-phase falling period between the presently detected falling edge and the immediately previously detected falling edge of the first pulse signal 36, and then gives the computed A-phase falling period to the A-phase falling edge interval history section 56.

The A-phase rising edge interval history section 53 is the first rising storing section and stores in chronological order the A-phase rising period given by the A-phase rising edge interval counting section 52. The A-phase falling edge interval history section 56 is the first falling storing section and stores in chronological order the A-phase falling period given by the A-phase falling edge interval counting section 55.

The B-phase processing section includes a B-phase rising edge detecting section 57, a B-phase falling edge detecting section 60, a B-phase rising edge interval counting section 58, a B-phase falling edge interval counting section 61, a B-phase rising edge interval history section 59, and a B-phase falling edge interval history section 62.

The B-phase rising edge detecting section 57 is the edge detecting means and detects a rising edge of the second pulse signal 48. The B-phase falling edge detecting section 60 is the edge detecting means and detects a falling edge of the second pulse signal 48.

The B-phase rising edge interval counting section 58 is second rising timer means and starts timekeeping from a time point when a rising edge of the second pulse signal 48 is detected by the B-phase rising edge detecting section 57. The B-phase rising edge interval counting section 58 provides the third comparing section 49 with the kept second rising measurement time, i.e., the B-phase rising measurement time. Further, after a rising edge of the second pulse signal 48 is detected by the B-phase rising edge detecting section 57, the B-phase rising edge interval counting section 58 which is second rising computing means computes a B-phase rising period between the presently detected rising edge and the immediately previously detected rising edge of the second pulse signal 48, and then gives the computed B-phase rising period to the B-phase rising edge interval history section 59.

The B-phase falling edge interval counting section 61 is second falling timer means and starts timekeeping from a time point when a falling edge of the second pulse signal 48 is detected by the B-phase falling edge detecting section 60. The B-phase rising edge interval counting section 61 provides the fourth comparing section 50 with the kept second falling measurement time, i.e., the B-phase falling measurement time. Further, after a falling edge of the second pulse signal 48 is detected by the B-phase falling edge detecting section 60, the B-phase falling edge interval counting section 61 which is second falling computing means computes a B-phase falling period between the presently detected falling edge and the immediately previously detected falling edge of the second pulse signal 48, and then gives the computed B-phase falling period to the B-phase falling edge interval history section 62.

The B-phase rising edge interval history section 59 is the second rising storing section and stores in chronological order the B-phase rising period given by the B-phase rising edge interval counting section 58. The B-phase falling edge interval history section 62 is the second falling storing section and stores in chronological order the B-phase falling period given by the B-phase falling edge interval counting section 61.

The first comparing section 43 is the first comparing means and compares lengths of time between the A-phase rising measurement time kept by the A-phase rising edge interval counting section 52 and the latest B-phase falling period stored in the B-phase falling edge interval history section 62, and then gives the comparison result to the CPU 30.

The second comparing section 44 is the second comparing means and compares lengths of time between the A-phase falling measurement time kept by the A-phase falling edge interval counting section 55 and the latest B-phase rising period stored in the B-phase rising edge interval history section 59, and then gives the comparison result to the CPU 30.

The third comparing section 49 is third comparing means and compares lengths of time between the B-phase rising measurement time kept by the B-phase rising edge interval counting section 5B and the latest A-phase falling period stored in the A-phase rising edge interval history section 53, and then gives the comparison result to the CPU 30.

The fourth comparing section 50 is fourth comparing means and compares lengths of time between the B-phase falling measurement time kept by the B-phase falling edge interval counting section 61 and the latest A-phase falling period stored in the A-phase falling edge interval history section 56, and then gives the comparison result to the CPU 30.

During the first comparison term from when the falling edge of the second pulse signal 48 is detected till when the rising edge of the first pulse signal 36 is detected, the CPU 30 outputs a value of either the A-phase rising measurement time or B-phase falling period, whichever is longer based on the comparison result of the first comparing section 43.

During the second comparison term from when the rising edge of the second pulse signal 48 is detected till when the falling edge of the first pulse signal 36 is detected, the CPU 30 outputs a value of either the A-phase falling measurement time or B-phase rising period, whichever is longer based on the comparison result of the second comparing section 44.

During the third comparison term from when the rising edge of the first pulse signal 36 is detected till when the rising edge of the second pulse signal 48 is detected, the CPU 30 outputs a value of either the B-phase rising measurement time or A-phase rising period, whichever is longer based on the comparison result of the third comparing section 49.

During the fourth comparison term from when the falling edge of the first pulse signal 36 is detected till when the falling edge of the second pulse signal 48 is detected, the CPU 30 outputs a value of either the B-phase falling measurement time or A-phase falling period, whichever is longer based on the comparison result of the fourth comparing section 50. The speed information storing section 31 stores in chronological order the speed information given by the CPU 30.

Figure 15:
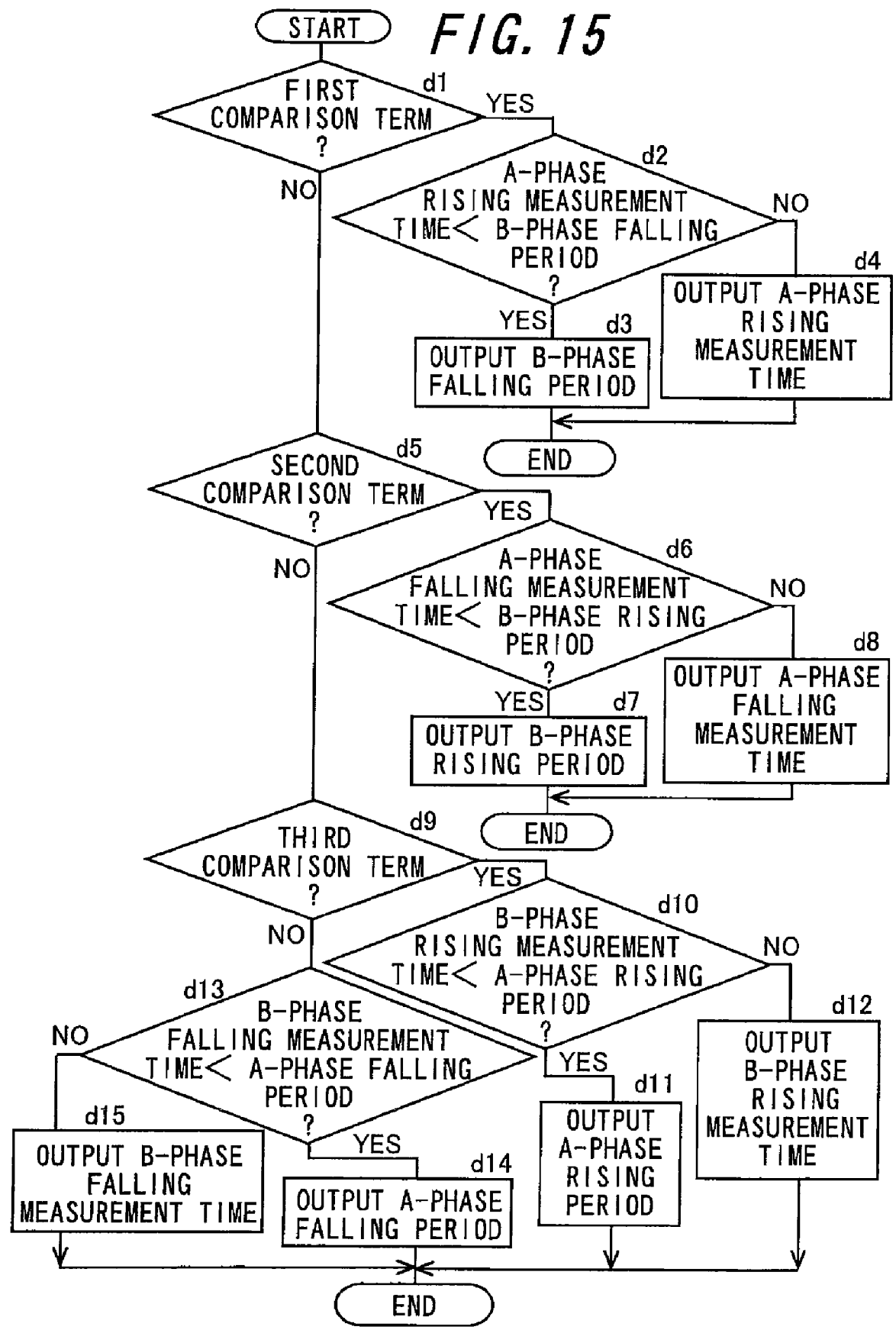
FIG. 15 is a flowchart showing processing in a CPU of an encoder signal control section.
Figure 16:
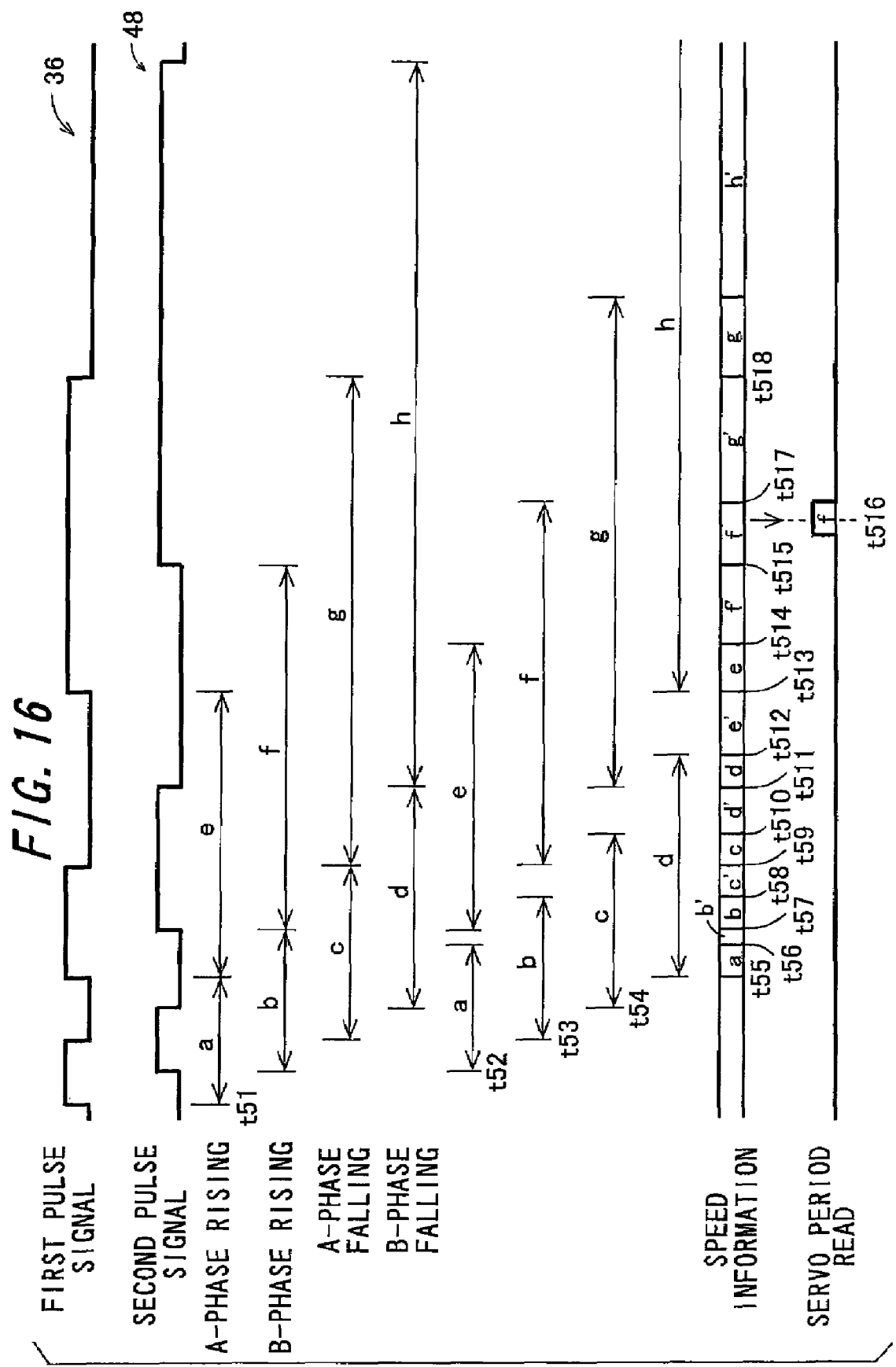
FIG. 16 is a timing chart for explaining operation of the CPU shown in FIG. 15.

Next, operation of the encoder signal control section 25c will be explained with use of a flowchart. Each operation of the flowchart is carried out by the CPU 30 of the encoder signal control section 25c. FIG. 15 is a flowchart showing processing in the CPU 30 of the encoder signal control section 25c. The processing is carried out repeatedly in a power-on state. FIG. 16 is a timing chart for explaining operation of the CPU 30. The timing chart shown in FIG. 16 is associated with the operation of the CPU 30 shown in FIG. 15.

In Step d1, it is determined whether or not the current time falls within the first comparison term lasting from when the falling edge of the second pulse signal 48 is detected till when the rising edge of the first pulse signal 36 is detected. In the case where the current time falls within the first comparison term, the procedure proceeds to Step d2, and in the case where the current time does not fall within the first comparison term, the procedure proceeds to Step d5.

In Step d2, because the current time is within the first comparison term, lengths of time are compared between the A-phase rising measurement time kept by the A-phase rising edge interval counting section 52 and the latest B-phase falling period stored in the B-phase falling edge interval history section 62. In the case where the A-phase rising measurement time is shorter than the B-phase falling period, the procedure proceeds to Step d3, and in the case where the A-phase rising measurement time is not shorter than the B-phase falling period, the procedure proceeds to Step d4.

In Step d3, the latest B-phase falling period stored in the B-phase falling edge interval history section 62 is outputted, and the present flow ends. In Step d4, the A-phase rising measurement time kept by the A-phase rising edge interval counting section 52 is outputted, and the present flow ends.

In Step d5, it is determined whether or not the current time falls within the second comparison term lasting from when the rising edge of the second pulse signal 48 is detected till when the falling edge of the first pulse signal 36 is detected. In the case where the current time falls within the second comparison term, the procedure proceeds to Step d6, and in the case where the current time does not fall within the second comparison term, the procedure proceeds to Step d9.

In Step d6, because the current time is within the second comparison term, lengths of time are compared between the A-phase falling measurement time kept by the A-phase falling edge interval counting section 55 and the latest B-phase rising period stored in the B-phase rising edge interval history section 59. In the case where the A-phase falling measurement time is shorter than the B-phase rising period, the procedure proceeds to Step d7, and in the case where the A-phase falling measurement time is not shorter than the B-phase rising period, the procedure proceeds to Step d8.

In Step d7, the latest B-phase rising period stored in the B-phase rising edge interval history section 59 is outputted, and the present flow ends. In Step d8, the A-phase falling measurement time kept by the A-phase falling edge interval counting section 55 is outputted, and the present flow ends.

In Step d9, it is determined whether or not the current time falls within the third comparison term lasting from when the rising edge of the first pulse signal 36 is detected till when the rising edge of the second pulse signal 48 is detected. In the case where the current time falls within the third comparison term, the procedure proceeds to Step d10, and in the case where the current time does not fall within the third comparison term, the procedure proceeds to Step d13.

In Step d10, because the current time is within the third comparison term, lengths of time are compared between the B-phase rising measurement time kept by the B-phase rising edge interval counting section 58 and the latest A-phase rising period stored in the A-phase rising edge interval history section 53. In the case where the B-phase rising measurement time is shorter than the A-phase rising period, the procedure proceeds to Step d11, and in the case where the B-phase rising measurement time is not shorter than the A-phase rising period, the procedure proceeds to Step d12.

In Step d11, the latest A-phase rising period stored in the A-phase rising edge interval history section 53 is outputted, and the present flow ends. In Step d12, the B-phase rising measurement time kept by the B-phase rising edge interval counting section 58 is outputted, and the present flow ends.

In Step d13, because the current time is not within the first to third comparison terms, but is within the fourth comparison term lasting from when the falling edge of the first pulse signal 36 is detected till when the falling edge of the second pulse signal 48 is detected, lengths of time are compared between the B-phase falling measurement time kept by the B-phase falling edge interval counting section 61 and the latest A-phase falling period stored in the A-phase falling edge interval history section 56. In the case where the B-phase rising measurement time is shorter than the A-phase falling period, the procedure proceeds to Step d14, and in the case where the B-phase rising measurement time is not shorter than the A-phase falling period, the procedure proceeds to Step d15.

In Step d14, the latest A-phase falling period stored in the A-phase falling edge interval history section 56 is outputted, and the present flow ends. In Step d15, the B-phase falling measurement time kept by the B-phase falling edge interval counting section 61 is outputted, and the present flow ends.

Referring to FIG. 16 for explaining such operation, of the first pulse signal 36, an A-phase rising edge is detected at a time point t51 and after an A-phase rising period a has elapsed since the time point t51, an A-phase rising edge is detected again at a time point t55. Further, of the second pulse signal 48, a B-phase rising edge is detected at a time point t52 and after a B-phase rising period b has elapsed since the time point t52, a B-phase rising edge is detected again at a time point t57.

Further, of the first pulse signal 36, an A-phase falling edge is detected at a time point t53 and after an A-phase falling period c has elapsed since the time point t53, an A-phase falling edge is detected again at a time point t59. Further, of the second pulse signal 48, a B-phase falling edge is detected at a time point t54 and after a B-phase falling period d has elapsed since the time point t54, a B-phase falling edge is detected again at a time point t511.

The third comparison term lasts from the time point t55 to the time point t57 and because the B-phase falling measurement time b' kept from the time point t53 is shorter than the A-phase rising period a from the time point t55 to the time point t56, the CPU 30 outputs the latest A-phase rising period a as the speed information. Further, because the B-phase rising measurement time b' kept from the time point t56 is longer from the time point t56 to the time point t57 at which a next B-phase rising edge is detected, the CPU 30 outputs the B-phase rising measurement time b' as the speed information.

The second comparison term lasts from the time point t57 to the time point t59 and because the A-phase falling measurement time c' kept from the time point t54 is shorter than the latest B-phase rising period b from the time point t57 to the time point t58, the CPU 30 outputs the latest B-phase rising period b as the speed information. Further, because the A-phase falling measurement time c' kept from the time point t58 is longer from the time point t58 to the time point t59 at which a next A-phase falling edge is detected, the CPU 30 outputs the A-phase falling measurement time c' as the speed information.

The fourth comparison term lasts from the time point t59 to the time point t511 and because the B-phase falling measurement time d' kept from the time point t55 is shorter than the A-phase falling period c from the time point t59 to the time point t510, the CPU 30 outputs the latest A-phase falling period c as the speed information. Further, because the B-phase falling measurement time d' kept from the time point t510 is longer from the time point t510 to the time point t511 at which a next B-phase falling edge is detected, the CPU 30 outputs the B-phase falling measurement time d' as the speed information.

The first comparison term lasts from the time point t511 to the time point t513 and because the A-phase rising measurement time e' kept from the time point t57 is shorter than the B-phase falling period d from the time point t511 to the time point t512, the CPU 30 outputs the latest B-phase falling period d as the speed information. Further, because the A-phase rising measurement time e' kept from the time point t57 is longer from the time point t512 to the time point t513 at which a next A-phase rising edge is detected, the CPU 30 outputs the A-phase rising measurement time e' as the speed information.

Such processing is repeated likewise, and the third comparison term lasts from the time point t513 to a time point t515, and the CPU 30 outputs the latest A-phase rising period e as the speed information from the time point t513 to a time point t514. And from the time point t514 to the time point t515, the CPU 30 outputs the B-phase rising measurement time f' as the speed information.

Further, because the second comparison term lasts from the time point t515 to a time point t518, the same processing as above is carried out, and the CPU 30 outputs the latest B-phase rising period f as the speed information. And from the time point t517 to the time point t518, the CPU 30 outputs the A-phase falling measurement time g' as the speed information. Consequently, in the case where the servo period is at a time point t516 located between the time point t515 and the time point t517, the speed information is the B-phase rising period f as shown in FIG. 16.

As described above, in the encoder signal control section 25c of the present embodiment, the rising edges and the falling edges, respectively, of the A-phase first pulse signal 36 and the B-phase second pulse signal 48 are detected individually. The first to fourth comparing sections 43, 44, 49 and 50 respectively compare the periods of the first pulse signal 36 and second pulse signal 48 with the edge measurement time of the respective pulse signals 36 and 48, and the CPU 30 outputs an either value thereof whichever is longer based on the comparison results. Accordingly, the use of the two pulse signals 36 and 48 out of phase with each other as described above, will make the intervals to be compared shorter than those in the case of using one pulse signal 36, with the result that the period of the pulse signal 36 can be accurately predicted and be a real-time approximate. This allows for accurate calculation of the speed of the driven body based on the accurately outputted period of the pulse signal 36. Consequently, the accuracy in detecting the speed of the driven body can be enhanced so that the drive means can be stably controlled.

Further, in the present embodiment, in the case of outputting the respective measurement times of the first and second pulse signals 36 and 48 based on the comparison result of the first to fourth comparing sections 43, 44, 49 and 50, the CPU 30 outputs values of the measurement times without changes, but the configuration is not limited thereto and may be adapted to output a sum of the measurement time and a predetermined additional time. This makes it possible to achieve the above-described effect concerning the additional time.

Figure 17:
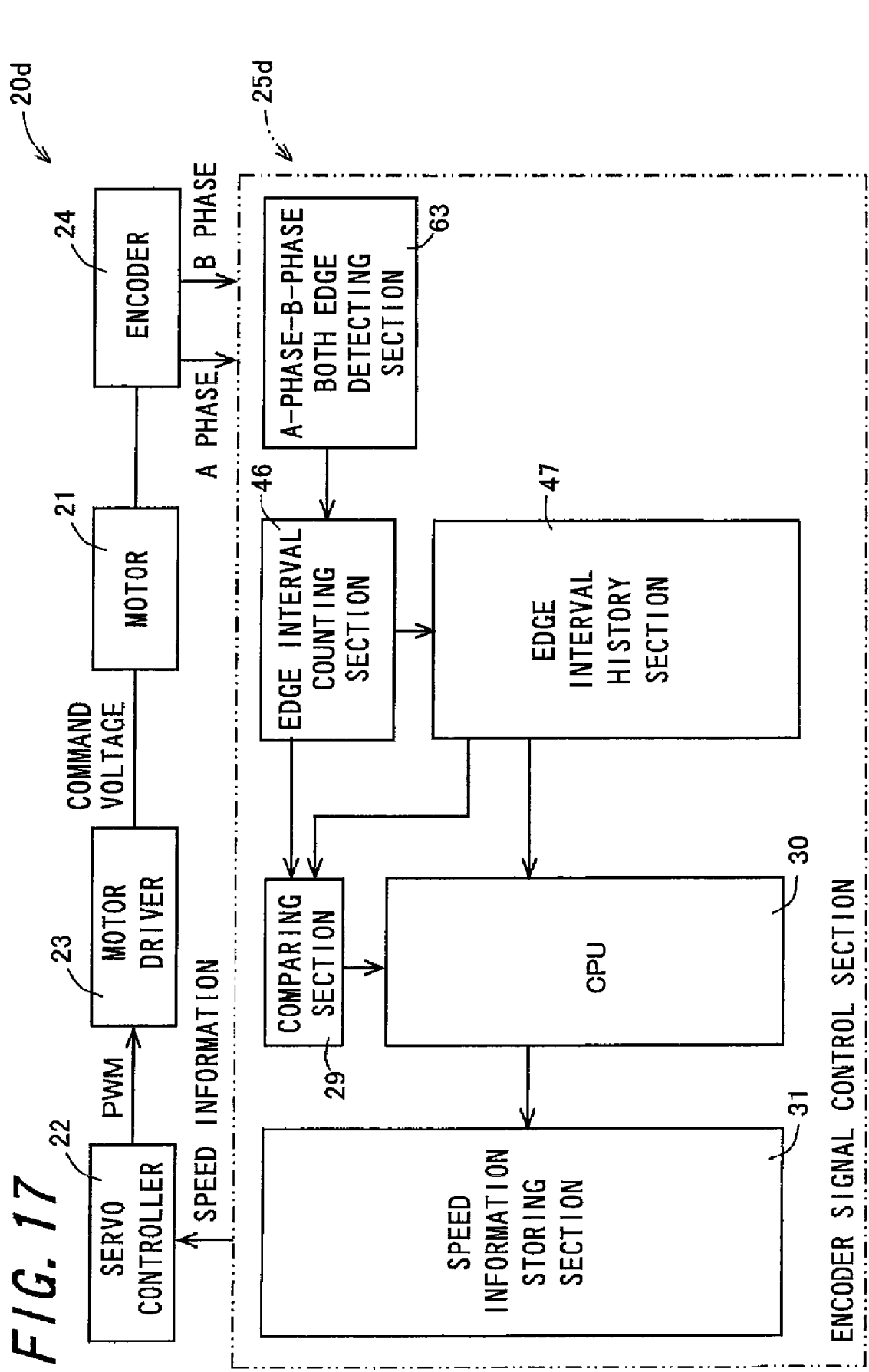
FIG. 17 is a block diagram showing an electrical configuration of a servo control system according to a fifth embodiment of the invention.

Next, a servo control system 20d according to a fifth embodiment of the invention will be explained. FIG. 17 is a block diagram showing an electrical configuration of the servo control system 20d according to the fifth embodiment of the invention. In FIG. 17, a main configuration of an encoder signal control section 25d is shown while the other parts of the configuration including, for example, the setting information storing section 32, are the same as those shown in FIG. 1 and therefore not shown. The encoder signal control section 25d shown in FIG. 17 has a configuration of detecting both edges of rising edges and falling edges of the first pulse signal 36 and the second pulse signal 48, and then computing the speed information. The encoder signal control section 25d of the present embodiment is similar to the above-described encoder signal control section of the third embodiment and now includes an A-phase-B-phase both edge detecting section 63 in addition to the encoder signal control section 25*b* of the third embodiment.

The A-phase-B-phase both edge detecting section 63 is the edge detecting means and detects edges, respectively, of the first pulse signal 36 and the second pulse signal 48 given by the encoder 24. The edge interval counting section 46 has functions of the first and second rising timer means and first and second falling timer means, and starts timekeeping from a time point when an edge is detected by the A-phase-B-phase both edge detecting section 63.

The edge interval counting section 46 gives the kept edge measurement time to the comparing section 29. Further, the edge interval counting section 46 has functions of first to fourth computing means and computes, after an edge is detected by the A-phase-B-phase both edge detecting section 63, the edge period between the presently edge and the immediately previously detected edge, and then gives the computed edge period to the edge interval history section 47.

The edge interval history section 47 has functions of first to fourth storing means, and stores in chronological order the edge period given by the edge interval counting section 46.

The comparing section 29 has functions of the first to fourth comparing means, and compares lengths of time between the edge measurement time kept by the edge interval counting section 46 and the fourth last edge period stored in the edge interval history section 47, and then gives the comparison result to the CPU 30.

The CPU 30 outputs a sum of the latest edge period, the second last edge period, the third last edge period, and a value of either the edge measurement time or the fourth last edge period, whichever is longer based on the comparison result of the comparing section 29.

Figure 18:
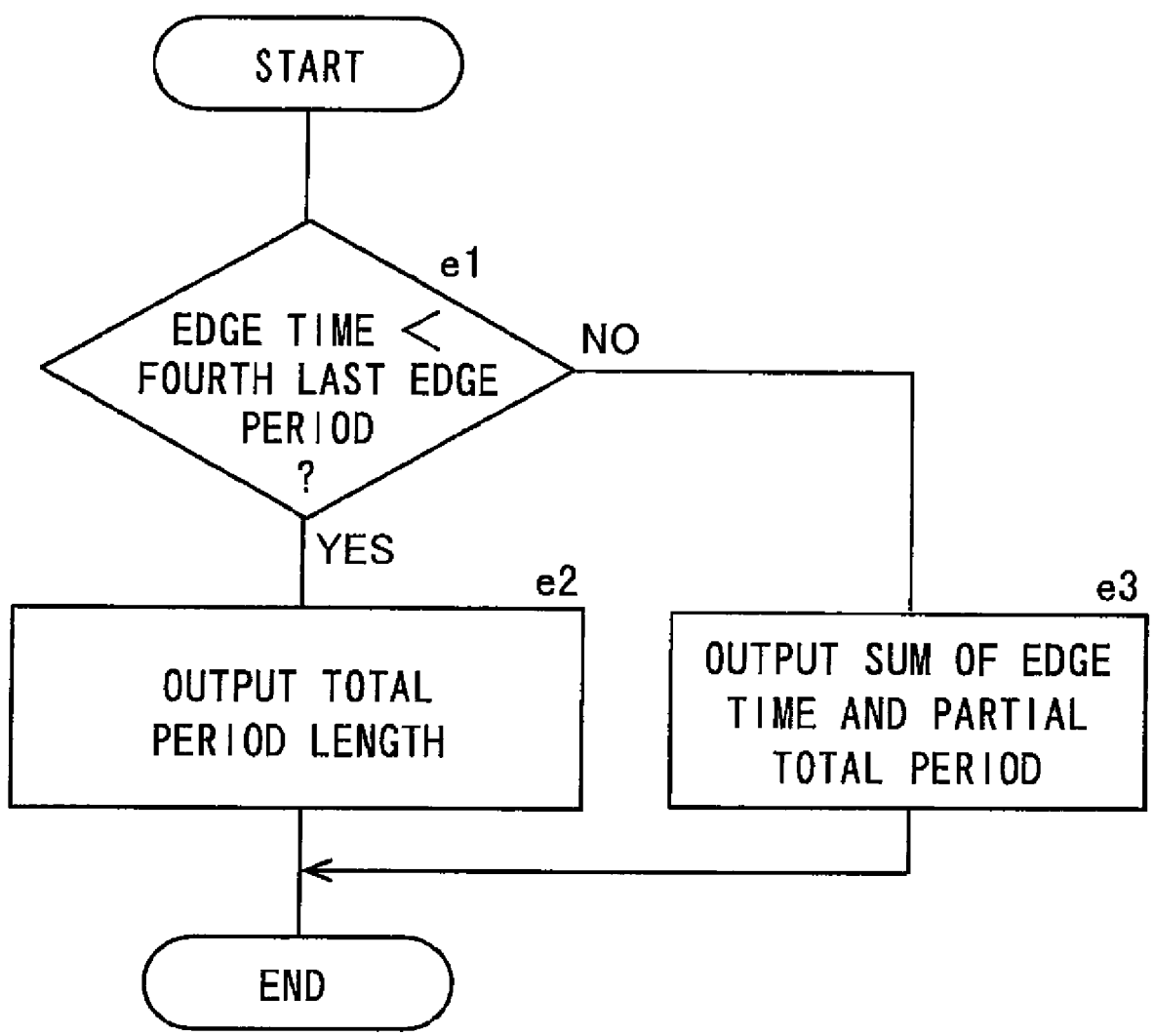
FIG. 18 is a flowchart showing processing in a CPU of an encoder signal control section.
Figure 19:
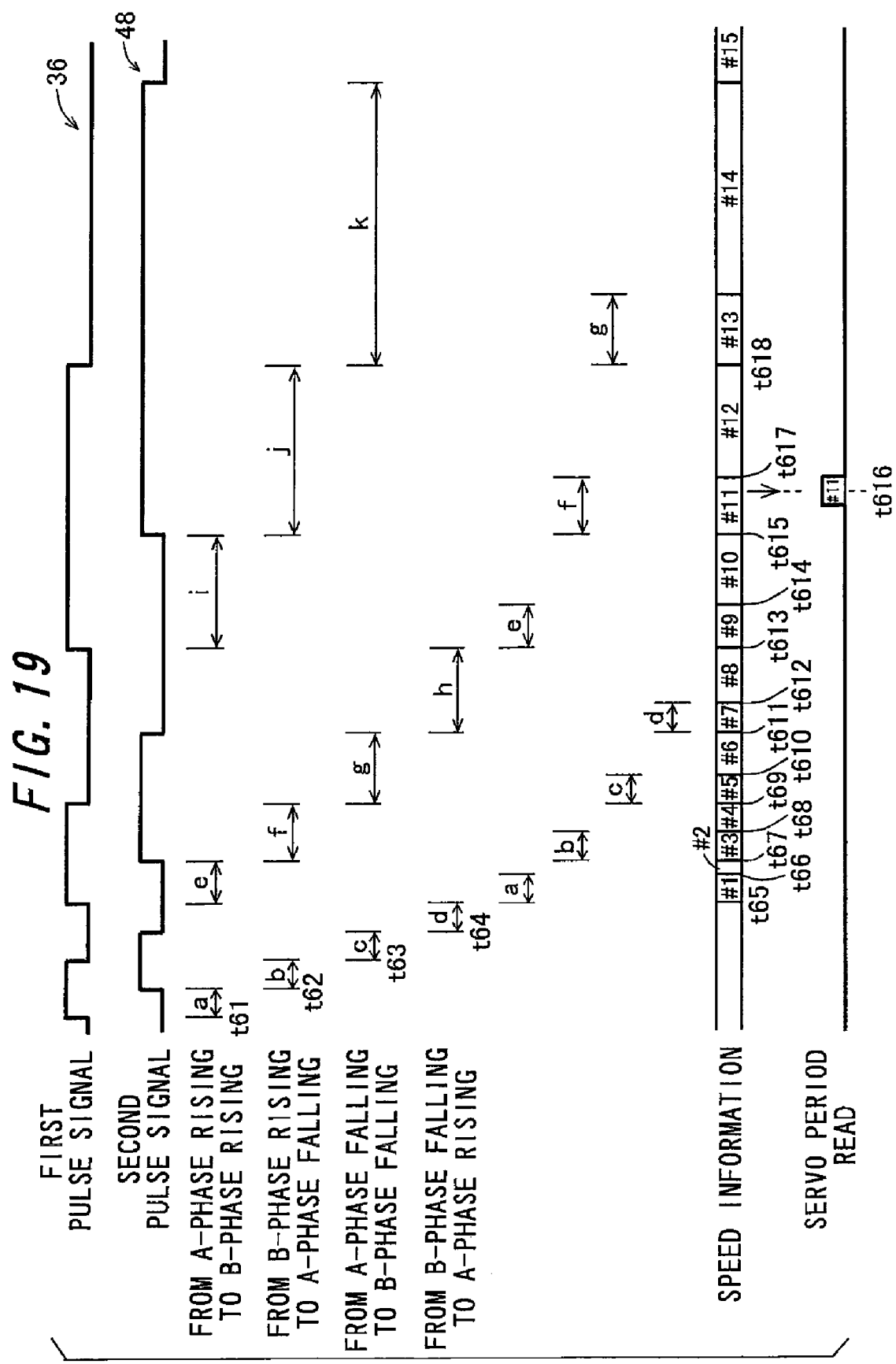
FIG. 19 is a timing chart for explaining operation of the CPU shown in FIG. 18.

Next, operation of the encoder signal control section 25*d* will be explained with use of a flowchart. FIG. 18 is a flowchart showing processing in the CPU 30 of the encoder signal control section 25*d*. The processing is carried out repeatedly in a power-on state. FIG. 19 is a timing chart for explaining operation of the CPU 30. The timing chart shown in FIG. 19 is associated with the operation of the CPU 30 shown in FIG. 18.

In Step e1, lengths of time are compared between the edge measurement time kept by the edge interval counting section 46 and the fourth last edge period stored in the edge interval history section 47. In the case where the edge measurement time is shorter than the above edge period, the procedure proceeds to Step e2, and in the case where the edge measurement time is not shorter than the above edge period, the procedure proceeds to Step e3.

In Step e2, a total period length is outputted that is a sum of the latest edge period to the fourth last edge period stored in the edge interval history section 47, and the present flow ends. In Step e3, a partial total period is outputted that is a sum of the latest edge period to the third last edge period and the edge measurement time kept by the edge interval counting section 46, and the present flow ends.

Referring to FIG. 19 for explaining such operation, a rising edge of the first pulse signal 36 is detected at a time point t61 and after an edge period a has elapsed since the time point t61, a rising edge of the second pulse signal 48 is detected at a time point t62. Further, after an edge period b has elapsed since the time point t62, an A-phase falling edge is detected at a time point t63. Further, after an edge period c has elapsed since the time point t63, a B-phase falling edge is detected at a time point t64. Further, after an edge period d has elapsed since the time point t64, an A-phase rising edge is detected at a time point t65.

Because the edge measurement time e' kept from the time point t65 is shorter than the fourth last edge period a from the time point t65 to a time point t66 at which the fourth last edge period a has elapsed, the CPU 30 outputs as the speed information a total period length #1 that is a sum of the fourth last edge period a, the third last edge period b, the second last edge period c, and the last edge period, i.e., the latest edge period d. Further, because the edge measurement time e' is longer after the time point t66 from the time point t66 to a time point t67, the CPU 30 outputs as the speed information a sum #2 of the edge measurement time e' and the partial total period which is obtained by totalizing the third last edge period b, the second last edge period c, and the latest edge period d.

Likewise, from the time point t67 to a time point t68 at which the fourth last edge period b has elapsed, the edge measurement time f' kept from the time point t67 is shorter than the edge period b, and therefore the CPU 30 outputs a total period length #3 (b+c+d+e) as the speed information. Further, because the edge measurement time t' is longer after the time point t68 from the time point t68 to a time point t69 at which a next edge is detected, the CPU 30 outputs as the speed information a sum #4 (c+d+e+f') of the partial total period (c+d+e) and the edge measurement time f'.

Such processing is repeated likewise, and the CPU 30 outputs a total period length #5 (c+d+e+f) as the speed information from the time point t69 to a time point t610. Further, from the time point t610 to a time point t611, the CPU 30 outputs the speed information a sum #6 (d+e+f+g') of the partial total period (d+e+f) and the edge measurement time g'. From the time point t611 to a time point t612, the CPU 30 outputs a total period length #7 (d+e+f+g) as the speed information. Further, from the time point t612 to a time point t613, the CPU 30 outputs the speed information a sum #8 (e+f+g+h') of the partial total period (e+f+g) and the edge measurement time h'.

From the time point t613 to a time point t614, the CPU 30 outputs a total period length #9 (e+f+g+h) as the speed information. Further, from the time point t614 to a time point t615, the CPU 30 outputs as the speed information a sum #10 (f+g+h+i') of the partial total period (f+g+h) and the edge measurement time i'. From the t615 to a time point t617, the CPU 30 outputs the total period length #11 (f+g+h+i) as the speed information. Further, from the time point t617 to a time point t618, the CPU 30 outputs as the speed information a sum #12 (g+h+i+j') of the partial total period (g+h+i) and the edge measurement time j'. Consequently, in the case where the servo period is at a time point t616 located between the time point t615 and the time point t617, the speed information is the total period length #11 (f+g+h+i) as shown in FIG. 19.

The above-mentioned processing can be divided into four processing. The period from the A-phase rising edge to the next B-phase rising edge is defined as the first period; the period from the B-phase rising edge to the next A-phase falling edge is defined as the second period; the period from the A-phase falling edge to the next B-phase falling edge is defined as the third period; and the period from the B-phase falling edge to the next B-phase rising edge is defined as the fourth period. A total time-length of the latest first period, second period, third period, and fourth period is defined as the total period length.

The comparing section 29 has a function of the first comparing means and compares the A-phase rising measurement time kept by the edge interval counting section 46 and the latest first period stored in the edge interval history section 47.

From when the B-phase falling edge is detected till when the A-phase rising edge is detected, the CPU 30 outputs the total period length in the case where the A-phase rising measurement time is shorter than the first period, while outputting the first total time-length that is a sum of the A-phase rising measurement time and the latest second period, third period, and fourth period, in the case where the A-phase rising measurement time is not shorter than the first period.

Further, the comparing section 29 has a function of the second comparing means and compares the A-phase falling measurement time kept by the edge interval counting section 46 and the latest second period stored in the edge interval history section 47.

From when the B-phase rising edge is detected till when the A-phase falling edge is detected, the CPU 30 outputs the total period length in the case where the B-phase rising measurement time is shorter than the latest second period, while outputting the second total time-length that is a sum of the B-phase rising measurement time and the latest first period, third period, and fourth period, in the case where the B-phase rising measurement time is not shorter than the latest second period.

Further, the comparing section 29 has a function of the third comparing means and compares the B-phase rising measurement time kept by the edge interval counting section 46 and the latest third period stored in the edge interval history section 47.

From when the A-phase falling edge is detected till when the B-phase rising edge is detected, the CPU 30 outputs the total period length in the case where the A-phase falling measurement time is shorter than the latest third period, while outputting the third total time-length that is a sum of the A-phase falling measurement time and the latest first period, second period, and fourth period, in the case where the A-phase falling measurement time is not shorter than the latest third period.

Further, the comparing section 29 has a function of the fourth comparing means and compares the B-phase falling measurement time kept by the edge interval counting section 46 and the latest fourth period stored in the edge interval history section 46.

Further, from when the A-phase falling edge is detected till when the B-phase falling edge is detected, the CPU 30 outputs the total period length in the case where the B-phase falling measurement time is shorter than the latest fourth period, while outputting the fourth total time-length that is a sum of the B-phase falling measurement time and the latest first period, second period, and third period, in the case where the B-phase falling measurement time is not shorter than the latest fourth period.

As described above, in the encoder signal control section 25d of the present embodiment, the rising edges and the falling edges, respectively, of the first pulse signal 36 and the second pulse signal 48 are detected individually. The CPU 30 outputs the total period length in the case where each measurement times is shorter than each of the latest periods, and outputs the first to fourth total time-lengths, each of which is a sum of the each measurement time and the other periods. Accordingly, the use of the two pulse signals 36 and 48 out of phase with each other will make the intervals to be compared shorter than those in the case of using one pulse signal 36, with the result that the period of the pulse signal 36 can be accurately predicted and be a real-time approximate. This allows for accurate calculation of the speed of the driven body based on the accurately outputted period of the pulse signal 36. Consequently, the accuracy in detecting the speed of the driven body can be enhanced so that the drive means can be stably controlled.

Next, a servo control system 20d according to a sixth embodiment of the invention will be explained. The servo control system 20d of the present embodiment has a similar configuration to that of the above-described servo control system 20d of the fifth embodiment, with the encoder signal control section 25d operating differently, and the operation of the encoder signal control section 25d will be therefore explained.

The comparing section 29 has functions of the first to fourth comparing means and compares the edge measurement time kept by the edge interval counting section 46 and the latest edge period stored in the edge interval history section 47, and then gives the comparison result to the CPU 30.

The CPU 30 outputs a sum of the second last edge period, the third last edge period, the fourth last edge period, and a value of either the edge measurement time or the latest edge period, whichever is longer based on the comparison result of the comparing section 29.

Figure 20:
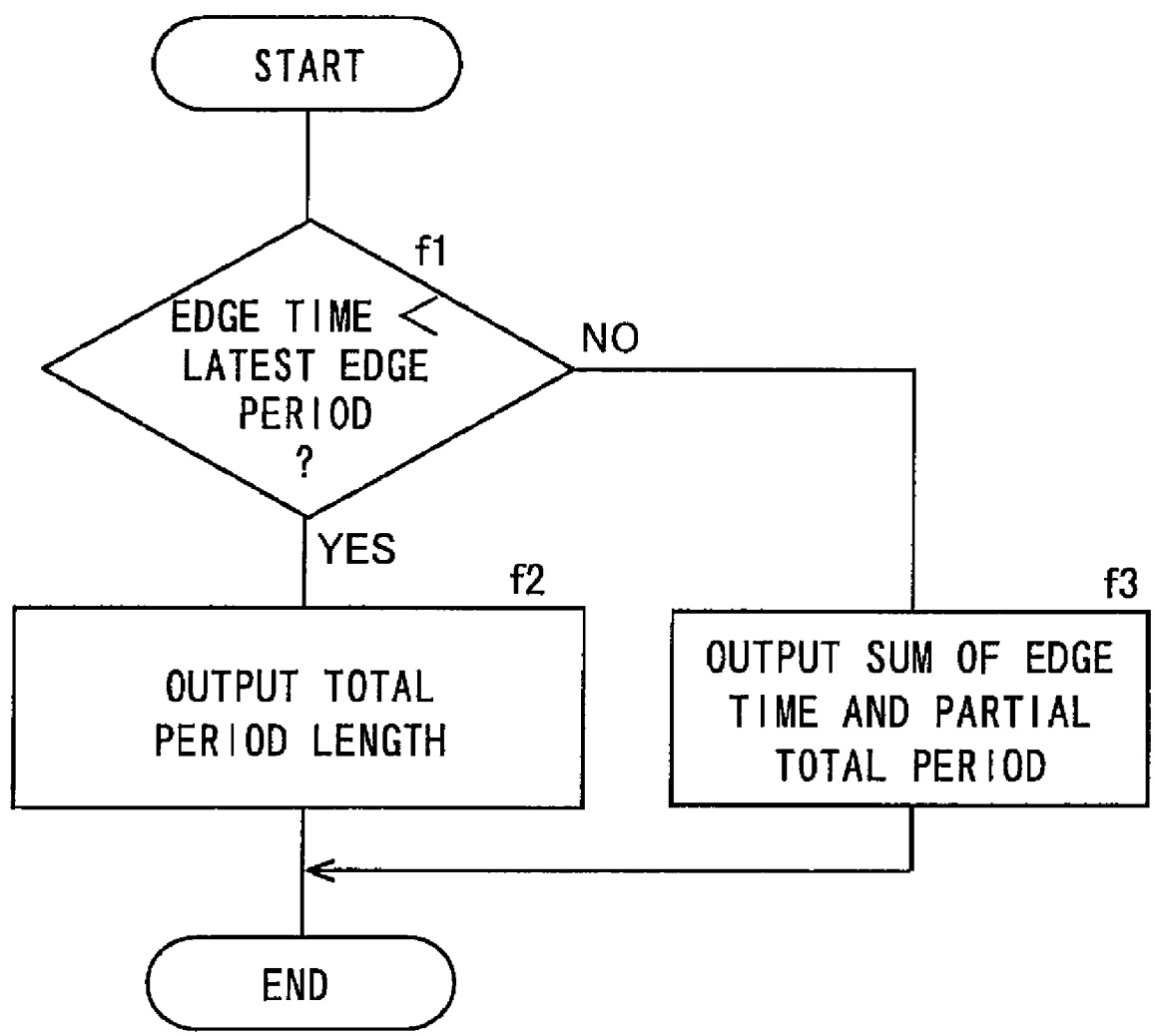
FIG. 20 is a flowchart showing processing in a CPU of an encoder signal control section.
Figure 21:
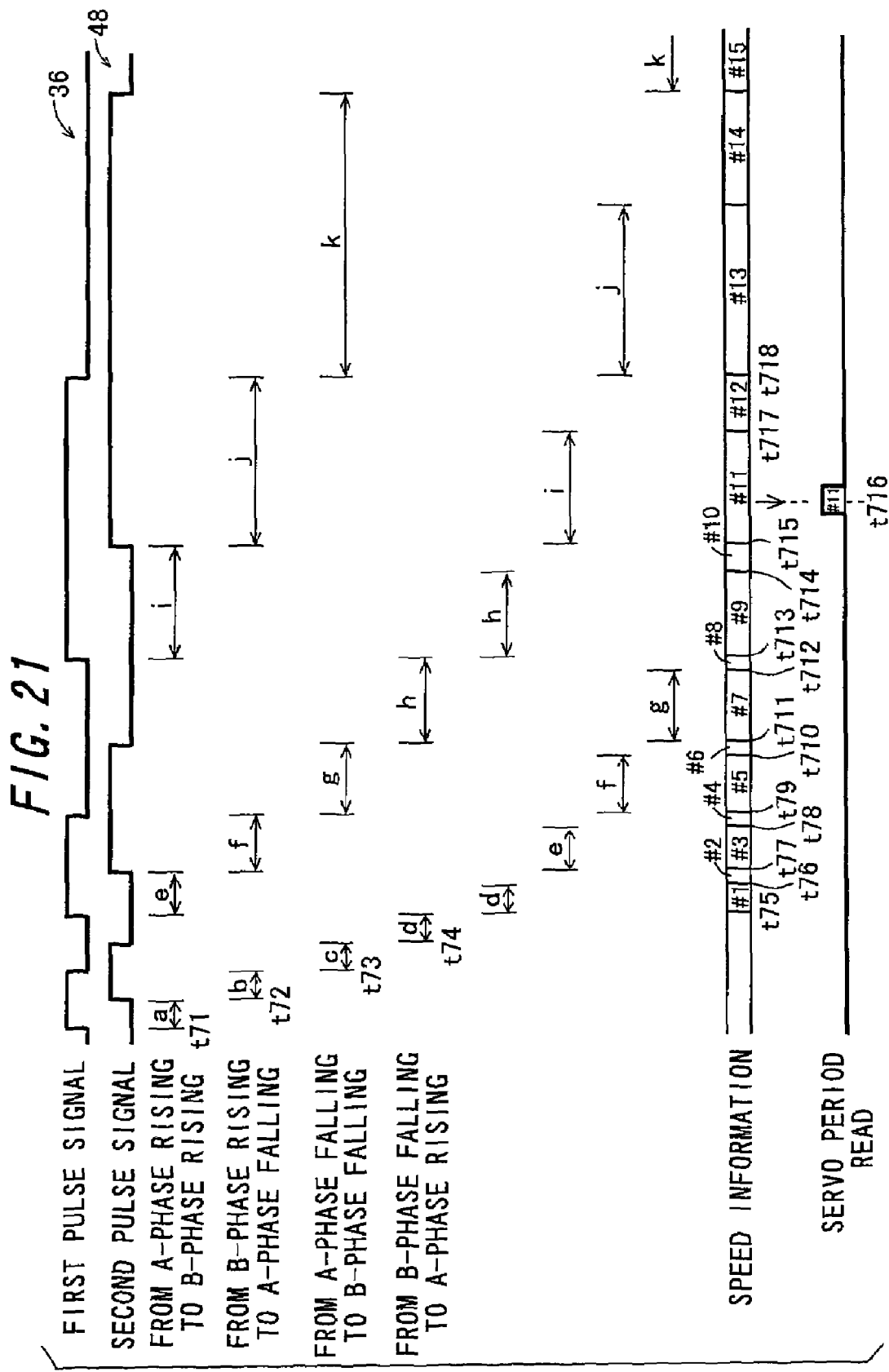
FIG. 21 is a timing chart for explaining operation of the CPU shown in FIG. 20.

Next, operation of the encoder signal control section 25d will be explained with use of a flowchart. FIG. 20 is a flowchart showing processing in the CPU 30 of the encoder signal control section 25d. The processing is carried out repeatedly in a power-on state. FIG. 21 is a timing chart for explaining operation of the CPU 30. The timing chart shown in FIG. 21 is associated with the operation of the CPU 30 shown in FIG. 20.

In Step f1, lengths of time are compared between the edge measurement time kept by the edge interval counting section 46 and the latest edge period stored in the edge interval history section 47. In the case where the edge measurement time is shorter than the above edge period, the procedure proceeds to Step t2, and in the case where the edge measurement time is not shorter than the above edge period, the procedure proceeds to Step f3.

In Step f2, the total period length is outputted that is a sum of the latest edge period to the fourth last edge period stored in the edge interval history section 47, and the present flow ends. In Step f3, a sum is outputted of the edge measurement time kept by the edge interval counting section 46 and the partial total period from the latest edge period to the third last edge period, and the present flow ends.

Referring to FIG. 21 for explaining such operation, a rising edge of the first pulse signal 36 is detected at a time point t71 and after an edge period a has elapsed since the time point t71, a rising edge of the second pulse signal 48 is detected at a time point t72. Further, an A-phase falling edge is detected at a time point t73 after an edge period b has elapsed since the time point t72. Further, a B-phase falling edge is detected at a time point t74 after an edge period c has elapsed since the time point t73. Further, an A-phase rising edge is detected at a time point t75 after an edge period d has elapsed since the time point t74.

Because the edge measurement time e' kept from the time point t75 is shorter than the latest edge period d from the time point t75 to a time point t76 at which the latest edge period d has elapsed, the CPU 30 outputs as the speed information a total period length #1 that is a sum of the fourth last edge period a, the third last edge period b, the second last edge period c, and the last edge period d. Further, because the edge measurement time e' is longer after the time point t76 from the time point t76 to a time point t77 at which a next edge is detected, the CPU 30 outputs as the speed information a sum #2 of the edge measurement time e' and the partial total period which is obtained by totalizing the third last edge period b, the second last edge period c, and the last edge period d.

Likewise, from the time point t77 to a time point t78 at which the latest edge period e has elapsed, the edge measurement time f' kept from the time point t77 is shorter than the latest edge period e, and therefore the CPU 30 outputs a total period length #3 (b+c+d+e) as the speed information. Further, because the edge measurement time f' is longer after the time point t78 from the time point t78 to a time point t79 at which a next edge is detected, the CPU 30 outputs as the speed information a sum #4 (c+d+e+f') of the partial total period (c+d+e) and the edge measurement time f'.

Such processing is repeated likewise, and the CPU 30 outputs a total period length #5 (c+d+e+f) as the speed information from the time point t79 to a time point t710. Further, from the time point t710 to a time point t711, the CPU 30 outputs the speed information a sum #6 (d+e+f+g') of the partial total period (d+e+f) and the edge measurement time g'. From the time point t711 to a time point t712, the CPU 30 outputs a total period length #7 (d+e+f+g) as the speed information. Further, from the time point t712 to a time point t713, the CPU 30 outputs the speed information a sum #8 (e+f+g+h') of the partial total period (e+f+g) and the edge measurement time h'.

From the time point t713 to a time point t714, the CPU 30 outputs a total period length #9 (e+f+g+h) as the speed information. Further, from the time point t714 to a time point t715, the CPU 30 outputs as the speed information a sum #10 (f+g+h+i') of the partial total period (f+g+h) and the edge measurement time i'. From the t715 to a time point t717, the CPU 30 outputs the total period length #11 (f+g+h+i) as the speed information. Further, from the time point t717 to a time point t718, the CPU 30 outputs as the speed information a sum #12 (g+h+i+j') of the partial total period (g+h+i) and the edge measurement time j'. Consequently, in the case where the servo period is at a time point t716 located between the time point t715 and the time point t717, the speed information is the total period length #11 (f+g+h+i) as shown in FIG. 21.

As described above, in the encoder signal control section 25d of the present embodiment, the comparing section 29 compares the measurement time kept by the edge interval counting section 46 with the latest period stored in the edge interval history section 47. Even such a configuration can achieve the same effect as above.

Figure 22:
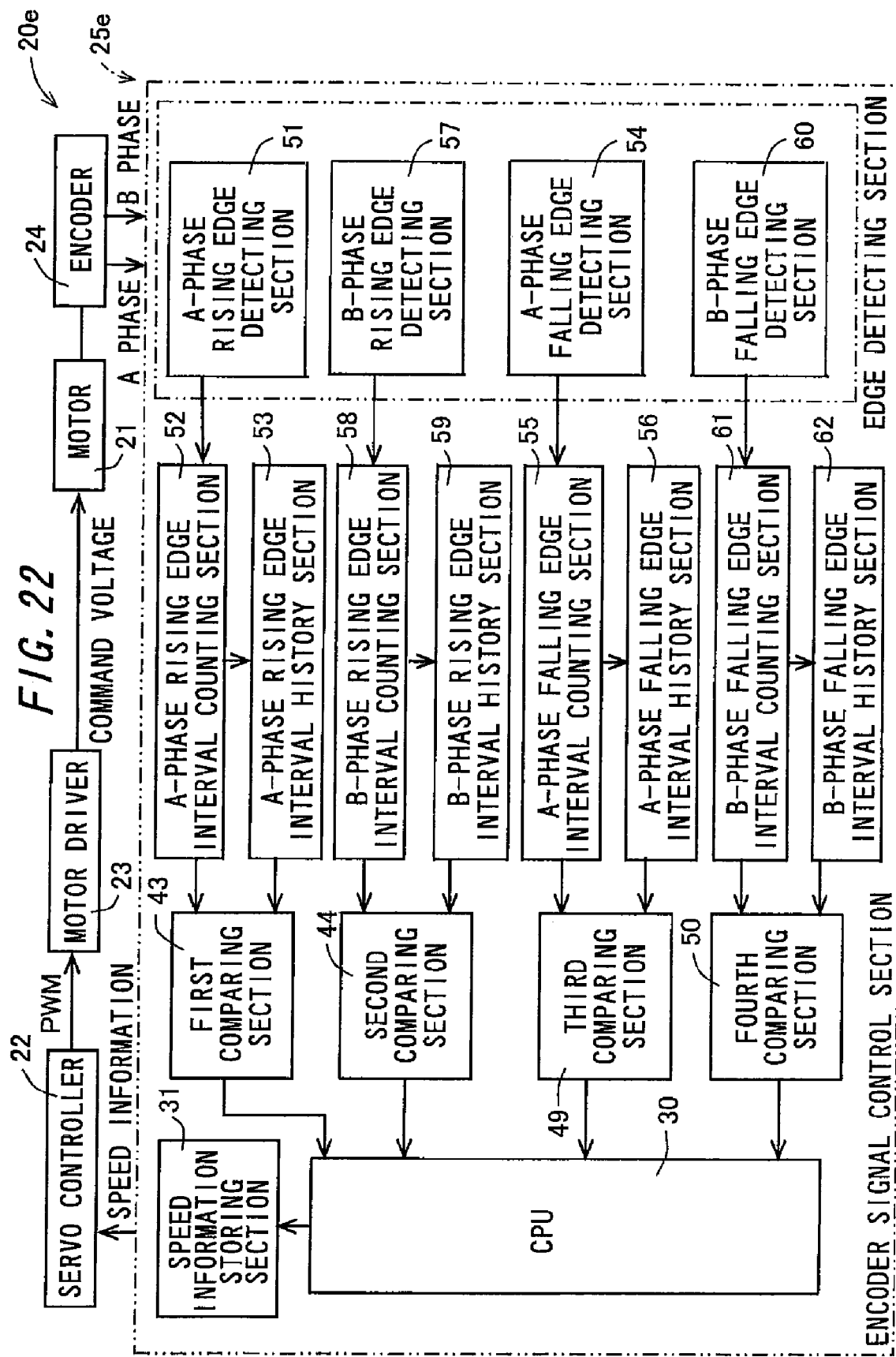
FIG. 22 is a block diagram showing an electrical configuration of a servo control system according to a seventh embodiment of the invention.

Next, a servo control system 20e according to a seventh embodiment of the invention will be explained. FIG. 22 is a block diagram showing an electrical configuration of the servo control system 20e according to the seventh embodiment of the invention. In FIG. 22, a main configuration of an encoder signal control section 25e is shown while the other parts of the configuration including, for example, the setting information storing section 32, are the same as those shown in FIG. 1 and therefore not shown. The encoder signal control section 25e shown in FIG. 22 has a configuration of detecting both edges respectively of rising edges and falling edges of the first pulse signal 36 and the second pulse signal 48, and then computing the speed information. The encoder signal control section 25e of the present embodiment is similar to the above-described encoder signal control sections 25c and 25d according to the fourth and sixth embodiments, with the encoder signal control section 25e operating differently, and the operation of the encoder signal control section 25e will be therefore explained.

The A-phase rising edge interval counting section 52 gives the kept A-phase rising measurement time to the first comparing section 43. Further, the A-phase rising edge interval counting section 52 is the fourth computing means and computes, after a rising edge of the first pulse signal 36 is detected by the A-phase rising edge detecting section 51, the fourth period between the presently detected rising edge and the immediately previously detected falling edge of the second pulse signal 48, and then gives the computed fourth period to the A-phase rising edge interval history section 53.

The A-phase falling edge interval counting section 55 gives the kept A-phase falling measurement time to the third comparing section 49. Further, the A-phase falling edge interval counting section 55 is the second computing means and computes, after a falling edge of the first pulse signal 36 is detected by the A-phase falling edge detecting section 54, the second period between the presently detected falling edge and the immediately previously detected rising edge of the second pulse signal 48, and then gives the computed second period to the A-phase falling edge interval history section 56.

The A-phase rising edge interval history section 53 is the fourth storing means and stores in chronological order the fourth period given by the A-phase rising edge interval counting section 52. The A-phase falling edge interval history section 56 is the second storing means and stores in chronological order the second period given by the A-phase falling edge interval counting section 55.

The B-phase rising edge interval counting section 58 gives the kept B-phase rising measurement time to the second comparing section 44. Further, the B-phase rising edge interval counting section 58 is the first computing means and computes, after a rising edge of the second pulse signal 48 is detected by the B-phase rising edge detecting section 57, the first period between the presently detected rising edge and the immediately previously detected rising edge of the first pulse signal 36, and then gives the computed first period to the B-phase rising edge interval history section 59.

The B-phase falling edge interval counting section 61 gives the kept B-phase falling measurement time to the fourth comparing section 50. Further, the B-phase falling edge interval counting section 61 is the third computing means and computes, after a falling edge of the second pulse signal 48 is detected by the B-phase falling edge detecting section 60, the third period between the presently detected falling edge and the immediately previously detected falling edge of the first pulse signal 36, and then gives the computed third period to the B-phase falling edge interval history section 62.

The B-phase rising edge interval history section 59 is the first storing means and stores in chronological order the first period given by the B-phase rising edge interval counting section 58. The B-phase falling edge interval history section 62 is the third storing means and stores in chronological order the third period given by the B-phase falling edge interval counting section 61.

The first comparing section 43 is the first comparing means and compares the A-phase rising measurement time kept by the A-phase rising edge interval counting section 52 and the latest fourth period stored in the A-phase rising edge interval history section 53.

From when the B-phase falling edge is detected till when the A-phase rising edge is detected, the CPU 30 outputs the total period length in the case where the A-phase rising measurement time is shorter than the latest fourth period, while outputting the first total time-length in the case where the A-phase rising measurement time is not shorter than the latest fourth period.

The second comparing section 44 is the second comparing means and compares the B-phase rising measurement time kept by the B-phase rising edge interval counting section 58 and the latest first period stored in the B-phase rising edge interval history section 59.

From when the B-phase rising edge is detected till when the A-phase falling edge is detected, the CPU 30 outputs the total period length in the case where the A-phase falling measurement time is shorter than the latest first period, while outputting the second total time-length in the case where the A-phase falling measurement time is not shorter than the latest first period.

The third comparing section 49 is the third comparing means and compares the A-phase falling measurement time kept by the A-phase falling edge interval counting section 55 and the latest second period stored in the A-phase falling edge interval history section 56.

From when the A-phase rising edge is detected till when the B-phase rising edge is detected, the CPU 30 outputs the total period length in the case where the A-phase falling measurement time is shorter than the latest second period, while outputting the third total time-length in the case where the A-phase falling measurement time is not shorter than the latest second period.

The fourth comparing section 50 is the fourth comparing means and compares the B-phase falling measurement time kept by the B-phase falling edge interval counting section 61 and the latest third period.

From when the A-phase falling edge is detected till when the B-phase falling edge is detected, the CPU 30 outputs the total period length in the case where the B-phase falling measurement time is shorter than the latest third period, while outputting the fourth total time-length in the case where the B-phase falling measurement time is not shorter than the latest third period.

Consequently, the encoder signal control section 25e of the present embodiment can achieve the same operation and effect as those of the above-described encoder signal control section 25d of the sixth embodiment.

Next, a servo control system 20d according to an eighth embodiment of the invention will be explained. The servo control system 20d of the present embodiment has a similar configuration to those of the above-described servo control system 20d of the fifth and sixth embodiments, with the encoder signal control section 25d operating differently, and the operation of the encoder signal control section 25d will be therefore explained.

The comparing section 29 has functions of the first to fourth comparing means and compares lengths of time between the above-described first to fourth total time-length and the above-described total period lengths, respectively, and then gives the comparison results to the CPU 30.

During the first comparison term from when the falling edge of the second pulse signal 48 is detected till when the rising edge of the first pulse signal 36 is detected, the CPU 30 outputs a value of either the first total time-length or the total period length, whichever is longer. Further, during the second comparison term from when the rising edge of the second pulse signal 48 is detected till when the falling edge of the first pulse signal 36 is detected, the CPU 30 outputs a value of either the second total time-length or the total period length, whichever is longer.

Further, during the third comparison term from when the rising edge of the first pulse signal 36 is detected till when the rising edge of the second pulse signal 48 is detected, the CPU 30 outputs a value of either the third total time-length or the total period length, whichever is longer. Further, during the fourth comparison term from when the falling edge of the first pulse signal 36 is detected till when the falling edge of the second pulse signal 48 is detected, the CPU 30 outputs a value of either the fourth total time-length or the total period length, whichever is longer.

Figure 23:
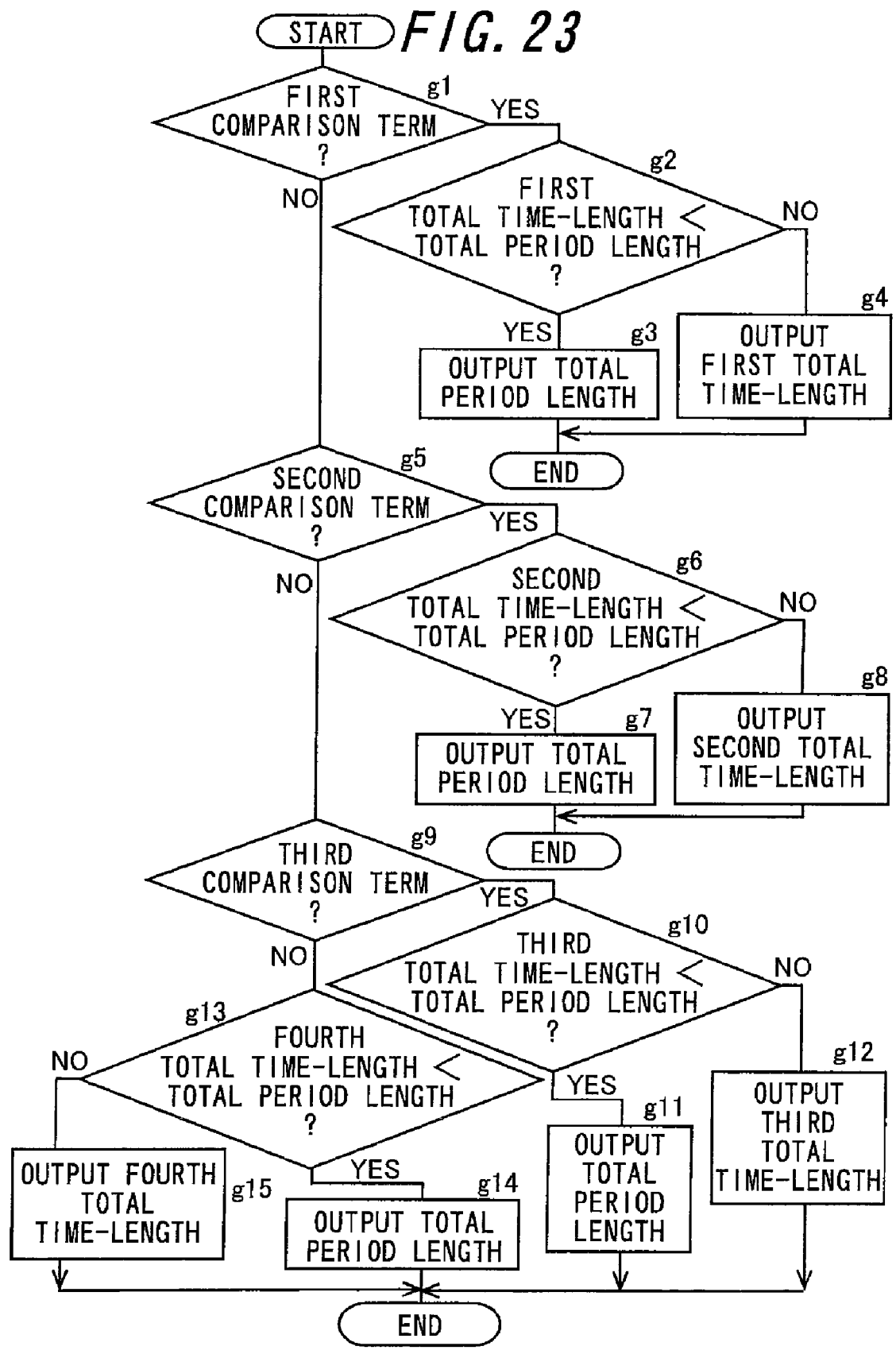
FIG. 23 is a flowchart showing processing in a CPU of an encoder signal control section.
Figure 24:
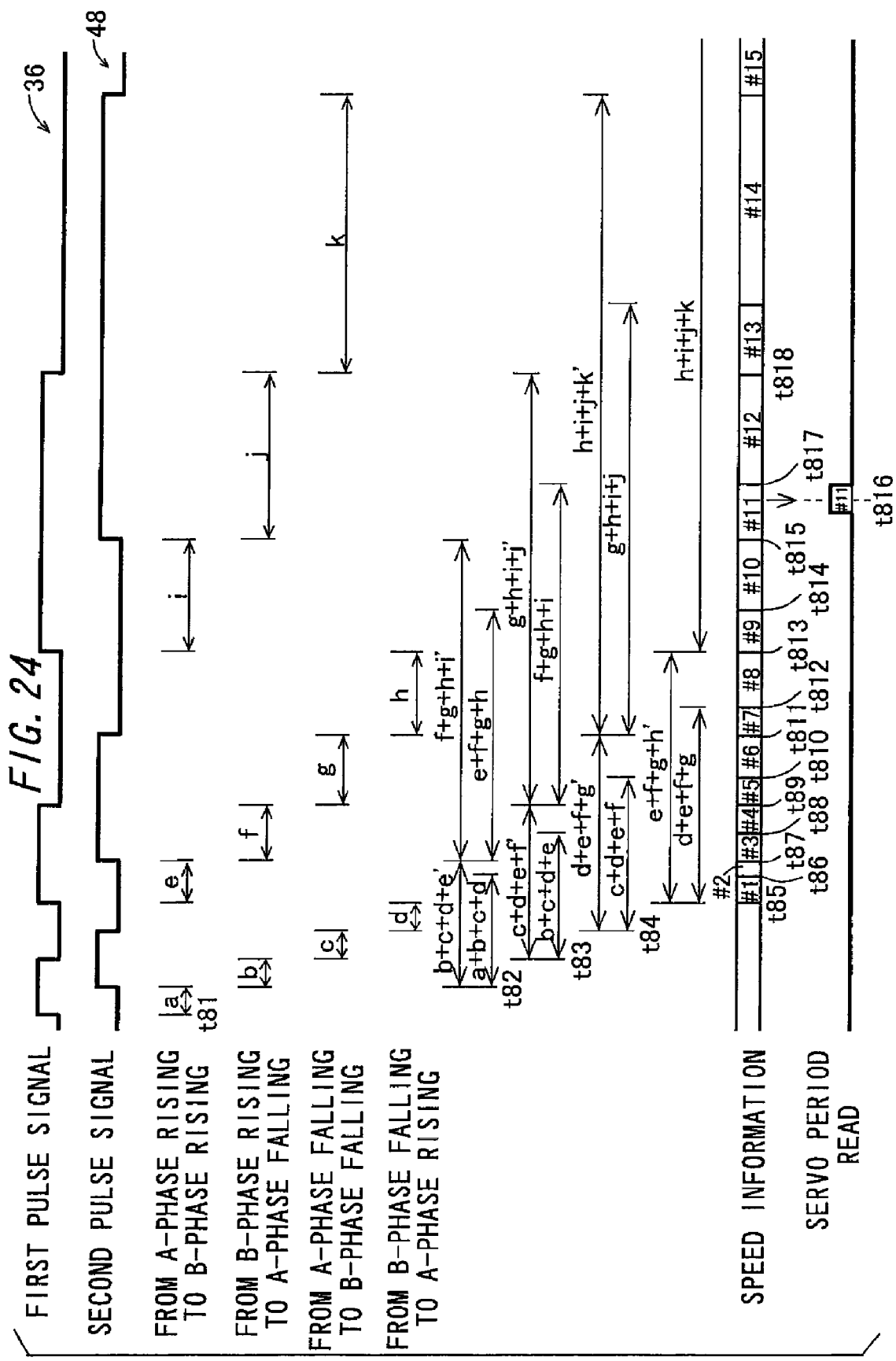
FIG. 24 is a timing chart for explaining operation of the CPU shown in FIG. 23.

Next, operation of the encoder signal control section 25d will be explained with use of a flowchart. Each operation of the flowchart is carried out by the CPU 30 of the encoder signal control section 25d. FIG. 23 is a flowchart showing processing in the CPU 30 of the encoder signal control section 25d. The processing is carried out repeatedly in a power-on state. FIG. 24 is a timing chart for explaining operation of the CPU 30. The timing chart shown in FIG. 24 is associated with the operation of the CPU 30 shown in FIG. 23.

In Step g1, it is determined whether or not the current time falls within the first comparison term lasting from when the falling edge of the second pulse signal 48 is detected till when the rising edge of the first pulse signal 36 is detected. In the case where the current time falls within the first comparison term, the procedure proceeds to Step g2, and in the case where the current time does not fall within the first comparison term, the procedure proceeds to Step g5.

In Step g2, because the current time is within the first comparison term, lengths of time are compared between the first total time-length and the total period length. In the case where the first total time-length is shorter than the total period length, the procedure proceeds to Step g3, and in the case where the first total time-length is not shorter than the total period length, the procedure proceeds to Step g4.

In Step g3, the total period length is outputted, and the present flow ends. In Step g4, the first total time-length is outputted, and the present flow ends.

In Step g5, it is determined whether or not the current time falls within the second comparison term lasting from when the rising edge of the second pulse signal 48 is detected till when the falling edge of the first pulse signal 36 is detected. In the case where the current time falls within the second comparison term, the procedure proceeds to Step g6, and in the case where the current time does not fall within the second comparison term, the procedure proceeds to Step g9.

In Step g6, because the current time is within the second comparison term, lengths of time are compared between the second total time-length and the total period length. In the case where the second total time-length is shorter than the total period length, the procedure proceeds to Step g7, and in the case where the second total time-length is not shorter than the total period length, the procedure proceeds to Step g8.

In Step g7, the total period length is outputted, and the present flow ends. In Step g8, the second total time-length is outputted, and the present flow ends.

In Step g9, it is determined whether or not the current time falls within the third comparison term lasting from when the rising edge of the first pulse signal 36 is detected till when the rising edge of the second pulse signal 48 is detected. In the case where the current time falls within the third comparison term, the procedure proceeds to Step g10, and in the case where the current time does not fall within the third comparison term, the procedure proceeds to Step g13.

In Step g10, because the current time is within the third comparison term, lengths of time are compared between the third total time-length and the total period length. In the case where the third total time-length is shorter than the total period length, the procedure proceeds to Step g11, and in the case where the third total time-length is not shorter than the total period length, the procedure proceeds to Step g12.

In Step g11, the total period length is outputted, and the present flow ends. In Step g12, the third total time-length is outputted, and the present flow ends.

In Step g13, because the current time is not within the first to third comparison terms, but is within the fourth comparison term lasting from when the falling edge of the first pulse signal 36 is detected till when the falling edge of the second pulse signal 48 is detected, lengths of time are compared between the fourth total time-length and the total period length. In the case where the fourth total time-length is shorter than the total period length, the procedure proceeds to Step g14, and in the case where the fourth total time-length is not shorter than the total period length, the procedure proceeds to Step d15.

In Step g14, the total period length is outputted, and the present flow ends. In Step g15, the fourth total time-length is outputted, and the present flow ends.

Referring to FIG. 24 for explaining such operation, a rising edge of the first pulse signal 36 is detected at a time point t81 and after an edge period a has elapsed since the time point t81, a rising edge of the second pulse signal 48 is detected at a time point t82. Further, an A-phase falling edge is detected at a time point t83 after an edge period b has elapsed since the time point t82. Further, a B-phase falling edge is detected at a time point t84 after an edge period c has elapsed since the time point t83. Further, an A-phase rising edge is detected at a time point t85 after an edge period d has elapsed since the time point t84.

The third comparison term lasts from the time point t85 to a time point t87 and because the third total time-length (b+c+d+e') that is a sum of the edge measurement time e' kept from the time point t85 and the partial total period (b+c+d), is shorter than the total period length (a+b+c+d), the CPU 30 outputs the total period length #1 (a+b+c+d) as the speed information. Further, because the third total time-length (b+c+d+e') is longer from the time point t86 to the time point t87 at which a next edge is detected, the CPU 30 outputs the third total time-length #2 (b+c+d+e') as the speed information.

The second comparison term lasts from the time point t87 to a time point t89 and because the second total time-length (c+d+e+f') that is a sum of the edge measurement time f' kept from the time point t87 and the partial total period (c+d+e), is shorter than the total period length (b+c+d+e), the CPU 30 outputs the total period length #3 (b+c+d+e) as the speed information. Further, because the second total time-length (c+d+e+f') is longer from the time point t8 to the time point t89 at which a next edge is detected, the CPU 30 outputs the second total time-length #4 (c+d+e+f') as the speed information.

The fourth comparison term lasts from the time point t89 to a time point t811 and because the first total time-length (d+e+f+g') that is a sum of the edge measurement time g' kept from the time point t89 and the partial total period (d+e+f), is shorter than the total period length (c+d+e+f), the CPU 30 outputs a total period length #5 (c+d+e+f) as the speed information. Further, because the first total time-length (d+e+f+g') is longer from the time point t810 to the time point t811 at which a next edge is detected, the CPU 30 outputs the second total time-length #6 (d+e+f+g') as the speed information.

The first comparison term lasts from the time point t811 to a time point t813 and because the fourth total time-length (e+f+g+h') that is a sum of the edge measurement time h' kept from the time point t811 and the partial total period (e+f+g), is shorter than the total period length (d+e+f+g), the CPU 30 outputs a total period length #7 (d+e+f+g) as the speed information. Further, because the fourth total time-length (e+f+g+h') is longer from the time point t812 to the time point t813 at which a next edge is detected, the CPU 30 outputs the fourth total time-length #8 (e+f+g+h') as the speed information.

Such processing is repeated likewise, and the CPU 30 outputs a total period length #9 (e+f+g+h) as the speed information from the time point t813 to a time point t814. Further, from the time point t814 to a time point t815, the CPU 30 outputs the speed information the third total time-length #10 (f+g+h+i') of the partial total period (f+g+h) and the edge measurement time i'. From the time point t815 to a time point t817, the CPU 30 outputs a total period length #11 (f+g+h+i) as the speed information. Further, from the time point t817 to a time point t818, the CPU 30 outputs the speed information the second total time-length #12 (g+h+i+j') of the partial total period (g+h+i) and the edge measurement time j'. Consequently, in the case where the servo period is at a time point t816 located between the time point t815 and the time point t817, the speed information is the total period length #11 (f+g+h+i) as shown in FIG. 19.

As described above, in the encoder signal control section 25d of the present embodiment, the comparing section 29 compares length of time between the first to fourth total time-lengths, respectively, and the total period length, and gives the comparison results to the CPU 30. During each comparison term, the CPU 30 outputs a value of either the set first to fourth total time-lengths or the total period length, whichever is longer. Even such a configuration can achieve the same effect as above.

Figure 25:
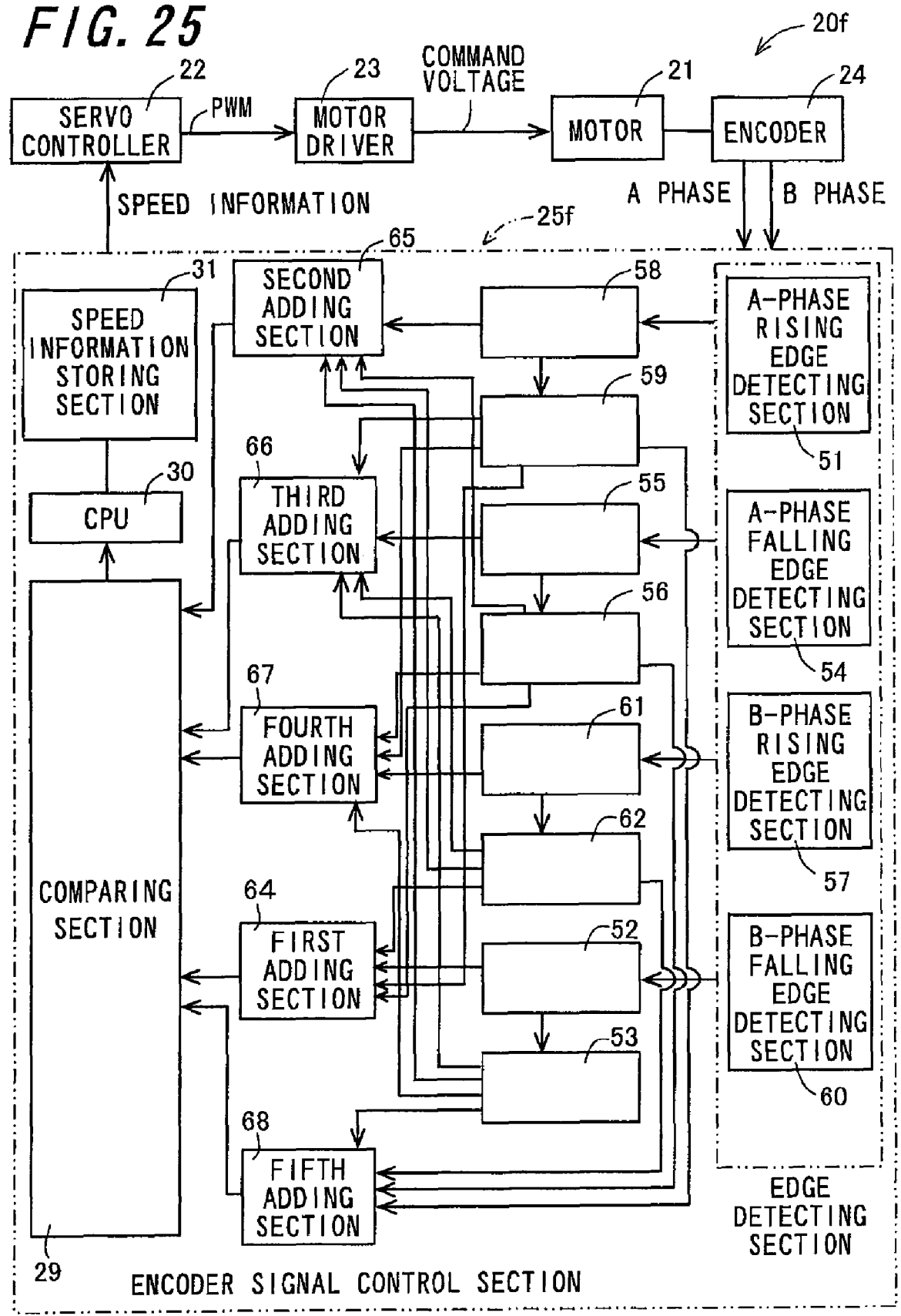
FIG. 25 is a block diagram showing an electrical configuration of a servo control system according to a ninth embodiment of the invention.

Next, a servo control system 20f according to a ninth embodiment of the invention will be explained. FIG. 25 is a block diagram showing an electrical configuration of the servo control system 20f according to the ninth embodiment of the invention. In FIG. 25, a main configuration of an encoder signal control section 25f is shown while the other parts of the configuration including, for example, the setting information storing section 32, are the same as those shown in FIG. 1 and therefore not shown. The encoder signal control section 25f shown in FIG. 25 has a configuration of detecting both edges of rising edges and falling edges of the first pulse signal 36 and the second pulse signal 48, and then computing the speed information. The encoder signal control section 25f of the present embodiment is similar to the above-described encoder signal control sections 25e and 25d of the seventh embodiment and the eighth embodiment, and the encoder signal control section 25f operates differently, so that the operation of the encoder signal control section 25f will be explained. The encoder signal control section 25f further includes five adding sections, i.e., the first to fifth adding sections 64 to 68.

The A-phase rising edge interval counting section 52 gives the A-phase rising measurement time to the first adding section 64. The A-phase falling edge interval counting section 55 gives the A-phase falling measurement time to the third adding section 66. The B-phase rising edge interval counting section 58 gives the B-phase rising measurement time to the second adding section 65. The B-phase falling edge interval counting section 61 gives the B-phase falling measurement time to the fourth adding section 67.

The A-phase rising edge interval history section 53 gives the latest stored first period to the second adding section 65, the third adding section 66, the fourth adding section 67, and the fifth adding section 68. The A-phase falling edge interval history section 56 gives the latest stored third period to the first adding section 64, the second adding section 65, the fourth adding section 67, and the fifth adding section 68.

The B-phase rising edge interval history section 59 gives the latest stored second period to the first adding section 64, the third adding section 66, the fourth adding section 67, and the fifth adding section 68. The B-phase falling edge interval history section 62 gives the latest stored fourth period to the first adding section 64, the second adding section 65, the third adding section 66, and the fifth adding section 68.

The first adding section 64 computes the first total time-length that is a sum of the given A-phase rising measurement time and the latest second period, third period, and fourth period. The first adding section 64 gives the computed first total period to the comparing section 29.

The second adding section 65 computes the second total time-length that is a sum of the given B-phase rising measurement time and the latest first period, third period, and fourth period. The second adding section 65 gives the computed second total period to the comparing section 29.

The third adding section 66 computes the third total time-length that is a sum of the given A-phase falling measurement time and the latest first period, second period, and fourth period. The third adding section 66 gives the computed third total period to the comparing section 29.

The fourth adding section 67 computes the fourth total time-length that is a sum of the given B-phase falling measurement time and the latest first period, second period, and third period. The fourth adding section 67 gives the computed fourth total period to the comparing section 29.

The fifth adding section 68 computes the total period length that is a sum of the latest first period, second period, third period, and fourth period. The fifth adding section 68 gives the computed total period length to the comparing section 29.

The comparing section 29 compares the first total time-length to the fourth total time-length given by the respective adding sections 64 to 68, respectively, with the given total period length.

During the first comparing term, the CPU 30 outputs the total period length in the case where the first total time-length is shorter than the total period length, and outputs the first total time-length in the case where the first total time-length is not shorter than the total period length, based on the comparison result of the comparing section 29.

Further, during the second comparing term, the CPU 30 outputs the total period length in the case where the second total time-length is shorter than the total period length, and outputs the second total time-length in the case where the second total time-length is not shorter than the total period length, based on the comparison result of the comparing section 29.

Further, during the third comparing term, the CPU 30 outputs the total period length in the case where the third total time-length is shorter than the total period length, and outputs the third total time-length in the case where the third total time-length is not shorter than the total period length, based on the comparison result of the comparing section 29.

Further, during the fourth comparing term, the CPU 30 outputs the total period length in the case where the fourth total time-length is shorter than the total period length, and outputs the fourth total time-length in the case where the fourth total time-length is not shorter than the total period length, based on the comparison result of the comparing section 29.

Consequently, the encoder signal control section 25f of the present embodiment can achieve the same operation and effect as those of the above-described encoder signal control sections 25e and 25d of the seventh embodiment and eighth embodiment.

In the above-described fifth to ninth embodiments, in the case where the CPU 30 outputs a value including the measurement time based on the comparison result of the comparing section 29, the computing is carried out by using the value of the measurement time without changes, but the configuration is not limited thereto and may be adapted to output a sum of the measurement time and a predetermined additional time.

To explain the specific operation of the CPU 30 with regard to the additional time, in the case where the CPU 30 outputs the first total time-length during the first comparison term, the first additional total time-length is outputted that is a sum of the first total time-length and the predetermined additional time. Further, in the case where the CPU 30 outputs the second total time-length during the second comparison term, the second additional total time-length is outputted that is a sum of the second total time-length and the predetermined additional time.

Further, in the case where the CPU 30 outputs the third total time-length during the third comparison term, the third additional total time-length is outputted that is a sum of the third total time-length and the predetermined additional time. Further, in the case where the CPU 30 outputs the fourth total time-length during the fourth comparison term, the fourth additional total time-length is outputted that is a sum of the fourth total time-length and the predetermined additional time.

The CPU 30 is thus configured to realize the configuration for the additional time. This makes it possible to achieve the above-described effect concerning the additional time.

Further, in each of the above-described embodiments, a value outputted by the CPU 30 may be determined to be valid when the value is equal to or lower than a boundary value that is set based on the speed of the driven body, while the value may be determined to be invalid when the value is larger than the above boundary value.

When the drive means displaces the driven body by a predetermined amount of displacement, the one pulse signal 36 is generated and therefore, the time required for movement over the amount of displacement is the speed information to be inputted from the encoder signal control section 25 to the servo controller 22. Consequently, a value obtained by dividing the above amount of displacement by the speed information is the speed of the driven body.

Figure 26:
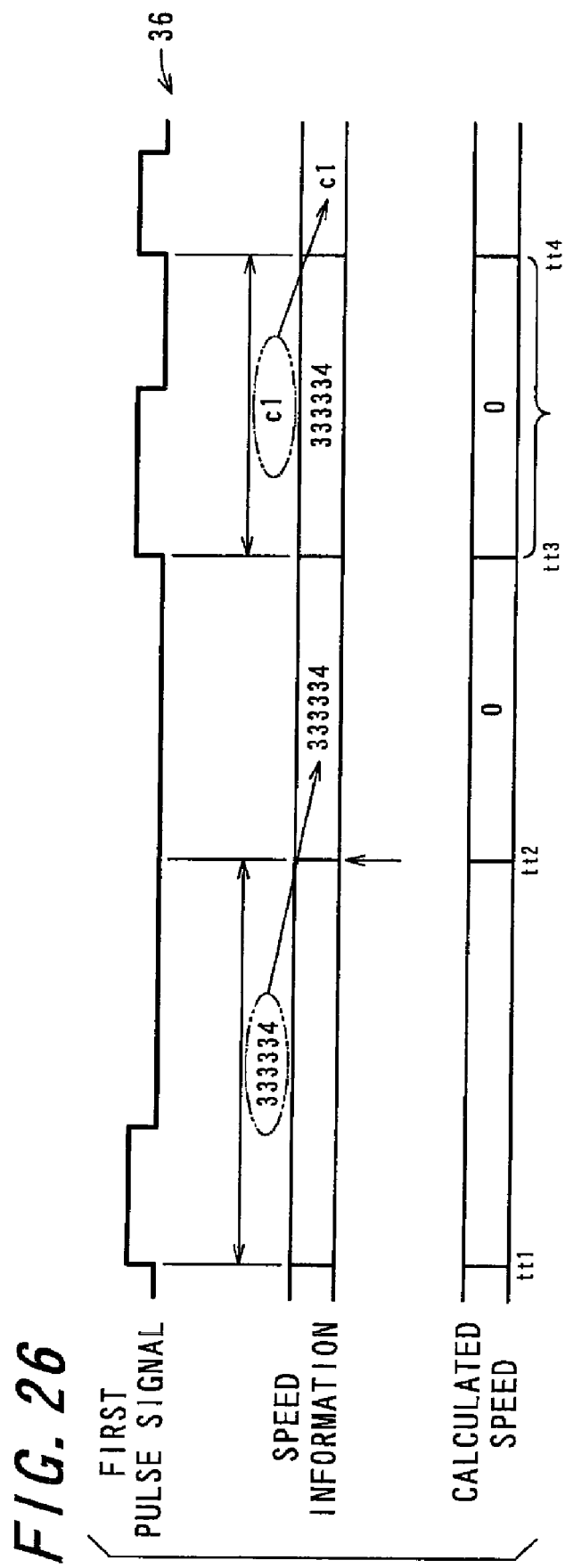
FIG. 26 is a timing chart for explaining operation of the CPU in a case where speed information exceeds a maximum value.

On the basis of the accuracy in calculating the speed, the maximum value is determined that is a boundary value of the servo speed information outputted from the encoder signal control section 25 to the servo controller 22. FIG. 26 is a timing chart for explaining the operation of the CPU 30 in a case where speed information exceeds the maximum value.

The maximum value of the servo speed information outputted from the encoder signal control section 25 to the servo controller 22 is obtained by the following expression (1) wherein, for example, the amount of displacement of the driven body regarding the generation of the pulse signal 36 is set at $1/600$ inches; one counter of the period counted by the edge detecting section 26 is set at 500 nanoseconds; and the accuracy in calculating the speed calculated based on the speed information is set at two decimal places.

When the accuracy in calculating the speed is set at two decimal places, the minimum value of the speed information at which the calculated speed becomes zero means that the calculated speed obtained by dividing the above-stated amount of displacement by time is less than 0.01 and determined in the following expression (1). Now, the amount of displacement is ($1/600$) inches as mentioned above, and the time is ($\alpha \times 500/1000000000$) seconds wherein $\alpha$ represents a period counter of the speed information.

$$(1/600)/(\alpha \times 500/1000000000) < 0.01 \quad (1)$$

Accordingly, when $\alpha$ is 333334 counts or more, the expression (1) is satisfied by truncation to two decimal places.

Consequently, 333334 counts are the maximum value of the speed information $\alpha$, and the setting is such that when the speed information α becomes the maximum value or more, the calculated speed will turn to zero, that is, to be invalid.

As shown in FIG. 26, the period of the first pulse starting at a time point tt1 is longer than the above-mentioned maximum value of the speed information, i.e., 333334 counts, and the setting is therefore such that the calculated speed will be zero from a time point tt2 to a time point tt4 at which the period of the first pulse becomes less than the maximum value of the speed information.

The setting is such that in the case where the driven body starts to be driven from the resting state, the calculated speed will be zero until the amount of displacement (travel distance) of the moving driven body turns out. If the calculated speed is not zero but a predicted value, the servo control may be unstable at the time of starting driving, while the above setting allows for the stable control with the calculated speed which is zero until the amount of displacement of the moving driven body turns out.

When the speed information outputted by the CPU 30 becomes too large, the speed calculated based on the outputted speed information becomes close to zero, with the result that the maximum value as described above is set and the speed information equal to or less than the maximum value is determined to be valid while the speed information larger than the maximum value is determined to be invalid, thereby allowing for calculation of the speed of the driven body based on only the output value determined to be valid. Consequently, too large speed information is not used to calculate a speed, thereby allowing for prevention of calculation of undesired speed level.

Figure 27:
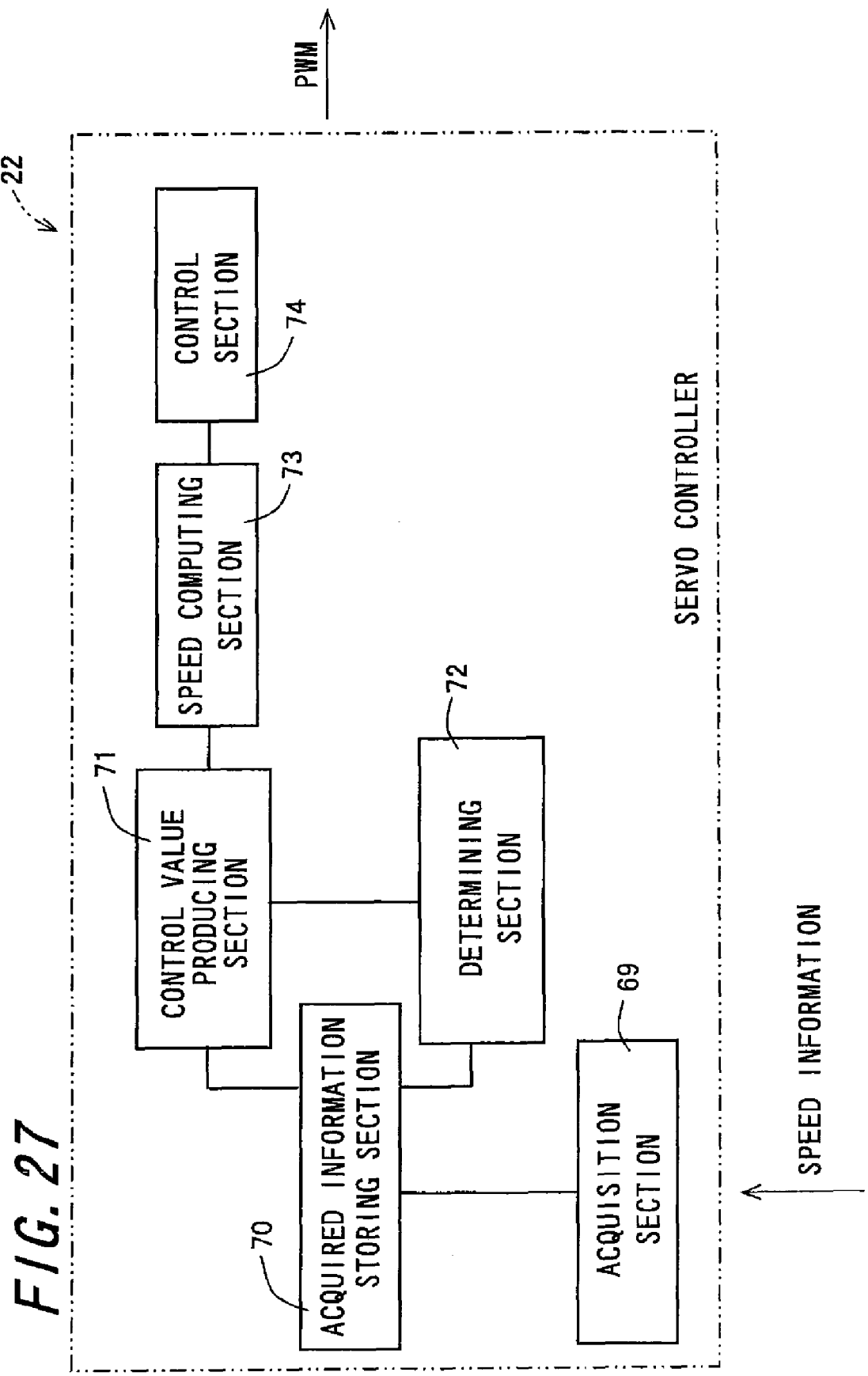
FIG. 27 is a block diagram showing a configuration of a servo controller constituting a servo control system according to a tenth embodiment of the invention.

Next, a servo control system 20 according to a tenth embodiment of the invention will be explained. FIG. 27 is a block diagram showing a configuration of a servo controller 22 constituting a servo control system 20 according to the tenth embodiment of the invention. The servo controller 22 shown in FIG. 27 is a control device and reads out for every servo period the speed information stored in the speed information storing section 31 of the encoder signal control section 25 as well as the position information stored in the setting information storing section 32 of the encoder signal control section 2S, then computing the speed based on the read-out speed information and position information. The servo controller 22 outputs the most suitable control information to the motor driver 23 based on the computed speed and position as well as the target position and the target speed.

The encoder signal control section 25 of the present embodiment is configured so that the speed information and position information stored in various parts of the encoder signal control section 25 are updated when the edge of the pulse signal inputted by the encoder 24 is detected. If only one of the position information and the speed information is updated while the other one is not updated even when the edge of the pulse signal is detected, the accuracy of the position information and the speed information will deteriorate. Consequently, the encoder signal control section 25 is configured so that the speed information and the position information are updated every time the edge of the pulse signal is detected.

The servo controller 22 includes an acquisition section 69, an acquired information storing section 70, a determining section 72, a control value producing section 71, a speed computing section 73, and a control section 74. The acquisition section 69 is acquisition means and acquires speed information and position information that correspond to a predetermined amount of displacement of the driven body being driven and displaced by the drive means, at regular or irregular intervals which are, in the present embodiment, for every servo period.

The acquired information storing section 70 is acquired information storing means and stores in chronological order the speed information and position information acquired by the acquisition section 69. The determining section 72 is determining means and determines whether or not the acquired position information is constant over a predetermine time, based on the speed information stored in the acquired information storing section 70. In other words, the determining section 72 determines whether or not the acquired position information changes over a certain length of time.

The control value producing section 71 is control value producing means and outputs, based on a determination result of the determining section 72, a control value that is a sum of the speed information and a predetermined set value in a case where the acquired position information does not change over a certain length of time, while outputting the speed information as a control value in a case where the acquired position information changes. It is preferable to gradually increase the predetermined set value which is to be added to the speed information, after a certain length of time has elapsed since the position information being acquired stopped to change. This allows the calculated speed to become not immediately zero but gradually closer to zero in the case where the position information does not change. Such a set value is gradually increased to bring the calculated speed closer to zero until the calculated speed becomes zero, and after the calculated speed reaches zero, the set value does not have to be increased. Moreover, the addition of the predetermined set value to the speed information may be replaced by multiplication of a predetermined rate. Further, in the case where the driven body is driven at constant speed, for example, the acquired speed information will theoretically have a constant value while the acquired position information will change. The control value producing section 71 outputs the acquired speed information as a control value in the case where the position information changes even when the acquired speed information has a constant value.

The speed computing section 73 is speed computing means and computes the speed of the driven body based on the control value outputted by the control value producing section 71 and the predetermined amount of displacement of the driven body. The control section 74 is control means and outputs the most suitable control information to the motor driver 23 based on the speed computed by the speed computing section 73 and the position information stored in the acquired information storing section 70 as well as the target position and the target speed.

Figure 28:
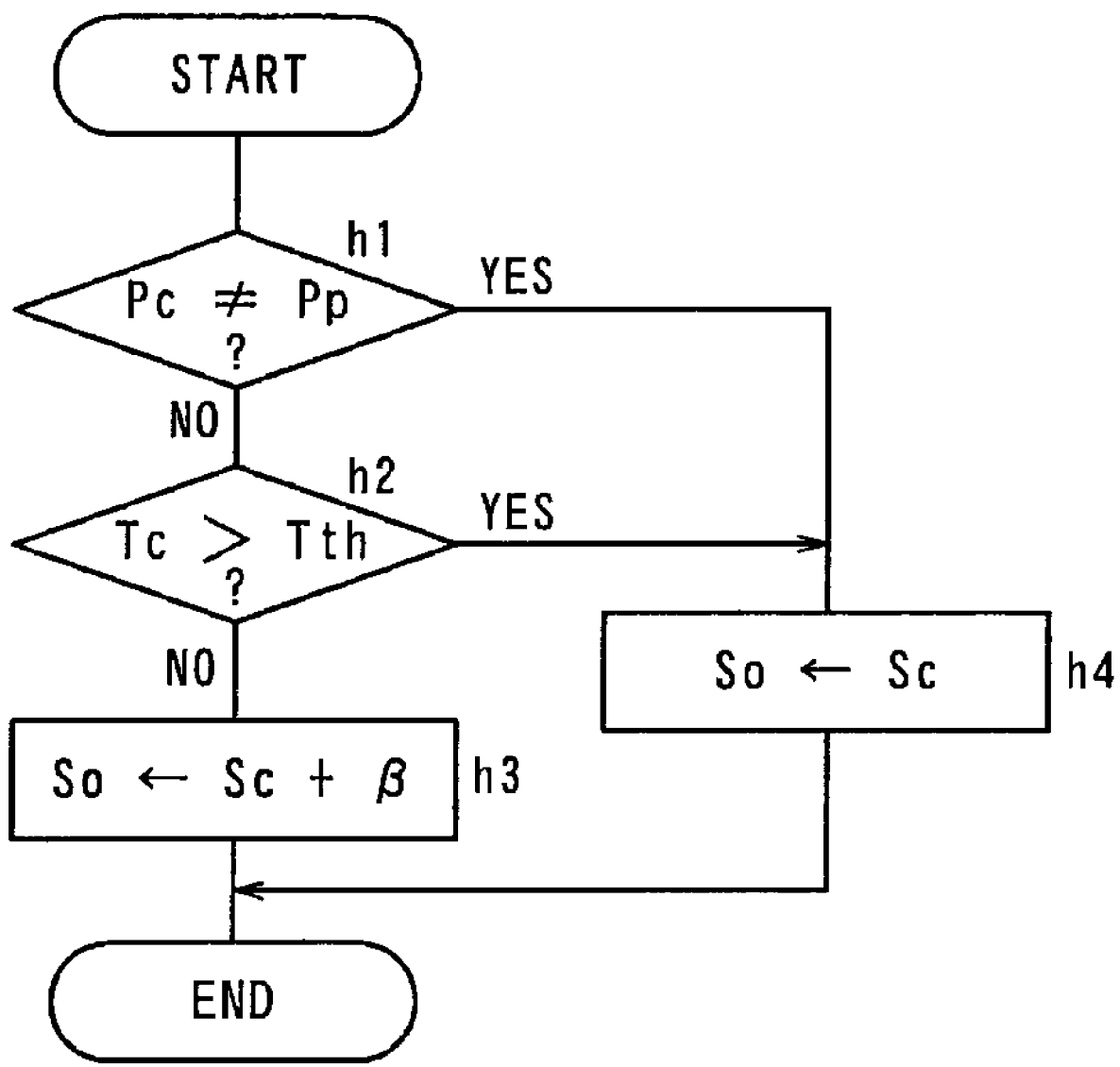
FIG. 28 is a flowchart showing processing in a control value producing section of the servo controller.
Figure 29:
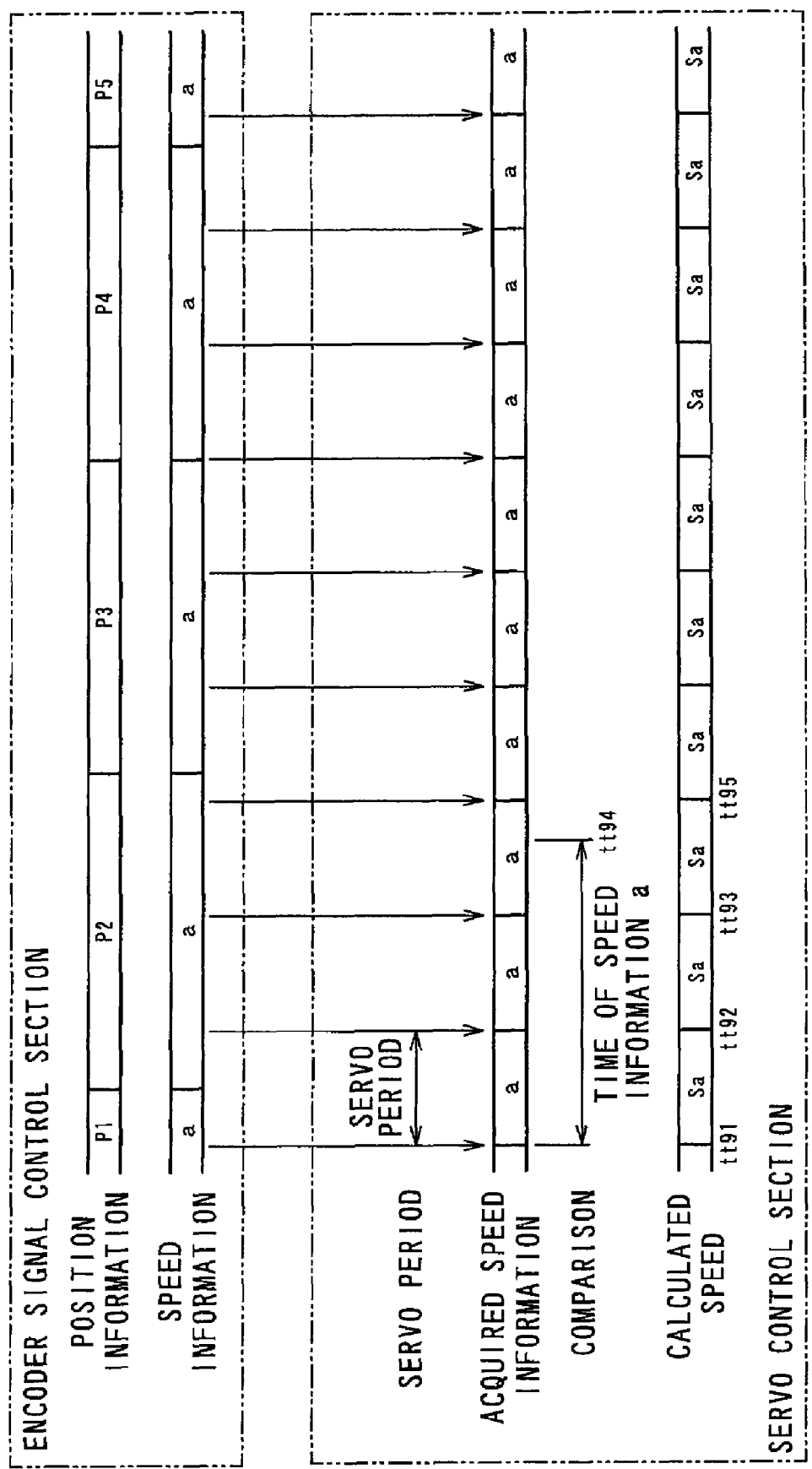
FIG. 29 is a view for explaining operation of a speed computing section in a case where position information is changing.
Figure 30:
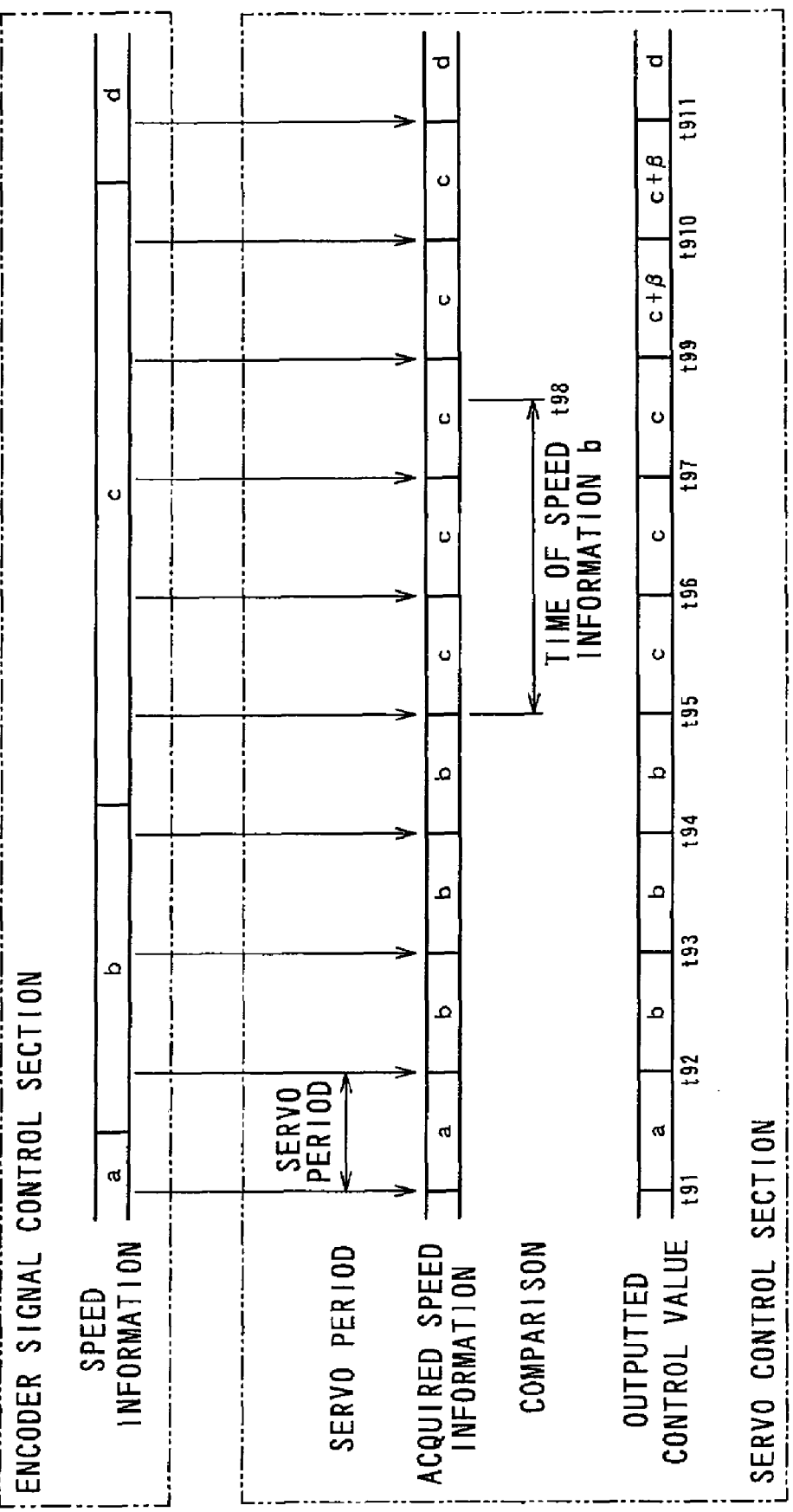
FIG. 30 is a view for explaining operation of speed computing section in a case where the position information is not changing.

Next, operation of the servo controller 22 will be explained with use of a flowchart. FIG. 28 is a flowchart showing processing in the control value producing section 71 of the servo controller 22. The processing is carried out repeatedly in a power-on state. Further, the processing is carried out repeatedly only in the case of driving the driven body. FIG. 29 is a view for explaining operation of the speed computing section 73 in the case where the position information is changing. FIG. 30 is a view for explaining operation of the speed computing section 73 in the case where the position information is not changing.

In Step h1, acquired position information Pc is compared with position information Pp stored in the acquired information storing section 70. In the case where the position information is different, the procedure proceeds to Step h4, and in the case where the position information is constant, the procedure proceeds to Step h2.

In Step h2, it is determined whether or not a time Tc of the acquired speed information is longer than a time Tth that the acquired position information does not change. In the case where the time Tc is longer than the time Tth, the procedure proceeds to Step h4, and in the case where the time Tc is not longer than the time Tth, the procedure proceeds to Step h3. Consequently, in Step h1 and Step h2, it is determined whether or not the acquired position information changes over a certain length of time. In the case where the acquired position information does not change over the certain length of time, the procedure proceeds to Step h3, and in the case where the acquired position information changes over the certain length of time, the procedure proceeds to Step h4.

In Step h3, a sum of speed information Sc and a predetermined set value β is outputted as a control value So, and the present flow ends. In Step h4, the acquired speed information Sc is outputted as the control value So, and the present flow ends.

Referring to FIG. 29 for explaining operation in the case where the above-mentioned position information is changing, speed information a is acquired at a time point tt91, and a calculated speed Sa is calculated based on the speed information a. At a time point tt94 at which the time of speed information a has elapsed since the time point tt91, although the time of speed information a has elapsed, the position information acquired at the time point tt94 is position information P2 which is thus different from position information P1 acquired at the time point tt91. Consequently, the position information is different and therefore, the calculated speed will be the calculated speed Sa as described above.

Referring to FIG. 30, explanation will be given as to the operation in the case where the above-mentioned position information is changing. FIG. 29 shows the case where the position information changes for every servo period. At the time point t91, the speed information a is acquired and the time of speed information a has not elapsed, with the result that the speed information a is outputted as a control value. Moreover, from a time point t92 to a time point t94, speed information b is acquired, with the result that the speed information b is outputted as a control value likewise.

Further, from a time point t95 to a time point t99, speed information c is acquired, with the result that the speed information c is outputted. From the time point t95 to a time point t98 at which the time of speed information b has elapsed, the acquired position information is different and its length of time is shorter than the time of acquired speed information, with the result that the control value will be the speed information c as described above.

The acquired position information is constant after the time point t95, and the length of time from the time point t95 becomes longer than the length of time of the speed information b after the time point t98, with the result that a control value (c+β) obtained by adding a predetermined set value step by step to the speed information c is outputted from the time point t99 at which a next servo period starts, to a time point t911 at which the speed information changes.

As described above, the control value producing section 71 outputs the control value that is a sum of the speed information and the set value in the case where the acquired position information does not change over a certain length of time while outputting the speed information as the control value in the case where the acquired position information changes in the certain length of time. In the case where the acquired position information does not change over the certain length of time, the amount of displacement of the driven body is small and it is therefore presumable that the speed becomes lower gradually, with the result that the increase in number by the addition of the set value to the speed information can make the calculated speed gradually lower. This allows for more accurate calculation of the speed of the driven body even when the driven body becomes lower in speed.

Figure 31:
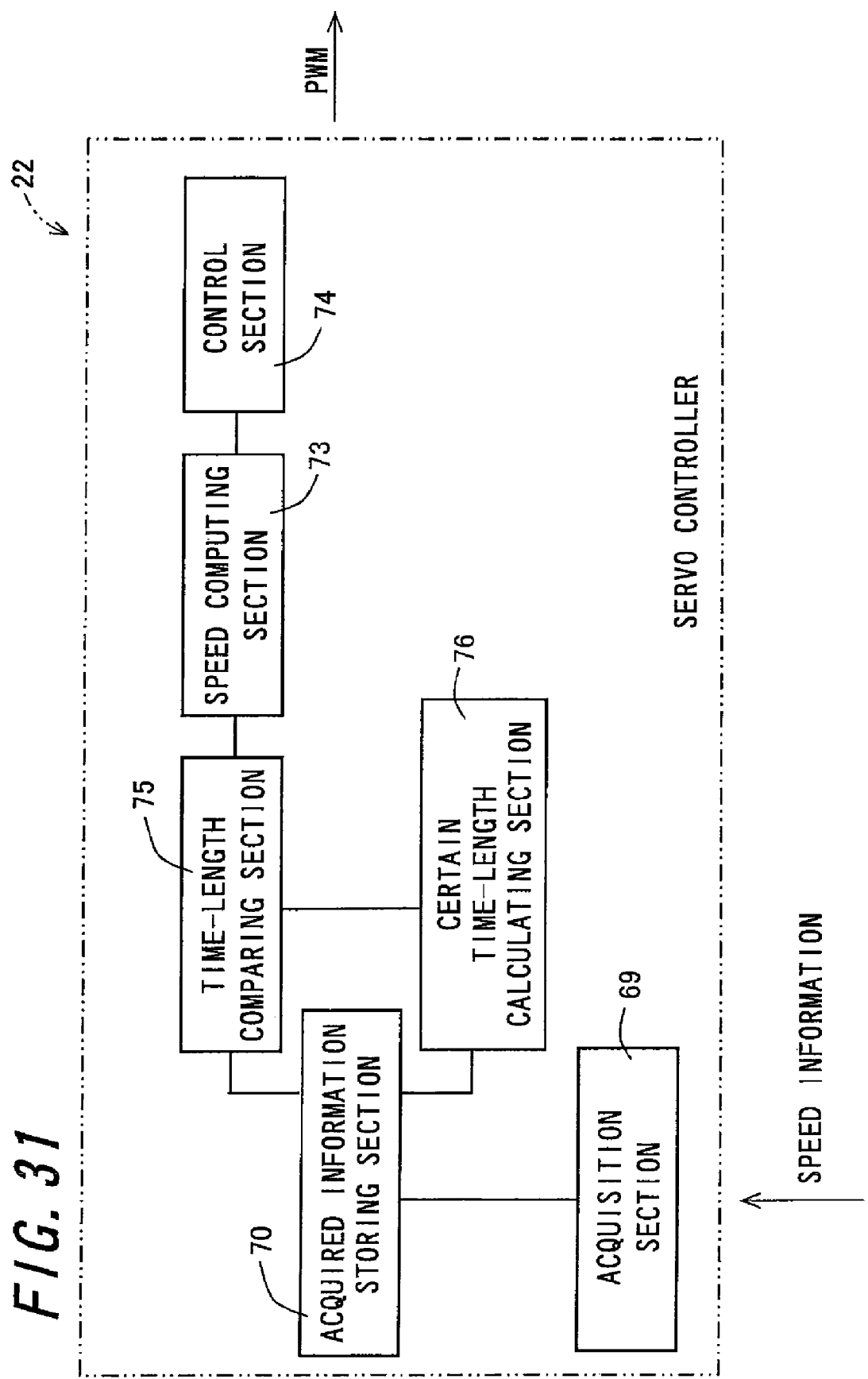
FIG. 31 is a block diagram showing a configuration of a servo controller constituting a servo control system according to an eleventh embodiment of the invention.

Next, a servo control system 20 according to an eleventh embodiment of the invention will be explained. FIG. 31 is a block diagram showing a configuration of a servo controller 22 constituting a servo control system 20 according to the eleventh embodiment of the invention. The servo controller 22 shown in FIG. 31 has a configuration similar to that of the servo controller 22 of the tenth embodiment and therefore, different configuration will be explained while explanation of the same configuration may be omitted.

The servo controller 22 includes an acquisition section 69, an acquired information storing section 70, a certain time-length calculating section 76, a time-length comparing section 75, a speed computing section 73, and a control section 74. The certain time-length calculating section 76 is certain time-length calculating means and calculates a length of time from change of the position information acquired by the acquisition section 69 to next change of the position information. In other words, the certain time-length calculating section 76 calculates how long the position information being acquired has not changed.

The time-length comparing section 75 is time-length comparing means and compares lengths of time between the length of time calculated by the certain time-length calculating section 76 and the length of time of the speed information stored in the acquired information storing section 70.

The speed computing section 73 is the speed computing means and computes the speed of the driven body based on the speed information acquired by the acquisition section 69 and a predetermined amount of displacement of the driven body in the case where the length of time that the position information has not changed is shorter than the time of speed information while computing a provisional speed of the driven body based on the speed information acquired by the acquisition section 69 and a predetermined amount of displacement of the driven body and then subtracting the predetermined set value from the provisional speed to compute the speed of the driven body in the case where the length of time that the position information has not changed is not shorter than the time of speed information, based on a comparison result of the time-length comparing section 75.

It is preferable to gradually decrease the predetermined set value which is to be subtracted from the provisional speed, after a certain length of time has elapsed since the position information being acquired has stopped to change. This allows the calculated speed to become not immediately zero but gradually closer to zero in the case where the position information does not change. Such a set value is gradually decreased to bring the calculated speed closer to zero until the calculated speed becomes zero, and after the calculated speed reaches zero, the set value does not have to be decreased. The subtraction of the predetermined set value from the provisional speed may be replaced by division by a predetermined ratio.

Figure 32:
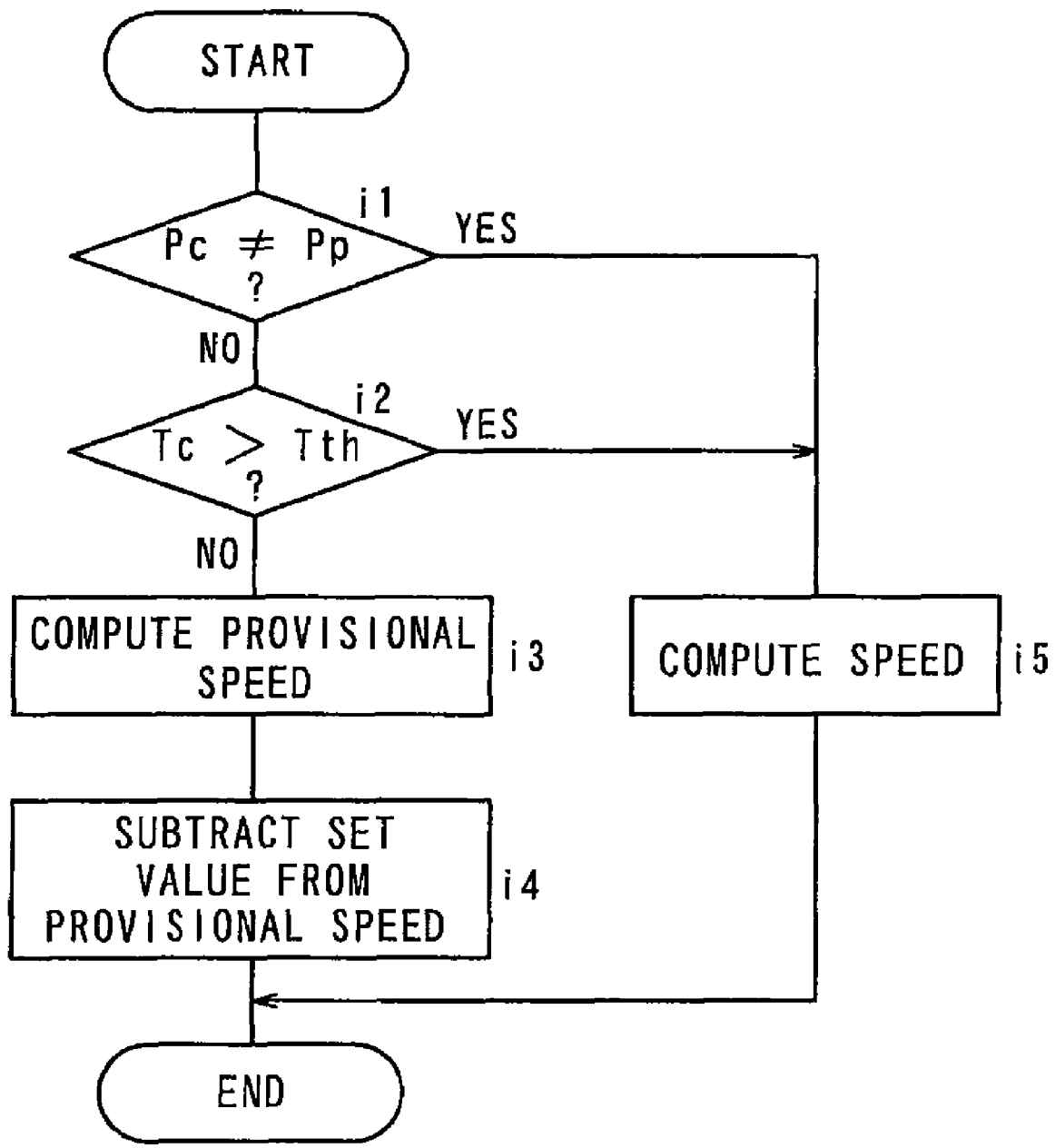
FIG. 32 is a flowchart showing processing in a speed computing section of the servo controller.
Figure 33:
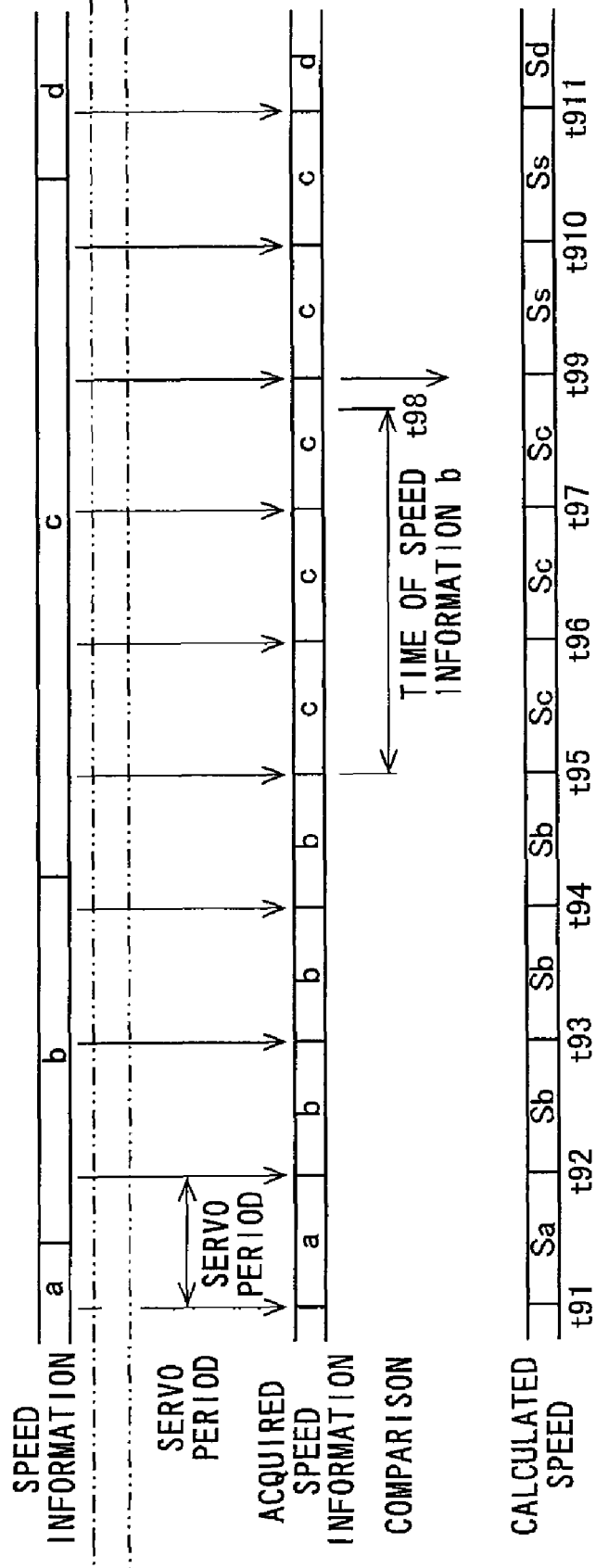
FIG. 33 is a view for explaining operation of the speed computing section shown in FIG. 32.
Figure 34:
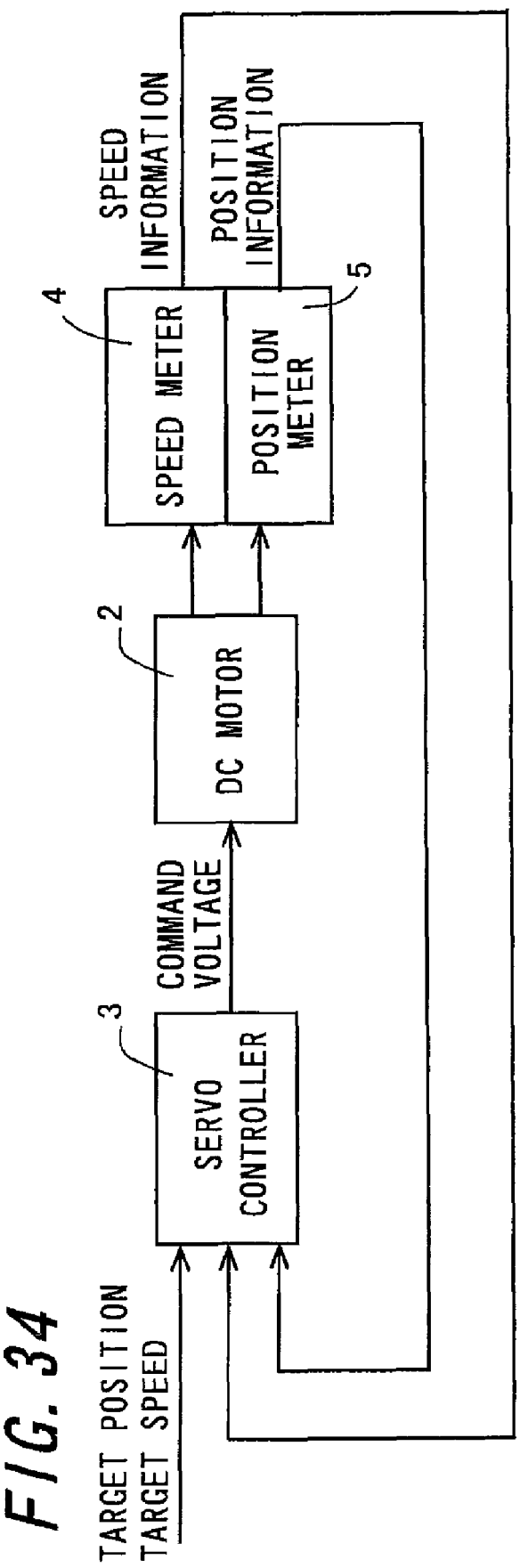
FIG. 34 is a block diagram showing an electrical configuration of a servo control system used in an inkjet apparatus of the conventional art.

Next, operation of the servo controller 22 will be explained with use of a flowchart. FIG. 32 is a flowchart showing processing in the speed computing section 73 of the servo controller 22. The processing is carried out repeatedly in a power-on state. Further, the processing is carried out repeatedly only in the case of driving the driven body. FIG. 33 is a view for explaining operation of the speed computing section 73.

In Step i1, acquired position information Pc is compared with position information Pp stored in the acquired information storing section 70. In the case where the position information is different, the procedure proceeds to Step i5, and in the case where the position information is constant, the procedure proceeds to Step i2.

In Step i2, it is determined whether or not a time Tc of the acquired speed information is longer than a time Tth that the acquired position information has not changed. In the case where the time Tc is longer than the time Tth, the procedure proceeds to Step i2, and in the case where the time Tc is not longer than the time Tth, the procedure proceeds to Step i3. Consequently, in Step it and Step i2, it is determined whether or not the acquired position information has changed over a certain length of time. In the case where the acquired position information has not changed over the certain length of time, the procedure proceeds to Step i5, and in the case where the acquired position information has changed over the certain length of time, the procedure proceeds to Step i3.

In Step i5, the speed of the driven body is computed based on the latest speed information acquired by the acquisition section 69 and the predetermined amount of displacement of the driven body, and the present flow ends. In Step i3, the provisional speed of the driven body is computed based on the latest speed information acquired by the acquisition section 69 and the predetermined amount of the displacement of the driven body, and then the procedure proceeds to Step i4. In Step i4, the speed of the driven body is computed by subtracting the predetermined set value from the provisional speed, and the present flow ends.

Referring to FIG. 33 for explaining the above-described operation, speed information a is acquired at a time point t91, and a calculated speed Sa is calculated based on the speed information a. Further, from a time point t92 to a time point t94, speed information b is acquired, with the result that a calculated speed Sb is calculated.

Moreover, from a time point t95 to a time point t99, speed information c is acquired, with the result that a calculated speed Sc is calculated. From the time point t95 to a time point t98 at which the time of speed information b has elapsed, the acquired position information is constant and its length of time is shorter than the time of acquired speed information, with the result that the calculated speed will be the calculated speed Sc as described above.

The length of time that the acquired position information is constant becomes longer than the time of speed information b after the time point t98, with the result that from the time point t99 at which a next servo period starts to the time point t911 at which the position information changes, the calculated speed will be a calculated speed Ss that is obtained by using the calculated speed Sc as a provisional speed and subtracting the predetermined set value step by step from the provisional speed.

As described above, the speed computing section 73 computes a provisional speed of the driven body based on the acquired speed information and the amount of displacement of the driven body and then subtracting the predetermined set value from the provisional speed to thereby compute the speed of the driven body in the case where the length of time that the position information is constant is not shorter than the time of speed information based on the comparison result. In the case where the length of time that the acquired position information is constant is not shorter than the time of speed information, the amount of displacement of the driven body is small and it is therefore presumable that the speed becomes lower gradually, with the result that the decrease of the computed speed by the subtraction of the set value from the computed provisional speed can make the calculated speed lower. This allows for more accurate calculation of the speed of the driven body even when the driven body becomes lower in speed.

Further, in the embodiment, the speed is computed by subtracting the predetermined set value from the provisional speed, to which the method is not limited, and the speed may be computed by, for example, multiplying the provisional speed by a predetermined damping rate.

Consequently, the length of time that the acquired position information is constant becomes longer than the time of speed information b after the above-mentioned time point t98, with the result that from the time point t99 at which a next servo period starts to the time point t911 at which the position information changes, the calculated speed will be a calculated speed Ss that is obtained by multiplying the provisional speed by a predetermined damping rate.

By accurately setting such a damping rate for decreasing the speed, it is possible to calculate the speed of the driven body with higher accuracy.

Further, the above-mentioned damping rate is preferably set to become smaller as the length of time that the acquired position information is constant becomes longer. It is therefore presumable that the speed becomes lower with the lapse of time, with the result that a gradual decrease of the damping rate allows for more accurate calculation of the speed of the driven body.

The above-described servo controller 22 of the tenth and eleventh embodiments incorporates the control section 74 which outputs control to the motor driver 23, and the speed computing section 73 which computes the speed based on the speed information given by the encoder signal control section 25, but the speed computing section 73 and the control section 74 may be configured separately.

Accordingly, the speed computing section 73 may be adapted to compute the speed based on the speed information given by the encoder signal control section 25 and then give the computed speed to the servo controller 22.

The above-described servo controller 22 of the tenth and eleventh embodiments is capable of calculating the speed of the driven body with higher accuracy by outputting as a control value either a length of time lasting from change of the position information to next change of the position information or the time of the latest acquired speed information, whichever is longer, even in the case of using the encoder signal control section 25 which updates the position information and the speed information separately.

Owing to such configurations of the above-described embodiments, the accuracy of the speed information relating to the servo control can be enhanced, which allows for stabilization of the servo operation. Moreover, the encoder signal control section 25 of the invention does not use hardware for the accurate pulse signal 36 but is capable of stabilizing the servo control by using software, thereby allowing for reduction in production cost.

The encoder in each of the above-described embodiments is configured to generate the pulse signal 36 based on the amount of displacement of the driven body which is displaced linearly, but an encoder is not limited to the encoder as above and only needs to be configured to generate the pulse signal 36 according to the amount of displacement of the driven body which is displaced. For example, the encoder may be adapted to detect an amount of angular displacement of the driven body.

Further, the servo control system in each of the above-described embodiments may be mounted in not only an inkjet apparatus but also a facsimile machine and a copier, and when mounted in various devices controlling positions of the driven bodies, the servo control system is capable of controlling the speed of the driven body with accuracy.

Further, the storing means which constitutes each of the above-described embodiments and stores provided information in chronological order, only needs to have a predetermined storage capacity and is preferably configured to delete the oldest information every time new information is given, for example. This makes it possible to realize the storing means without increasing the storage capacity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, the lengths of time are compared between the measurement time kept by the timer means and the latest edge period, and on the basis of its comparison result, a value of either the measurement time or the period, whichever is longer, is outputted. In the conventional art, the latest edge period is merely outputted until detection of next edge period, but in the present invention, the measurement time is outputted in the case where the measurement time is longer than the latest edge period, with the result that the period of the pulse signal can be accurately predicted and be a real-time approximate. This allows for accurate calculation of the speed of the driven body based on the accurately outputted period of the pulse signal. Consequently, the accuracy in detecting the speed of the driven body can be enhanced so that the drive means can be stably controlled.

Further, according to the invention, the output means outputs the latest period in the case where the measurement time is shorter than the above period while outputting a sum of the measurement time and the additional time in the case where the measurement time is not shorter than the above period, based on the comparison result. In the case where the measurement time is not shorter than the above period, the measurement time becomes longer with the lapse of time and it is therefore possible to obtain a value more approximate to an actual speed of the driven body by adding the additional time in advance. This allows for more accurate calculation of the speed of the driven body.

Furthermore, according to the invention, the rising edge and the falling edge of the pulse signal are both detected individually and from when the falling edge of the pulse signal is detected till when the rising edge of the pulse signal is detected, a value is outputted of either the rising measurement time or the falling period, whichever is longer based on the comparison result of the first comparing means, and from when the rising edge of the pulse signal is detected till when the falling edge of the above pulse signal is detected, a value is outputted of either the falling measurement time or the rising period, whichever is longer based on the comparison result of the second comparing means. Intervals to be compared are therefore shorter than those between the rising edges, with the result that the period of the pulse signal can be accurately predicted and be a real-time approximate. This allows for accurate calculation of the speed of the driven body based on the accurately outputted period of the pulse signal. Consequently, the accuracy in detecting the speed of the driven body can be enhanced so that the drive means can be stably controlled.

Furthermore, according to the invention, the output means outputs a sum of the rising measurement time or the falling measurement time and the additional time in the case of outputting the rising measurement time or the falling measurement time based on the comparison result. As a result, because the rising measurement time or the falling measurement time becomes longer with the lapse of time, it is possible to obtain a value more approximate to an actual speed of the driven body by adding the additional time in advance. This allows for more accurate calculation of the speed of the driven body.

Furthermore, according to the invention, the lengths of time are compared between the measurement time kept by the timer means and the second last period stored in the storing means, and then outputted is a value that is a sum of either the measurement time or the second last period, whichever is longer based on the comparison result. Intervals to be compared are therefore shorter than those between the rising edges or the falling edges, with the result that the period of the pulse signal can be accurately predicted and be a real-time approximate. This allows for accurate calculation of the speed of the driven body based on the accurately outputted period of the pulse signal. Consequently, the accuracy in detecting the speed of the driven body can be enhanced so that the drive means can be stably controlled.

Furthermore, according to the invention, the output means outputs a value that is obtained by adding the predetermined additional time furthermore to the sum of the measurement time and the latest period in the case of outputting a value including the measurement time based on the comparison result. Because the measurement time becomes longer with the lapse of time, it is possible to obtain a value more approximate to an actual speed of the driven body by adding the additional time in advance. This allows for more accurate calculation of the speed of the driven body.

Furthermore, according to the invention, the rising edges and the falling edges, respectively, of the first pulse signal and the second pulse signal out of phase with the first pulse signal by about 90 degrees in electric angle, are detected individually. The first to fourth comparing sections respectively compare the periods of the first pulse signal and second pulse signal with the edge measurement time of the respective pulse signals, and then outputted is a value of either the period or the edge measurement time whichever is longer based on the comparison result. Accordingly, the use of the two pulse signals out of phase with each other will make the intervals to be compared shorter than those in the case of using one pulse signal, with the result that the period of the pulse signal can be accurately predicted and be a real-time approximate. This allows for accurate calculation of the speed of the driven body based on the accurately outputted period of the pulse signal. Consequently, the accuracy in detecting the speed of the driven body can be enhanced so that the drive means can be stably controlled.

Furthermore, according to the invention, the output means outputs a sum of the edge measurement time of each pulse signal and the additional time in the case of outputting the edge measurement time of each pulse signal based on the comparison result. As a result, because the measurement time becomes longer with the lapse of time, it is possible to obtain a value more approximate to an actual speed of the driven body by adding the additional time in advance. This allows for more accurate calculation of the speed of the driven body.

Furthermore, according to the invention, the rising edges and the falling edges, respectively, of the first pulse signal and the second pulse signal out of phase with the first pulse signal by about 90 degrees in electric angle, are detected individually. The output means outputs the total period length in the case where each measurement time is shorter than each of the latest periods, and outputs the first to fourth total time-lengths, each of which is a sum of each measurement time and the other periods in the case where each measurement time is not shorter than the latest period. Accordingly, the use of the two pulse signals out of phase with each other will make the intervals to be compared shorter than those in the case of using one pulse signal, with the result that the period of the pulse signal can be accurately predicted and be a real-time approximate. This allows for accurate calculation of the speed of the driven body based on the accurately outputted period of the pulse signal. Consequently, the accuracy in detecting the speed of the driven body can be enhanced so that the drive means can be stably controlled.

Furthermore, according to the invention, each comparing means compares the measurement time kept by each timer means and the latest period stored in each storing means. Even such comparing means can achieve the same effect as above.

Furthermore, according to the invention, each comparing means compares each total time-length and the total period length. Even such comparing means can achieve the same effect as above.

Furthermore, according to the invention, the output means outputs each additional total time-length that is a sum of each total time-length and the predetermined additional time in the case of outputting each total time-length. As a result, because each total time-length includes the measurement time, the measurement time becomes longer with the lapse of time. Such addition of the additional time to each total time-length in advance makes it possible to obtain a value more approximate to an actual speed of the driven body. This allows for more accurate calculation of the speed of the driven body.

Furthermore, according to the invention, the value outputted by the output means is determined to be valid in the case where the value is equal to or lower than the boundary value that is set based on the speed of the driven body, which the value is determined to be in valid in the case where the value is larger than the above boundary value. When the value outputted by the output means becomes too large, the value calculated based on the outputted value becomes closer to zero, with the result that by setting the boundary value in advance, the speed of the driven body can be calculated only based on the output value determined to be valid. This makes it possible to achieve the desired control.

Furthermore, according to the invention, the control value producing means outputs the control value that is a sum of the speed information and the predetermined value in the case where the acquired speed information is the constant value, while outputting the speed information as a control value in the case where the acquired speed information is not the constant value, based on the determination result of the determining means. In the case where the speed information is the constant value over the predetermined length of time, the amount of displacement of the driven body is small and it is therefore presumable that the speed becomes lower gradually, with the result that the increase in number by the addition of the predetermined value to the speed information can make the calculated speed gradually lower. This allows for more accurate calculation of the speed of the driven body even when the driven body becomes lower in speed.

Furthermore, according to the invention, the speed computing means computes the provisional speed of the driven body based on the acquired speed information and the amount of displacement of the driven body in the case where the certain length of time is not shorter than the speed information obtained before the certain length of time, based on the comparison result, followed by subtracting the predetermined value from the provisional speed to thereby compute the speed of the driven body. In the case where the certain length of time is not shorter than the speed information obtained before the certain length of time, the amount of displacement of the driven body is small and it is therefore presumable that the speed becomes lower gradually, with the result that the decrease of the computed speed by the subtraction of the predetermined value from the computed provisional speed can make the calculated speed lower. This allows for more accurate calculation of the speed of the driven body even when the driven body becomes lower in speed.

Further, according to the invention, in the case where the certain length of time is not shorter than the speed information obtained before the certain length of time, the provisional speed of the driven body is computed based on the acquired speed information and the predetermined amount of displacement of the driven body, and the above provisional speed is multiplied by the predetermined damping rate to thereby computes the speed of the driven body. It is therefore possible to calculate the speed of the driven body with higher accuracy by accurately setting the damping rate for decreasing the speed.

Furthermore, according to the invention, the damping rate is set to be smaller as the above certain length of time becomes longer. It is presumable that the speed becomes lower with the lapse of time, and a gradual decrease of the damping rate therefore allows for more accurate calculation of the speed of the driven body.

Furthermore, according to the invention, the lengths of time are compared between the kept measurement time and the latest edge period, and then outputted is the value of either the measurement time or the period, whichever is longer based on the comparison result. In the conventional art, the latest edge period is merely outputted until detection of next edge period, but in the present invention, the measurement time is outputted in the case where the measurement time is longer than the latest edge period, with the result that the period of the pulse signal can be a real-time approximate with accuracy. This allows for accurate calculation of the speed of the driven body based on the accurately outputted period of the pulse signal. Consequently, the accuracy in detecting the speed of the driven body can be enhanced so that the drive means can be stably controlled.

Furthermore, according to the invention, the control vale obtained by adding the predetermined value to the speed information is outputted in the case where the acquired speed information is the constant value while the speed information is outputted as the control value in the case where the acquired speed information is not the constant value, based on the determination result. In the case where the speed information is the constant value over the predetermined length of time, the amount of displacement of the driven body is small and it is therefore presumable that the speed becomes lower gradually, with the result that the increase in number by the addition of the predetermined value to the speed information can make the calculated speed gradually lower. This allows for more accurate calculation of the speed of the driven body even when the driven body becomes lower in speed.

The invention claimed is:

1. A control device that controls drive means, the control device comprising:
periodic signal acquisition means for acquiring a pulse signal having a period that corresponds to a speed of a driven body being displaced depending on drive by the drive means;

edge detecting means for detecting either a rising or falling edge of the pulse signal;

timer means for starting timekeeping from a time point when the edge is detected by the edge detecting means;

computing means for computing, after an edge is detected by the edge detecting means, a period between the presently detected edge and an immediately previously detected edge;

storing means for storing in chronological order the period of edge computed by the computing means;

comparing means for comparing lengths of time between a measurement time kept by the timer means and a latest period of edge stored in the storing means; and output means for outputting a value of either the measurement time or the period, whichever is longer based on a comparison result of the comparing means.

2. The control device of claim 1, wherein the output means outputs the latest period in a case where the measurement time is shorter than the period, and a sum of the measurement time and a predetermined additional time in a case where the measurement time is not shorter than the period, based on the comparison result of the comparing means.

3. The control device of claim 1, wherein a value outputted by the output means is determined to be valid when the value is equal to or lower than a boundary value that is set based on the speed of the driven body, while the value is determined to be invalid when the value is larger than the boundary value.

4. A control device that controls drive means, the control device comprising:

periodic signal acquisition means for acquiring a pulse signal having a period that corresponds to a speed of a driven body being driven and displaced by the drive means;

rising edge detecting means for detecting a rising edge of the pulse signal;

falling edge detecting means for detecting a falling edge of the pulse signal;

rising timer means for starting timekeeping from a time point when the rising edge is detected by the rising edge detecting means;

falling timer means for starting timekeeping from a time point when the falling edge is detected by the falling edge detecting means;

rising computing means for computing, after the rising edge is detected by the rising edge detecting means, a rising period between the presently detected rising edge and an immediately previously detected rising edge;

falling computing means for computing, after the falling edge is detected by the falling edge detecting means, a falling period between the presently detected falling edge and an immediately previously detected falling edge;

rising storing means for storing in chronological order the rising period computed by the rising computing means;

falling storing means for storing in chronological order the falling period computed by the falling computing means;

first comparing means for comparing lengths of time between a rising measurement time kept by the rising timer means and the latest falling period stored in the falling storing means;

second comparing means for comparing lengths of time between a falling measurement time kept by the falling timer means and the latest rising period stored in the rising storing means; and output means for outputting a value based on the comparison result, the output means outputting, from when the falling edge of the pulse signal is detected till when the rising edge of the pulse signal is detected, a value of either the rising measurement time or the falling period, whichever is longer based on the comparison result of the first comparing means, and outputting, from when the rising edge of the pulse signal is detected till when the falling edge of the pulse signal is detected, a value of either the falling measurement time or the rising period, whichever is longer based on the comparison result of the second comparing means.

5. The control device of claim 4, wherein the output means outputs, from when the falling edge of the pulse signal is detected till when the rising edge of the pulse signal is detected, the latest falling period in a case where the rising measurement time is shorter than the falling period, and a sum of the rising measurement time and a predetermined additional time in a case where the rising measurement time is not shorter than the falling period, based on the comparison result of the first comparing means, and the output means outputs, from when the rising edge of the pulse signal is detected till when the falling edge of the pulse signal is detected, the latest rising period in a case where the falling measurement time is shorter than the rising period, and a sum of the rising measurement time and a predetermined additional time in a case where the falling measurement time is not shorter than the rising period, based on the comparison result of the second comparing means.

6. A control device that controls drive means, the control device comprising:

periodic signal acquisition means for acquiring a pulse signal having a period that corresponds to a speed of a driven body being driven and displaced by the drive means;

edge detecting means for detecting an edge of the pulse signal;

timer means for starting timekeeping from a time point when the edge is detected by the edge detecting means;

computing means for computing, after the edge is detected by the edge detecting means, a period between the presently detected edge and an immediately previously detected edge;

storing means for storing in chronological order the period of edge computed by the computing means;

comparing means for comparing lengths of time between a measurement time kept by the timer means and a second last period stored in the storing means before a time point of detection of the edge; and output means for outputting a sum of a latest period and a value of either the measurement time or the second last period, whichever is longer based on a comparison result of the comparing means.

7. The control device of claim 6, wherein the output means outputs a sum of the second last period and the latest period in a case where the measurement time is shorter than the second last period, and a sum of the measurement time, the latest period, and a predetermined additional time in a case where the measurement time is not shorter than the second last period, based on the comparison result of the comparing means.

8. A control device that controls drive means, the control device comprising:

first periodic signal acquisition means for acquiring a first pulse signal having a period that corresponds to a speed of a driven body being driven and displaced by the drive means;

second periodic signal acquisition means for acquiring a second pulse signal out of phase with the first pulse signal by about 90 degrees in electric angle;

edge detecting means for detecting rising edges and falling edges of the first pulse signal and the second pulse signal, respectively;

first rising timer means for starting timekeeping from a time point when the rising edge of the first pulse signal is detected by the edge detecting means;

first falling timer means for starting timekeeping from a time point when the falling edge of the first pulse signal is detected by the edge detecting means;

second rising timer means for starting timekeeping from a time point when the rising edge of the second pulse signal is detected by the edge detecting means;

second falling timer means for starting timekeeping from a time point when the falling edge of the second pulse signal is detected by the edge detecting means;

first rising computing means for computing, after the rising edge of the first pulse signal is detected by the edge detecting means, a first rising period between the presently detected rising edge and an immediately previously detected rising edge of the first pulse signal;

first falling computing means for computing, after the falling edge of the first pulse signal is detected by the edge detecting means, a first falling period between the presently detected falling edge and an immediately previously detected falling edge of the first pulse signal;

second rising computing means for computing, after the rising edge of the second pulse signal is detected by the edge detecting means, a second rising period between the presently detected rising edge and an immediately previously detected rising edge of the second pulse signal;

second falling computing means for computing, after the falling edge of the second pulse signal is detected by the edge detecting means, a second falling period between the presently detected falling edge and an immediately previously detected falling edge of the second pulse signal;

first rising storing means for storing in chronological order the first rising period computed by the first rising computing means;

first falling storing means for storing in chronological order the first falling period computed by the first falling computing means;

second rising storing means for storing in chronological order the second rising period computed by the second rising computing means;

second falling storing means for storing in chronological order the second falling period computed by the second falling computing means;

first comparing means for comparing a first rising measurement time kept by the first rising timer means and a latest second falling period stored in the second falling storing means;

second comparing means for comparing a first falling measurement time kept by the first falling timer means and a latest second rising period stored in the second rising storing means;

third comparing means for comparing a second rising measurement time kept by the second rising timer means and a latest first rising period stored in the first rising storing means;

fourth comparing means for comparing a second falling measurement time kept by the second falling timer means and a latest first falling period stored in the first falling storing means; and output means for outputting a value based on the comparison result, the output means outputting, from when the falling edge of the second pulse signal is detected till when the rising edge of the first pulse signal is detected, a value of either the first rising measurement time or the second falling period, whichever is longer based on the comparison result of the first comparing means, outputting, from when the rising edge of the second pulse signal is detected till when the falling edge of the first pulse signal is detected, a value of either the first falling measurement time or the second rising period, whichever is longer based on the comparison result of the second comparing means, outputting, from when the rising edge of the first pulse signal is detected till when the rising edge of the second pulse signal is detected, a value of either the second rising measurement time or the first rising period, whichever is longer based on the comparison result of the third comparing means, and outputting, from when the falling edge of the first pulse signal is detected till when the falling edge of the second pulse signal is detected, a value of either the second falling measurement time or the first falling period, whichever is longer based on the comparison result of the fourth comparing means.

9. The control device of claim 8, wherein the output means outputs, from when the falling edge of the second pulse signal is detected till when the rising edge of the first pulse signal is detected, the latest second falling period in a case where the first rising measurement time is shorter than the latest second falling period, and a sum of the first rising measurement time and a predetermined additional time in a case where the first rising measurement time is not shorter than the second falling period, based on the comparison result of the first comparing means, the output means outputs, from when the rising edge of the second pulse signal is detected till when the falling edge of the first pulse signal is detected, the latest second rising period in a case where the first falling measurement time is shorter than the latest second rising period, and a sum of the first falling measurement time and a predetermined additional time in a case where the first falling measurement time is not shorter than the latest second rising period, based on the comparison result of the second comparing means, the output means outputs, from when the rising edge of the first pulse signal is detected till when the rising edge of the second pulse signal is detected, the latest first rising period in a case where the second rising measurement time is shorter than the latest first rising period, and a sum of the second rising measurement time and a predetermined additional time in a case where the second rising measurement time is not shorter than the latest first rising period, based on the comparison result of the third comparing means, and the output means outputs, from when the falling edge of the first pulse signal is detected till when the falling edge of the second pulse signal is detected, the latest first falling period in a case where the second falling measurement time is shorter than the latest first falling period, and a sum of the second falling measurement time and a predetermined additional time in a case where the second falling measurement time is not shorter than the latest first falling period, based on the comparison result of the fourth comparing means.

10. A control device that controls drive means, the control device comprising:
- first periodic signal acquisition means for acquiring a first pulse signal having a period that corresponds to a speed of a driven body being driven and displaced by the drive means;
- second periodic signal acquisition means for acquiring a second pulse signal out of phase with the first pulse signal by about 90 degrees in electric angle;
- edge detecting means for detecting rising edges and falling edges of the first pulse signal and the second pulse signal, respectively;
- first rising timer means for starting timekeeping from a time point when the rising edge of the first pulse signal is detected by the edge detecting means;
- first falling timer means for starting timekeeping from a time point when the falling edge of the first pulse signal is detected by the edge detecting means;
- second rising timer means for starting timekeeping from a time point when the rising edge of the second pulse signal is detected by the edge detecting means;
- second falling timer means for starting timekeeping from a time point when the falling edge of the second pulse signal is detected by the edge detecting means;
- first computing means for computing, after the rising edge of the second pulse signal is detected by the edge detecting means, a first period between the presently detected rising edge and an immediately previously detected rising edge of the first pulse signal;
- second computing means for computing, after the falling edge of the first pulse signal is detected by the edge detecting means, a second period between the presently detected falling edge and an immediately previously detected rising edge of the second pulse signal;
- third computing means for computing, after the falling edge of the second pulse signal is detected by the edge detecting means, a third period between the presently detected falling edge and an immediately previously detected falling edge of the first pulse signal;
- fourth computing means for computing, after the rising edge of the first pulse signal is detected by the edge detecting means, a fourth period between the presently detected rising edge and an immediately previously detected falling edge of the second pulse signal;
- first storing means for storing in chronological order the first period computed by the first computing means;
- second storing means for storing in chronological order the second period computed by the second computing means;
- third storing means for storing in chronological order the third period computed by the third computing means;
- fourth storing means for storing in chronological order the fourth period computed by the fourth computing means;
- first comparing means for comparing a first rising measurement time kept by the first rising timer means and a latest first period stored in the first storing means;
- second comparing means for comparing a second rising measurement time kept by the second rising timer means and a latest second period stored in the second storing means;
- third comparing means for comparing a first falling measurement time kept by the first falling timer means and a latest third period stored in the third storing means;
- fourth comparing means for comparing a second falling measurement time kept by the second falling timer means and a latest fourth period stored in the fourth storing means; and
- output means for outputting a value based on the comparison result, the output means
  outputting, from when the falling edge of the second pulse signal is detected till when the rising edge of the first pulse signal is detected, a total period length of the first period, second period, third period, and fourth period which are respectively latest, in a case where the first rising measurement time is shorter than the latest first period, and a first total time-length of the first rising measurement time and the second period, third period, and fourth period which are respectively latest, in a case where the first rising measurement time is not shorter than the latest first period, based on the comparison result of the first comparing means,
  outputting, from when the rising edge of the second pulse signal is detected till when the falling edge of the first pulse signal is detected, the total period length in a case where the second rising measurement time is shorter than the latest second period, and a second total time-length of the second rising measurement time and the first period, third period, and fourth period which are respectively latest, in a case where the second rising measurement time is not shorter than the latest second period, based on the comparison result of the second comparing means,
  outputting, from when the rising edge of the first pulse signal is detected till when the rising edge of the second pulse signal is detected, the total period length in a case where the first falling measurement time is shorter than the latest third period, and a third total time-length of the first falling measurement time and the first period, second period, and fourth period which are respectively latest, in a case where the first falling measurement time is not shorter than the latest third period, based on the comparison result of the third comparing means, and
  outputting, from when the falling edge of the first pulse signal is detected till when the falling edge of the second pulse signal is detected, the total period length in a case where the second falling measurement time is shorter than the latest fourth period, and a fourth total time-length of the second falling measurement time and the first period, second period, and third period which are respectively latest, in a case where the second falling measurement time is not shorter than the latest fourth period, based on the comparison result of the fourth comparing means.

11. The control device of claim 10, wherein the first comparing means compares the first rising measurement time kept by the first rising timer means with the latest fourth period stored in the fourth storing means,
- the second comparing means compares the second rising measurement time kept by the second rising timer means with the latest first period stored in the first storing means,
- the third comparing means compares the first falling measurement time kept by the first falling timer means with the latest second period stored in the second storing means, and
- the fourth comparing means compares the second falling measurement time kept by the second falling timer means with the latest third period stored in the third storing means, and the output means outputs, from when the falling edge of the second pulse signal is detected till when the rising edge of the first pulse signal is detected, the total period length in a case where the first rising measurement time is shorter than the latest fourth period, and the first total time-length in a case where the first rising measurement time is not shorter than the latest fourth period, based on the comparison result of the first comparing means, the output means outputs, from when the rising edge of the second pulse signal is detected till when the falling edge of the first pulse signal is detected, the total period length in a case where the second rising measurement time is shorter than the latest first period, and the second total time-length in a case where the second rising measurement time is not shorter than the latest first period, based on the comparison result of the second comparing means, the output means outputs, from when the rising edge of the first pulse signal is detected till when the rising edge of the second pulse signal is detected, the total period length in a case where the first falling measurement time is shorter than the latest second period, and the third total time-length in a case where the first falling measurement time is not shorter than the latest second period, based on the comparison result of the third comparing means, and the output means outputs, from when the falling edge of the first pulse signal is detected till when the falling edge of the second pulse signal is detected, the total period length in a case where the second falling measurement time is shorter than the latest third period, and the fourth total time-length in a case where the second falling measurement time is not shorter than the latest third period, based on the comparison result of the fourth comparing means.

12. The control device of claim 11, wherein the output means outputs, from when the falling edge of the second pulse signal is detected till when the rising edge of the first pulse signal is detected, a first additional total time-length that is a sum of the first total time-length and a predetermined additional time, in a case of outputting the first total time-length, based on the comparison result of the first comparing means, the output means outputs, from when the rising edge of the second pulse signal is detected till when the falling edge of the first pulse signal is detected, a second additional total time-length that is a sum of the second total time-length and a predetermined additional time, in a case of outputting the second total time-length, based on the comparison result of the second comparing means, the output means outputs, from when the rising edge of the first pulse signal is detected till when the rising edge of the second pulse signal is detected, a third additional total time-length that is a sum of the third total time-length and a predetermined additional time, in a case of outputting the third total time-length, based on the comparison result of the third comparing means, and the output means outputs, from when the falling edge of the first pulse signal is detected till when the falling edge of the second pulse signal is detected, a fourth additional total time-length that is a sum of the fourth total time-length and a predetermined additional time, in a case of outputting the fourth total time-length, based on the comparison result of the fourth comparing means.

13. The control device of claim 10, wherein the first comparing means compares the first total time-length and the total period length, the second comparing means compares the second total time-length and the total period length, the third comparing means compares the third total time-length and the total period length, and the fourth comparing means compares the fourth total time-length and the total period length, and the output means outputs, from when the falling edge of the second pulse signal is detected till when the rising edge of the first pulse signal is detected, the total period length in a case where the first total time-length is shorter than the total period length, and the first total time-length in a case where the first total time-length is not shorter than the total period length, based on the comparison result of the first comparing means, the output means outputs, from when the rising edge of the second pulse signal is detected till when the falling edge of the first pulse signal is detected, the total period length in a case where the second total time-length is shorter than the total period length, and the second total time-length in a case where the second total time-length is not shorter than the total period length, based on the comparison result of the second comparing means, the output means outputs, from when the rising edge of the first pulse signal is detected till when the rising edge of the second pulse signal is detected, the total period length in a case where the third total time-length is shorter than the total period length, and the third total time-length in a case where the third total time-length is not shorter than the total period length, based on the comparison result of the third comparing means, and the output means outputs, from when the falling edge of the first pulse signal is detected till when the falling edge of the second pulse signal is detected, the total period length in a case where the fourth total time-length is shorter than the total period length, and the fourth total time-length in a case where the fourth total time-length is not shorter than the total period length, based on the comparison result of the fourth comparing means.

14. The control device of claim 10, wherein the output means outputs, from when the falling edge of the second pulse signal is detected till when the rising edge of the first pulse signal is detected, a first additional total time-length that is a sum of the first total time-length and a predetermined additional time, in a case of outputting the first total time-length, based on the comparison result of the first comparing means, the output means outputs, from when the rising edge of the second pulse signal is detected till when the falling edge of the first pulse signal is detected, a second additional total time-length that is a sum of the second total time-length and a predetermined additional time, in a case of outputting the second total time-length, based on the comparison result of the second comparing means, the output means outputs, from when the rising edge of the first pulse signal is detected till when the rising edge of the second pulse signal is detected, a third additional total time-length that is a sum of the third total time-length and a predetermined additional time, in a case of outputting the third total time-length, based on the comparison result of the third comparing means, and the output means outputs, from when the falling edge of the first pulse signal is detected till when the falling edge of the second pulse signal is detected, a fourth additional total time-length that is a sum of the fourth total time-length and a predetermined additional time, in a case of outputting the fourth total time-length, based on the comparison result of the fourth comparing means.

15. A control device that controls drive means, the control device comprising:

acquisition means for acquiring at regular or irregular intervals speed information that corresponds to a predetermined amount of displacement of a driven body being driven and displaced by the drive means;

acquired information storing means for storing in chronological order the speed information acquired by the acquisition means;

determining means for determining whether or not the acquired speed information is a constant value within a predetermined range over a predetermine time immediately before being stored in the acquired information storing means;

control value producing means for outputting, based on a determination result of the determining means, a control value that is a sum of the speed information and a predetermined value in a case where the acquired speed information is a constant value, and outputting the speed information as a control value in a case where the acquired speed information is not a constant value;

speed computing means for computing the speed of the driven body based on the control value outputted by the control value producing means and the predetermined amount of displacement of the driven body; and control means for controlling the drive means based on the speed computed by the speed computing means.

16. A control device that controls drive means, the control device comprising:

acquisition means for acquiring at regular or irregular intervals speed information that corresponds to a predetermined amount of displacement of a driven body being driven and displaced by the drive means;

acquired information storing means for storing in chronological order the speed information acquired by the acquisition means;

certain time-length calculating means for calculating an immediately preceding certain length of time for the speed information acquired by the acquisition means to fall within a predetermined range, based on the speed information stored in the acquired information storing means;

time-length comparing means for comparing lengths of time between the certain length of time calculated by the certain time-length calculating means and speed information previous to the certain length of time among the speed information stored in the acquired information storing means;

speed computing means for computing a speed of the driven body based on the speed information acquired by the acquisition means and a predetermined amount of displacement of the driven body in a case where the certain length of time is shorter than the speed information previous to the certain length of time while computing a provisional speed of the driven body based on the speed information acquired by the acquisition means and a predetermined amount of displacement of the driven body and then subtracting a predetermined value from the provisional speed to compute the speed of the driven body in a case where the certain length of time is not shorter than the speed information previous to the certain length of time, based on a comparison result of the time-length comparing means; and control means for controlling the drive means based on the speed computed by the speed computing means.

17. The control device of claim 16, wherein the speed computing means computes:

the speed of the driven body based on the speed information acquired by the acquisition means and the predetermined amount of displacement of the driven body in the case where the certain length of time is shorter than the speed information previous to the certain length of time based on the comparison result of the time-length comparing means; and the speed of the driven body by computing a provisional speed of the driven body based on the speed information acquired by the acquisition means and the predetermined amount of displacement of the driven body, and then multiplying the provisional speed by a predetermined damping rate, in the case where the certain length of time is not shorter than the speed information previous to the certain length of time.

18. The control device of claim 17, wherein the damping rate is set to become lower as the certain length of time becomes longer.

19. A control method of controlling drive means, the control method comprising:

acquiring a pulse signal having a period that corresponds to a speed of a driven body being driven and displaced by the drive means;

detecting either a rising or falling edge of the pulse signal;

starting timekeeping from a time point when the edge is detected;

computing, after the edge is detected by the edge detecting means, a period between the presently edge and an immediately previously detected edge;

comparing means comparing lengths of time between a kept measurement time and the latest period of edge computed; and outputting a value of either the measurement time or the period, whichever is longer based on a comparison result.

20. A control method of controlling drive means, the control method comprising:

acquiring at regular or irregular intervals speed information that corresponds to a predetermined amount of displacement of a driven body being driven and displaced by the drive means;

determining whether or not the acquired speed information is a constant value within a predetermined range over a predetermined time immediately before being acquired;

outputting a control value that is a sum of the speed information and a predetermined value in a case where the acquired speed information is a constant value, and outputting the speed information as a control value in a case where the acquired speed information is not a constant value;

computing the speed of the driven body based on the outputted control value and the predetermined amount of displacement of the driven body; and controlling the drive means based on the computed speed.

* * * * *